United States Patent
Yerramalli et al.

(10) Patent No.: US 12,019,148 B2
(45) Date of Patent: Jun. 25, 2024

(54) METHODS AND APPARATUS FOR RECEPTION POINT POSITIONING MEASUREMENTS

(71) Applicant: QUALCOMM Incorporated, San Diego, CA (US)

(72) Inventors: Srinivas Yerramalli, San Diego, CA (US); Xiaoxia Zhang, San Diego, CA (US); Mostafa Khoshnevisan, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/475,053

(22) Filed: Sep. 14, 2021

(65) Prior Publication Data
US 2023/0087450 A1    Mar. 23, 2023

(51) Int. Cl.
*H04L 5/00*         (2006.01)
*G01S 13/87*        (2006.01)
*H04W 24/08*        (2009.01)

(52) U.S. Cl.
CPC .......... *G01S 13/876* (2013.01); *H04L 5/0048* (2013.01); *H04W 24/08* (2013.01)

(58) Field of Classification Search
CPC ................................ H04L 5/0048; G01S 5/08
USPC ................ 455/456.1; 375/267, 262; 370/329
See application file for complete search history.

(56) References Cited

U.S. PATENT DOCUMENTS

2023/0094748 A1* 3/2023 Meng .................... H04L 5/0048
                                                                375/267

2023/0262648 A1* 8/2023 Thomas ................ G01S 5/0236
                                                                455/456.1

FOREIGN PATENT DOCUMENTS

EP        3624505 A1     3/2020
WO     2021091647 A1     5/2021

OTHER PUBLICATIONS

Dwivedi S., et al., "Positioning in 5G Networks", IEEE Communications Magazine, vol. 59, No. 11, pp. 1-7, Feb. 5, 2021, ISSN: 0163-6804, DOI: 10.1109/MCOM.011.2100091, XP055921949, [retrieved on Nov. 29, 2022], p. 39, paragraph III, Positioning, specific signals—p. 41, figures 2-4, abstract.

(Continued)

*Primary Examiner* — Kiet M Doan
(74) *Attorney, Agent, or Firm* — Procopio, Cory, Hargreaves & Savitch LLP

(57) ABSTRACT

Positioning of a user equipment (UE) is supported using reception points (RPs) that receive uplink sounding reference signals (SRS) from the UE. The RPs may measure signal strengths of received SRS that are used to determine path loss reference values that are provided to the UE for configurating subsequent SRS. The UE may report a plurality of RxTx time difference measurements with respect to a single PRS for the SRS transmitted to a plurality of RPs. The RPs may provide an Rx time for received SRS, which is used to generate a RxTx time different measurement for asymmetric round trip time (RTT) if the RP and TRP clocks are synchronized. The RPs may provide an RxRx time difference measurement for a time of reception of PRS and SRS if the RP and TRP clocks are synchronized. A location server determines a position of the UE using different positioning measurements.

28 Claims, 15 Drawing Sheets

(56) References Cited

OTHER PUBLICATIONS

Partial International Search Report—PCT/US2022/040657—ISA/EPO—dated Dec. 15, 2022.
International Search Report and Written Opinion—PCT/US2022/040657—ISA/EPO—dated Feb. 21, 2023.

* cited by examiner

1400

1402 — Receive from the UE a first location information report comprising a plurality of receive-transmit (Rx-Tx) time difference measurements with respect to a positioning reference signal (PRS) resource received by the UE from a Transmission/Reception Point (TRP), wherein the plurality of Rx-Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource

1404 — Receive from the TRP a second location information report comprising positioning measurements for the plurality of RPs

1406 — Determine a position of the UE based on the first location information report and the second location information report

Receive positioning measurements for the UE from a Transmission/Reception Point (TRP), wherein the positioning measurements comprise:
    a receive-receive (Rx-Rx) time difference measurement from a first Reception Point (RP) coupled to the TRP, wherein the Rx-Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP;

a receive-transmit (Rx-Tx) time difference measurement for the TRP and a second RP coupled to the TRP, the second RP has a known clock offset with respect to the TRP, the Rx-Tx time difference measurement is determined by the TRP based on a difference between a time of transmission of the PRS resource by the TRP and a time of reception by the second RP of a second SRS resource transmitted by the UE to the second RP in response to the PRS resource and the known clock offset — 1602

Determine a position for the UE based on the positioning measurements including the Rx-Rx time difference measurement for the first RP and the Rx-Tx time difference measurement for the TRP and the second RP — 1604

Fig. 16

METHODS AND APPARATUS FOR RECEPTION POINT POSITIONING MEASUREMENTS

BACKGROUND

Field

The subject matter disclosed herein relates to wireless communications systems, and more particularly to systems, methods, and devices that support positioning using measurements from reception points (RPs).

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), reception points (RPs), transmission points (TPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR base station), a new radio node-B (NR NB), a network node, 5G NB, gNB, etc.). A base station or DU may communicate with UEs on downlink channels (e.g., for transmissions from a base station or distributed unit to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, consumer asset tracking and Internet service. The location of a UE may be estimated based on information gathered from various systems. In a cellular network implemented according to LTE or 5G NR, for example, a UE may receive and measure downlink reference signals and/or send uplink reference signals with which positioning measurements are performed. The position of the UE may be determined based on the downlink and/or uplink measurements, e.g., by the UE or a network entity, e.g., location server. With the use of distributed units, downlink signals and uplink signals may not be sent and received from the same geographic position, which impacts the accuracy of positioning.

It may be desirable for positioning improvements implemented to assist in positioning of when distributed units are employed.

SUMMARY

Positioning of a user equipment (UE) is supported using reception points (RPs) that receive uplink sounding reference signals (SRS) from the UE. The RPs may be in a different physical location than a transmission/reception point (TRP) that transmits downlink positioning reference signals to the UE. The RPs may measure the signal strength of received SRS which may be used to determine path loss reference values, which are provided to the UE for configuration of additional SRS. The UE may transmit SRS to a plurality of RPs in response to receiving a single PRS from the TRP and may report a plurality of Rx–Tx time difference measurements with respect to the single PRS. The RPs may provide an Rx time for the SRS to the TRP, which may generate a Rx–Tx time different measurement for asymmetric round trip time (RTT) if the RP and TRP clocks are synchronized. The RPs may provide an Rx–Rx time difference measurement for a time of reception of a PRS from the TRP and a time of reception of the SRS from the UE, e.g., if the RP and TRP clocks are synchronized. A location server may determine a position of the UE using a number of different positioning measurements.

In one implementation, a method performed by a user equipment (UE) for supporting positioning of the UE, includes receiving a positioning reference signal (PRS) resource from a Transmission/Reception Point (TRP); transmitting, in response to receiving the PRS resource, sounding reference signal (SRS) resources to each of a plurality of Reception Points (RPs), wherein a different SRS resource is transmitted to each Reception Point (RP) in the plurality of RPs; generating a plurality of receive-transmit (Rx–Tx) time difference measurements with respect to the PRS resource comprising differences between a time of reception of the PRS resource and times of transmission of the SRS resources to each of the plurality of RPs; and sending to a location server a location information report comprising the plurality of Rx–Tx time difference measurements with respect to the PRS resource for determination of a position of the UE.

In one implementation, a user equipment (UE) configured for supporting positioning of the UE, includes a wireless transceiver configured to communicate with entities in a wireless network; at least one memory; and at least one processor coupled to the wireless transceiver and the at least one memory, wherein the at least one processor is configured to: receive, via the wireless transceiver, a positioning reference signal (PRS) resource from a Transmission/Reception Point (TRP); transmit, via the wireless transceiver, in response to receiving the PRS resource, sounding reference signal (SRS) resources to each of a plurality of Reception Points (RPs), wherein a different SRS resource is transmitted to each Reception Point (RP) in the plurality of RPs; generate a plurality of receive-transmit (Rx–Tx) time difference measurements with respect to the PRS resource comprising differences between a time of reception of the PRS resource and times of transmission of the SRS resources to each of the plurality of RPs; and send, via the wireless transceiver, to a location server a location information report comprising the plurality of Rx–Tx time difference measurements with respect to the PRS resource for determination of a position of the UE.

In one implementation, a user equipment (UE) configured for supporting positioning of the UE, includes means for receiving a positioning reference signal (PRS) resource from a Transmission/Reception Point (TRP); means for transmitting, in response to receiving the PRS resource, sounding reference signal (SRS) resources to each of a plurality of Reception Points (RPs), wherein a different SRS resource is transmitted to each Reception Point (RP) in the plurality of RPs; means for generating a plurality of receive-transmit (Rx–Tx) time difference measurements with respect to the PRS resource comprising differences between a time of reception of the PRS resource and times of transmission of the SRS resources to each of the plurality of RPs; and means for sending to a location server a location information report comprising the plurality of Rx–Tx time difference measurements with respect to the PRS resource for determination of a position of the UE.

In one implementation, a non-transitory storage medium including program code stored thereon, the program code is operable to configure at least one processor in user equipment (UE) for supporting positioning of the UE, the program code comprising instructions to: receive a positioning reference signal (PRS) resource from a Transmission/Reception Point (TRP); transmit, in response to receiving the PRS resource, sounding reference signal (SRS) resources to each of a plurality of Reception Points (RPs), wherein a different SRS resource is transmitted to each Reception Point (RP) in the plurality of RPs; generate a plurality of receive-transmit (Rx–Tx) time difference measurements with respect to the PRS resource comprising differences between a time of reception of the PRS resource and times of transmission of the SRS resources to each of the plurality of RPs; and send to a location server a location information report comprising the plurality of Rx–Tx time difference measurements with respect to the PRS resource for determination of a position of the UE.

In one implementation, a method performed by a location server for supporting positioning of the UE, includes receiving from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; receiving from the TRP a second location information report comprising positioning measurements for the plurality of RPs; and determining a position of the UE based on the first location information report and the second location information report.

In one implementation, a location server configured for supporting positioning of the UE, includes a communications interface configured to communicate with entities in a wireless network; at least one memory; and at least one processor coupled to the communications interface and the at least one memory, wherein the at least one processor is configured to: receive, via the communications interface, from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; receive, via the communications interface, from the TRP a second location information report comprising positioning measurements for the plurality of RPs; and determine a position of the UE based on the first location information report and the second location information report.

In one implementation, a location server configured for supporting positioning of the UE, includes means for receiving from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; means for receiving from the TRP a second location information report comprising positioning measurements for the plurality of RPs; and means for determining a position of the UE based on the first location information report and the second location information report.

In one implementation, a non-transitory storage medium including program code stored thereon, the program code is operable to configure at least one processor in location server for supporting positioning of the UE, the program code comprising instructions to: receive from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; receive from the TRP a second location information report comprising positioning measurements for the plurality of RPs; and determine a position of the UE based on the first location information report and the second location information report.

In one implementation, a method performed by a Reception Point (RP) for supporting positioning of the UE in a wireless network, includes receiving from the UE a sounding reference signal (SRS) resource; generating a positioning measurement for the UE based on the SRS resource received from the UE; reporting the positioning measurement to a Transmission/Reception Point (TRP) to which the RP is connected, wherein the positioning measurement comprises at least one of: a receive-receive (Rx–Rx) time difference measurement, wherein the Rx–Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx–Rx time difference measurement to a location server for determining a position of the UE; a time of reception of the SRS resource if the RP has a known clock offset with respect to the TRP, wherein the TRP determines a receive-transmit (Rx–Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

In one implementation, a Reception Point (RP) configured for supporting positioning of the UE in a wireless network, includes an external interface configured to communicate with entities in a wireless network; at least one memory; and at least one processor coupled to the external interface and the at least one memory, wherein the at least one processor is configured to: receive, via the external interface, from the UE a sounding reference signal (SRS) resource; generate a positioning measurement for the UE based on the SRS resource received from the UE; report, via the external interface, the positioning measurement to a Transmission/Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

In one implementation, a Reception Point (RP) configured for supporting positioning of the UE in a wireless network, includes means for receiving from the UE a sounding reference signal (SRS) resource; means for generating a positioning measurement for the UE based on the SRS resource received from the UE; means for reporting the positioning measurement to a Transmission/Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

In one implementation, a non-transitory storage medium including program code stored thereon, the program code is operable to configure at least one processor in a Reception Point (RP) for supporting positioning of the UE in a wireless network, the program code comprising instruction to: receive from the UE a sounding reference signal (SRS) resource; generate a positioning measurement for the UE based on the SRS resource received from the UE; report the positioning measurement to a Transmission/Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

In one implementation, a method performed by a location server for supporting positioning of the UE in a wireless network, includes receiving positioning measurements for the UE from a Transmission/Reception Point (TRP), wherein the positioning measurements comprise: a receive-receive (Rx-Rx) time difference measurement from a first Reception Point (RP) coupled to the TRP, wherein the Rx-Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx-Tx) time difference measurement for the TRP and a second RP coupled to the TRP, the second RP has a known clock offset with respect to the TRP, the Rx-Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and determining a position for the UE based on the positioning measurements including the Rx-Rx time difference measurement for the first RP and the Rx-Tx time difference measurement for the TRP and the second RP.

In one implementation, a location server for supporting positioning of the UE in a wireless network, includes a communications interface configured to communicate with entities in a wireless network; at least one memory; and at least one processor coupled to the communications interface and the at least one memory, wherein the at least one processor is configured to: receive, via the communications interface, positioning measurements for the UE from a Transmission/Reception Point (TRP), wherein the positioning measurements comprise: a receive-receive (Rx-Rx) time difference measurement from a first Reception Point (RP) coupled to the TRP, wherein the Rx-Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx–Tx) time difference measurement for the TRP and a second RP coupled to the TRP, the second RP has a known clock offset with respect to the TRP, the Rx–Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and determine a position for the UE based on the positioning measurements including the Rx–Rx time difference measurement for the first RP and the Rx–Tx time difference measurement for the TRP and the second RP.

In one implementation, a location server for supporting positioning of the UE in a wireless network, includes means for receiving positioning measurements for the UE from a Transmission/Reception Point (TRP), wherein the positioning measurements comprise: a receive-receive (Rx–Rx) time difference measurement from a first Reception Point (RP) coupled to the TRP, wherein the Rx–Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx–Tx) time difference measurement for the TRP and a second RP coupled to the TRP, the second RP has a known clock offset with respect to the TRP, the Rx–Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and means for determining a position for the UE based on the positioning measurements including the Rx–Rx time difference measurement for the first RP and the Rx–Tx time difference measurement for the TRP and the second RP.

In one implementation, a non-transitory storage medium including program code stored thereon, the program code is operable to configure at least one processor in a location server for supporting positioning of the UE in a wireless network, the program code comprising instructions to: receive positioning measurements for the UE from a Transmission/Reception Point (TRP), wherein the positioning measurements comprise: a receive-receive (Rx–Rx) time difference measurement from a first Reception Point (RP) coupled to the TRP, wherein the Rx–Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx–Tx) time difference measurement for the TRP and a second RP coupled to the TRP, the second RP has a known clock offset with respect to the TRP, the Rx–Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and determine a position for the UE based on the positioning measurements including the Rx–Rx time difference measurement for the first RP and the Rx–Tx time difference measurement for the TRP and the second RP.

In one implementation, a method performed by a user equipment (UE) for supporting positioning of a UE in a wireless network, includes transmitting a first sounding reference signal (SRS) to a Reception Point (RP), wherein the RP is a reception only node in the wireless network that is coupled to a Transmissions/Reception Point (TRP); receiving path loss reference values from the TRP, wherein the path loss reference values are determined based on the first SRS transmitted by the UE to the RP; and transmitting a second SRS to the RP for positioning using the path loss reference values.

In one implementation, a user equipment (UE) configured for supporting positioning of a UE in a wireless network, includes a wireless transceiver configured to communicate with entities in a wireless network; at least one memory; and at least one processor coupled to the wireless transceiver and the at least one memory, wherein the at least one processor is configured to: transmit, via the wireless transceiver, a first sounding reference signal (SRS) to a Reception Point (RP), wherein the RP is a reception only node in the wireless network that is coupled to a Transmissions/Reception Point (TRP); receive, via the wireless transceiver, path loss reference values from the TRP, wherein the path loss reference values are determined based on the first SRS transmitted by the UE to the RP; and transmit, via the wireless transceiver, a second SRS to the RP for positioning using the path loss reference values.

In one implementation, a user equipment (UE) configured for supporting positioning of a UE in a wireless network, includes means for transmitting a first sounding reference signal (SRS) to a Reception Point (RP), wherein the RP is a reception only node in the wireless network that is coupled to a Transmissions/Reception Point (TRP); means for receiving path loss reference values from the TRP, wherein the path loss reference values are determined based on the first SRS transmitted by the UE to the RP; and means for transmitting a second SRS to the RP for positioning using the path loss reference values.

In one implementation, a non-transitory storage medium including program code stored thereon, the program code is operable to configure at least one processor in a user equipment (UE) configured for supporting positioning of a UE in a wireless network, the program code comprising instructions to: transmit a first sounding reference signal (SRS) to a Reception Point (RP), wherein the RP is a reception only node in the wireless network that is coupled to a Transmissions/Reception Point (TRP); receive path loss reference values from the TRP, wherein the path loss reference values are determined based on the first SRS transmitted by the UE to the RP; and transmit a second SRS to the RP for positioning using the path loss reference values.

In one implementation, a method performed by a Transmission/Reception Point (TRP) for supporting positioning of a UE in a wireless network, includes receiving a signal strength measurement from a Reception Point (RP) for a first sounding reference signal (SRS) received by the RP from the UE, wherein the RP is a reception only node in the wireless network that is coupled to a Transmissions/Reception Point (TRP); and sending path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

In one implementation, a Transmission/Reception Point (TRP) configured for supporting positioning of a UE in a wireless network, includes an external interface configured to communicate with entities in a wireless network; at least one memory; and at least one processor coupled to the external interface and the at least one memory, wherein the at least one processor is configured to: receive, via the external interface, a signal strength measurement from a Reception Point (RP) for a first sounding reference signal (SRS) received by the RP from the UE, wherein the RP is a reception only node in the wireless network that is coupled to a Transmissions/Reception Point (TRP); and send, via the external interface, path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

In one implementation, a Transmission/Reception Point (TRP) configured for supporting positioning of a UE in a wireless network, includes means for receiving a signal strength measurement from a Reception Point (RP) for a first sounding reference signal (SRS) received by the RP from the UE, wherein the RP is a reception only node in the wireless network that is coupled to a Transmissions/Reception Point (TRP); and means for sending path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

In one implementation, a non-transitory storage medium including program code stored thereon, the program code is operable to configure at least one processor in a Transmission/Reception Point (TRP) for supporting positioning of a UE in a wireless network, the program code comprising instructions to: receive a signal strength measurement from a Reception Point (RP) for a first sounding reference signal (SRS) received by the RP from the UE, wherein the RP is a reception only node in the wireless network that is coupled to a Transmissions/Reception Point (TRP); and send path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

BRIEF DESCRIPTION OF THE DRAWINGS

FIG. 14 shows a flowchart for an exemplary method performed by a location server for supporting positioning of a UE in a wireless network.

FIG. 16 shows a flowchart for an exemplary method performed by a location server for supporting positioning of a UE in a wireless network.

Figure 1A:
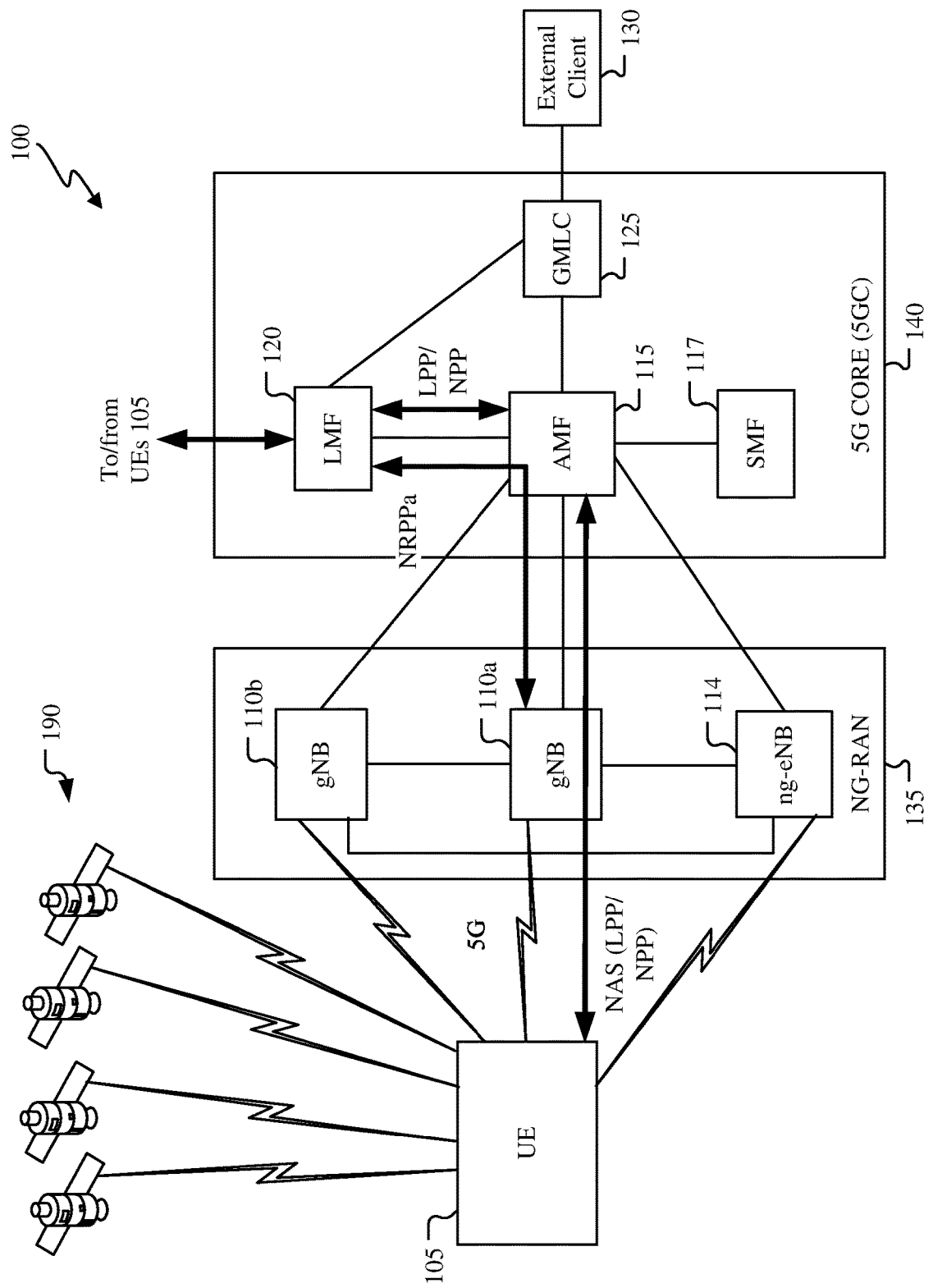
FIG. 1A shows an architecture of communication system including a number of UEs, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Techniques are discussed herein for positioning of a user equipment (UE) using reception points (RPs) that receive uplink (UL) sounding reference signals (SRS) from the UE. The RPs may be in a different physical location than a transmission/reception point (TRP) that transmits downlink positioning reference signals to the UE, which impacts positioning methods that utilize UL signals, such as UL AOA, UL TDOA and RTT. For example, the UE cannot use a DL signal received from the TRP thereby affecting the path loss reference used for UL SRS signaling. Accordingly, path loss reference for transmission of the SRS for positioning may be determined and provided to the UE based on the signal strengths of SRS signals received by the RPs, e.g., in a feedback loop.

Further, because the RPs and TRP may be in different physical locations, and consequently, RTT measurements are asymmetric, i.e., the time of flight of the downlink signal may not be the same as the time of flight of the uplink signal. Moreover, the RPs and TRP may have independent clocks, which may not be synchronized. If the RP and TRP clocks are synchronized and any clock offset known, asymmetric RTT is feasible using the time of transmission (Tx) of the PRS from the TRP and the time of reception (Rx) of the SRS received by the RP, after correcting any clock offset present. The UE may transmit the SRS to multiple RPs based on a single received PRS, and may report Rx–Tx time difference measurements for all transmitted SRS with respect to the same PRS.

The RPs may receive also receive PRS from TRP and provide a Rx–Rx time difference measurement based on the difference in time between receiving the PRS from the TRP and the SRS from the UE, for an UL TDOA measurement. The time of transmission of the PRS is not necessary for the UL TDOA measurement, and accordingly, the RP may report the Rx–Rx time difference measurements if the RP and TRP clocks are not synchronized, or the clock offset is not known. RPs may further measure the UL AOA of the SRS from the UE. A location server may determine the position of the UE using a number of different types of positioning measurements, e.g., Rx–Tx time difference measurements (for asymmetric RTT), Rx–Rx time difference measurements (for UL TDOA), etc.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions. Base stations may include or be associated with distributed unit, such as Transmission/Reception Points (TRP), transmission (Tx) only TRPs (sometimes referred to as transmission points (TPs), reception (Rx) only TRPs (sometimes referred to as reception points (RPs), etc.

UEs may be embodied by any of a number of types of devices including but not limited to printed circuit (PC) cards, compact flash devices, external or internal modems, wireless or wireline phones, smartphones, tablets, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1A shows an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a consumer location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation of satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1A, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to wirelessly communicate bi-directionally with the UE 105, and are each communicatively coupled to, and configured to bi-directionally communicate with, the AMF 115. The gNBs 110a, 110b, and the ng-eNB 114 may be referred to as base stations (base stations). The architecture of a gNB 110 may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB 110. The AMF 115, the SMF 117, the LMF 120, and the GMLC 125 are communicatively coupled to each other, and the GMLC 125 is communicatively coupled to an external client 130. The SMF 117 may serve as an initial contact point of a Service Control Function (SCF) (not shown) to create, control, and delete media sessions. The gNB 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the gNB 110a, 110b, 114 may be configured to communicate with the UE 105 via multiple carriers. Each of the gNB 110a, 110b, 114 may provide communication coverage for a respective geographic region, e.g., a cell. Each cell may be partitioned into multiple sectors as a function of the base station antennas.

FIG. 1A provides a generalized illustration of various components, any or all of which may be utilized as appropriate, and each of which may be duplicated or omitted, as necessary. Specifically, although only UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) or at gNB 110a, 110b, 114 and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 or the gNB 110a, 110b, 114 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality, respectively.

The system 100 is capable of wireless communication in that components of the system 100 can communicate with one another (at least sometimes using wireless connections) directly or indirectly, e.g., via the gNB 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UE 105, the gNB 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UE 105 may communicate with other UEs through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), sidelink channel state information reference signal (SL-CSIRS), physical sidelink feedback channel (PSFCH), or sidelink sounding reference signals (SL-SRS).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, navigation device, Internet of Things (IoT) device, consumer asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1A, or possibly via the GMLC 125) and/or allow the external client 130 to receive location information regarding the UE 105 (e.g., via the GMLC 125).

The UE may include a single entity or may include multiple entities such as in a personal area network where a user may employ audio, video and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geographically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Base stations (base stations) in the NG-RAN 135 shown in FIG. 1A include NR Node Bs, referred to as the gNBs 110a and 110b, or sometimes referred to as base stations 110. Pairs of the gNBs 110a, 110b in the NG-RAN 135 may be connected to one another via one or more other gNBs. Access to the 5G network is provided to the UE 105 via wireless communication between the UEs and one or more of the gNBs 110a, 110b, which may provide wireless communications access to the 5GC 140 on behalf of the UE using 5G. In FIG. 1A, the serving gNB for the UE 105 is assumed to be the gNB 110b, although another gNB may act as a serving gNB if the UE 105 moves to another location or may act as a secondary gNB to provide additional throughput and bandwidth to the UE 105.

The base stations 110 may wirelessly communicate with the UEs 105. Each of the base stations 110 may provide communication coverage for a respective geographic coverage area. In an aspect, one or more cells may be supported by a base station 110 in each geographic coverage area. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro base stations 110 may partially overlap in geographic coverage areas (e.g., in a handover region), some of the geographic coverage areas may be substantially overlapped by a larger geographic coverage area. For example, a small cell base station may have a geographic coverage area that substantially overlaps with the geographic coverage area of one or more macro cell base stations. A network that includes both small cell and macro cell base stations may be known as a heterogeneous network. A heterogeneous network may also include home base stations, which may provide service to a restricted group known as a closed subscriber group (CSG).

The communication links between the base stations 110 and the UEs 105 may include uplink (also referred to as reverse link) transmissions from a UE 105 to a base station 110 and/or downlink (DL) (also referred to as forward link) transmissions from a base station 110 to a UE 105. The communication links may use MIMO (Multiple-In Multiple Out) antenna technology, including spatial multiplexing, beamforming, and/or transmit diversity. The communication links may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) (not shown) in communication with WLAN stations (STAs) (not shown) via communication links in an unlicensed frequency spectrum (e.g., 5 GHz). When communicating in an unlicensed frequency spectrum, the WLAN STAs and/or the WLAN AP may perform a clear channel assessment (CCA) or listen before talk (LBT) procedure prior to communicating in order to determine whether the channel is available.

The small cell base station 110 may operate in a licensed and/or an unlicensed frequency spectrum. When operating in an unlicensed frequency spectrum, the small cell base station 110 may employ LTE or NR technology and use the same 5 GHz unlicensed frequency spectrum as used by the WLAN AP. The small cell base station 110, employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

One or more base stations 110 in wireless communications system 100 may be millimeter wave (mmW) base station that may operate in mmW frequencies and/or near mmW frequencies in communication with a UE 105. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. A mmW base station 110 and the UE 105 may transmit using mmW or near mmW and may utilize beamforming (transmit and/or receive) over the communication link to compensate for the extremely high path loss and short range. It will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 110/180, UEs 105/182) operate is divided into multiple frequency ranges, FR1 (from 450 to 6000 MHz), FR2 (from 24250 to 52600 MHz), FR3 (above 52600 MHz), and FR4 (between FR1 and FR2). The mmW frequency bands generally include the FR2, FR3, and FR4 frequency ranges. As such, the terms "mmW" and "FR2" or "FR3" or "FR4" may generally be used interchangeably.

Base stations in the NG-RAN 135 shown in FIG. 1A may further include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNB s. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The base stations 110*a*, 110*b* may each comprise one or more TRPs, and accordingly, are sometimes referred to herein as TRP 110. For example, each sector within a cell of a base station may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110*a*, 110*b*, 114 and supported UE 105. The UEs may be dispersed throughout the wireless communications system 100, and each UE may be stationary or mobile. As part of the communication, each of the base stations 110*a*, 110*b*, 114 and UE 105 may support reference signal transmission for operations, including channel estimation, beam management and scheduling, and wireless device positioning within the coverage areas of one or more base stations.

For example, the base stations 110*a*, 110*b*, 114 (or distributed units or remote units, such as TPs) may transmit one or more downlink reference signals for NR communications, including channel state information reference signal (CSI-RS) transmission. Each of the CSI-RS transmissions may be configured for a specific UE 105 to estimate the channel and report channel quality information. The reported channel quality information may be used for scheduling or link adaptation at the base stations 110*a*, 110*b*, 114 or as part of a mobility or beam management procedure for directional transmission associated with the enhanced channel resources. Similarly, the UE 105 may be configured to transmit uplink signals to one or more base stations 110*a*, 110*b*, 114 (or distributed units or remote units, such as RPs) and sidelink transmissions with other UEs.

The base stations 110*a*, 110*b*, 114 (or distributed units or remote units, such as TPs) may transmit one or more additional downlink reference signals, including a positioning reference signal (PRS) transmission. The PRS transmission may be configured for a specific UE 105 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105 (such as global positioning system (GPS) technology).

A base station 110*a*, 110*b*, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110*a*, 110*b*, 114. The structure of the one or more PRS resources, PRS resource sets, and PRS resource settings within a PRS transmission may be referred to as a multi-level resource setting. For example, multi-level PRS resource setting of the base station 110*a*, 110*b*, 114 may include multiple PRS resource sets and each PRS resource set may contain a set of PRS resources (such as a set of 4 PRS resources).

The UE 105 may receive the PRS transmission over the one or more PRS resources of the slot. The UE 105 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx–Tx), a signal-to-noise ratio (SNR), or a reference signal receive quality (RSRQ).

Similarly, the UE 105 may be configured to transmit one or more additional uplink reference signals that may be received by base stations 110*a*, 110*b*, 114 (or distributed units or remote units, such as RPs) and used for positioning. For example, UEs 105 may transmit sounding reference signal (SRS) for positioning. Base stations 110*a*, 110*b*, 114 (or distributed units or remote units, such as RPs) that receive uplink reference signals from a UE 105 may perform positioning measurements, such as one or more of a time of arrival (TOA), reception to transmission difference (UE Rx–Tx).

Aspects of wireless communications system 100 may include use of downlink PRS transmissions received by the UE 105 or uplink SRS transmissions transmitted by the UE 105 for location determination. For downlink-based UE location determination, a location server, e.g., LMF 120 in a NR network, or E-SMLC in LTE (sometimes referred to as location server 120), may be used to provide positioning assistance, such as PRS assistance data (AD) to the UE. In UE-assisted positioning, the location server may receive measurement reports from the UE that indicates position measurements for one or multiple base stations 110*a*, 110*b*, 114 with which location server may determine a position estimate for the UE, e.g., using TDOA, or other desired techniques. The location server 120 is illustrated in FIG. 1A as being located in the core network 140, but may be external to the core network 140, e.g., in an NG-RAN.

A position estimation of the UE may be determined using reference signals, such as PRS signals or SRS for positioning signals, or other reference signals, from one or more base stations 110*a*, 110*b*, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations (multi-RTT). Additionally, sidelink based positioning may be used in which UEs transmit and/or receive sidelink positioning reference signals that are measured and used for positioning.

As noted, while FIG. 1A depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1A.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNB 110a, 110b, 114. The LMF 120 may support positioning of the UE 105 when the UE 105 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UE 105 and the core network 140, and provides QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1A, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1A, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. Communication between the LMF 120 and UE 105 using LPP protocol, may sometimes referred to herein as direct communication, as the messages are transparent to the serving gNB, i.e., the serving gNB does not need to understand the content of the message, but simply forwards the communication between the LMF 120 and UE 105. In contrast, during communications using NPP protocol, such as NRPPa, the serving gNB unpacks the message, picks out the content, which is packed and sent to UE, e.g., in a Uu air interface via Radio Resource Control (RRC), Medium Access Control-Control Element (MAC-CE), Downlink Control Information (DCI), etc. The LPP and/or NPP protocol may be used to support positioning of the UE 105 using UE-assisted and/or UE-based position methods such as A-GNSS, RTK, TDOA, AOA, AOD, and/or E-CID. The NRPPa protocol may be used to support positioning of the UE 105 using network-based position methods such as E-CID (e.g., when used with measurements obtained by the gNB 110a, 110b or the ng-eNB 114), UL TDOA, multi-RTT, etc. and/or may be used by the LMF 120 to obtain location related information from the gNBs 110a, 110b and/or the ng-eNB 114, such as parameters defining directional Synchronization Signal (SS) transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105 may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110a, 110b, the ng-eNB 114, and/or a WLAN AP. The location measurements may also or instead include measurements of GNSS pseudorange, code phase, and/or carrier phase for the SVs 190.

With a UE-based position method, the UE, e.g., UE 105, may obtain location measurements (e.g., which may be the same as or similar to location measurements for a UE-assisted position method) and may compute a location of the UE (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) (or distributed units or remote units), sidelink UEs, or APs may obtain location measurements (e.g., measurements of RSSI, RTT, RSRP, RSRQ, AOA, AOD, or Time of Arrival (ToA) for signals transmitted by the UE, e.g., UE 105) and/or may receive measurements obtained by the UE. The one or more base stations or APs may send the measurements to a location server (e.g., the LMF 120) for computation of a location estimate for the UE.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or TDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1A) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

Positioning for UEs in a radio network, such as communication system 100 shown in FIG. 1, typically uses Uu interfaces, i.e., radio interface between the UE and the radio access network, for DL PRS and/or UL PRS (sometimes referred to as Sounding Reference Signal (SRS) or SRS for positioning (SRSPos). Positioning for UEs may use sidelink PRS (SL-PRS), which may be a specific sidelink defined reference signal for positioning or may reuse Uu PRS, e.g., SRSPos, or other reference signals may be transmitted in the sidelink channel. Sidelink positioning may enhance UE positioning by providing an additional transmission (or reception) node.

Figure 1B:
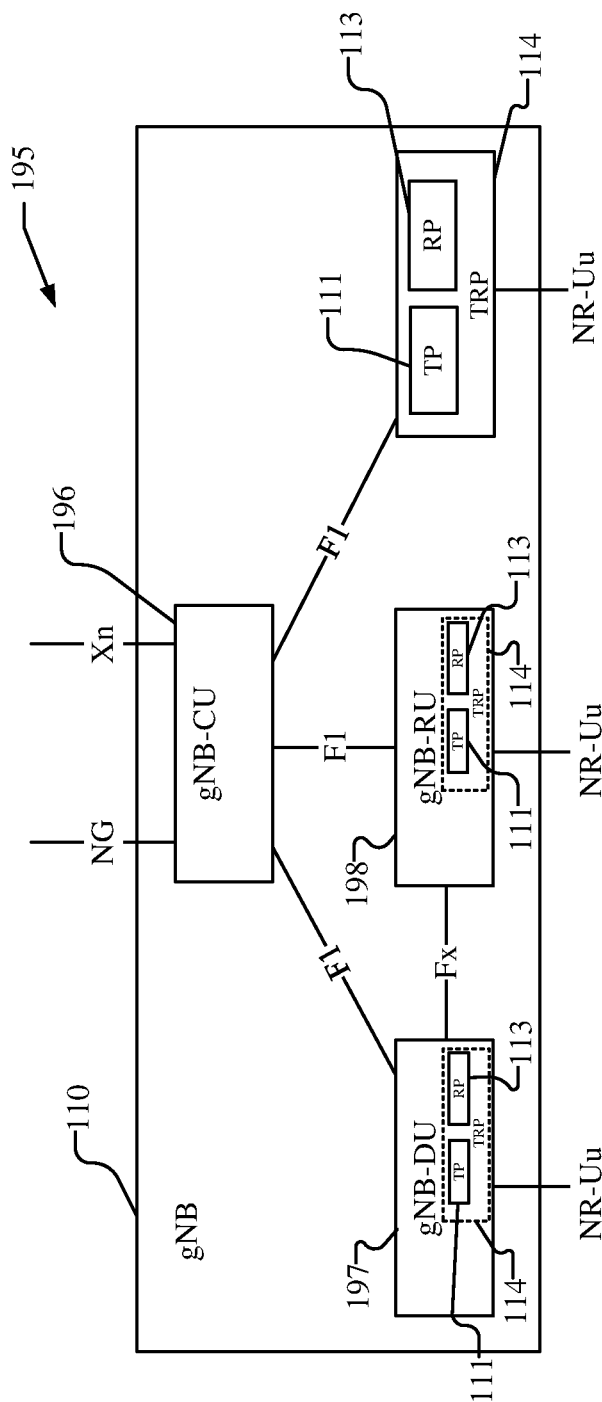
FIG. 1B shows an architecture diagram of a Transmission/Reception Point (TRP) within the RAN shown in FIG. 1A.

FIG. 1B shows an architecture diagram of an NG-RAN node 195 that may be within an NG-RAN 135 in FIG. 1A, e.g., as a separate entity or as part of another gNB. The NG-RAN node 195 may be a TRP 110, according to one implementation. The architecture shown in FIG. 1A, for example, may be applicable to any TRP 110 in FIG. 1A.

As illustrated, TRP 110 may include a gNB Central Unit (gNB-CU) 196, a gNB Distributed Unit (gNB-DU) 197, a gNB Remote Unit (gNB-RU) 198, which may be physically co-located in the TRP 110 or may be physically separate. The gNB-CU 196 is a logical or physical node hosting support for Radio Resource Control (RRC), Service Data Adaptation Protocol (SDAP) and Packet Data Convergence Protocol (PDCP) protocols of the TRP 110 used over the NR Uu air interface and controlling the operation of one or more gNB-DUs and/or gNB-RUs. The gNB-CU 196 terminates an F1 interface connected with a gNB-DU and in some implementations, an F1 interface connected with a gNB-RU. As illustrated, the gNB-CU 196 may communicate with an AMF via an NG interface. The gNB-CU 196 may further communicate with one or more other gNBs 110 via an Xn interface. The gNB-DU 197 is a logical or physical node hosting support for Radio Link Control (RLC), Medium Access Control (MAC) and Physical (PHY) protocol layers used over the NR Uu air interface of the TRP 110, operation of which is partly controlled by gNB-CU 196. The gNB-DU terminates the F1 interface connected with the gNB-CU 196, and may terminate a lower layer split point interface Fx with a gNB-RU. The gNB-RU 198 may be based on a lower layer function split and is a logical or physical node hosting support for lower layer functions, such as PHY and Radio Frequency (RF) protocol layers used over the NR Uu air interface of the TRP 110, operation of which is partly controlled by gNB-CU 196 and/or gNB-DU 197. The gNB-RU 198 terminates the Fx interface connected with the gNB-DU 197 and in some implementations may terminate the F1 interface connected with the gNB-CU 196.

The gNB-CU 196 requests positioning measurements (e.g. E-CID) to the gNB-DU 197 and/or gNB-RU 198. The gNB-DU 197 and/or gNB-RU 198 may report the measurements back to the gNB-CU 196. A gNB-DU 197 or gNB-RU 198 may include positioning measurement functionality. It should be understood that a separate measurement node is not precluded.

Additionally, as illustrated in FIG. 1B, TRP 110 may include a Transmission Point (TP) 111 and a Reception Point (RP) 113 combined into a Transmission Reception Point (TRP) 114, which may be physically or logically located in the TRP 110. The gNB-CU 196 may be configured to communicate with the TP 111 and RP 113, e.g., via F1 interfaces. The gNB-CU 196, thus, controls one or more TPs 111 and RPs 113 which are accessible from the gNB-CU 196 via an F1 interface.

In some embodiments, the NG-RAN node 195 (or gNB 110) may comprise a subset of the elements shown in FIG. 1B. For example, the NG-RAN node 195 may comprise the gNB-CU 196 but may not include one or more of gNB-DU 197 and gNB-RU 198, RP 113 or TP 111. Alternatively, NG-RAN node 195 may include one or more of gNB-DU 197 and, RP 113 or TP 111 but may not include gNB-RU 198. Further, the elements shown in FIG. 1B may be logically separate but physically co-located or may be partially or completely physically separate. For example, one or more of gNB-DU 197 and/or gNB-RU 198, RP 113 or TP 111 may be physically separate from gNB-CU 196 or may be physically combined with gNB-CU 196. In the case of physical separation, the F1 or Fx interface may define signaling over a physical link or connection between two separated elements. In some implementations, gNB-CU 196 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 197 and/or gNB-RU 198 to support NR Uu air interface signaling for control plane and user plane, respectively. However, only the gNB-CU-CP may interact with TPs 111 and RPs 113 to support and control location related communication.

Protocol layering between the gNB-CU 196 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 196 may comprise all location related procedures on NG, Xn, and NR-Uu interfaces. For example, the location procedures between AMF 115 and the NG-RAN node 195 may use NGAP. The location procedures between NG-RAN node 195 and other NG-RAN nodes, e.g., gNBs 110, may use XnAP or a protocol above XnAP, such as an extended NR Positioning Protocol A (NRPPa) as defined in 3GPP TS 38.455. The location procedures between NG-RAN node 195 and UE 105 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

Figure 2A:
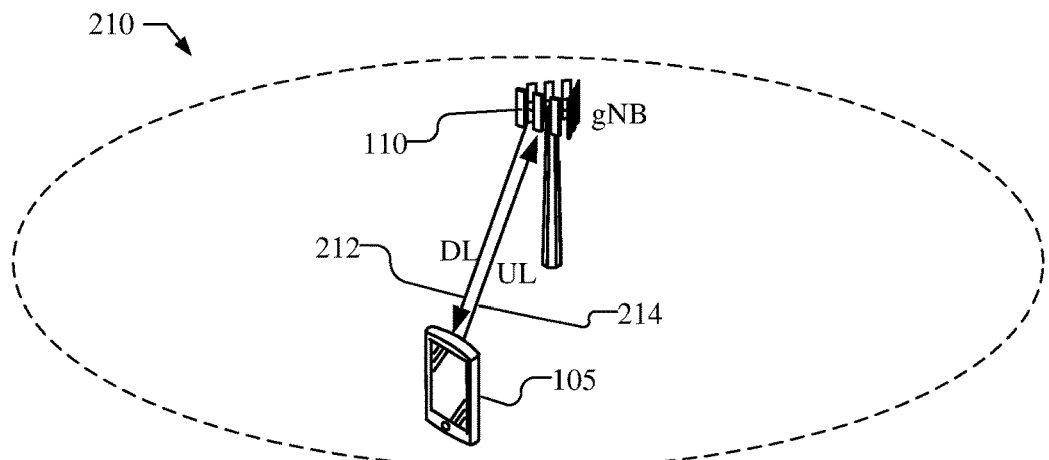
FIGS. 2A, 2B, and 2C illustrate various possible FR2 cell coverage environments.
Figure 2B:
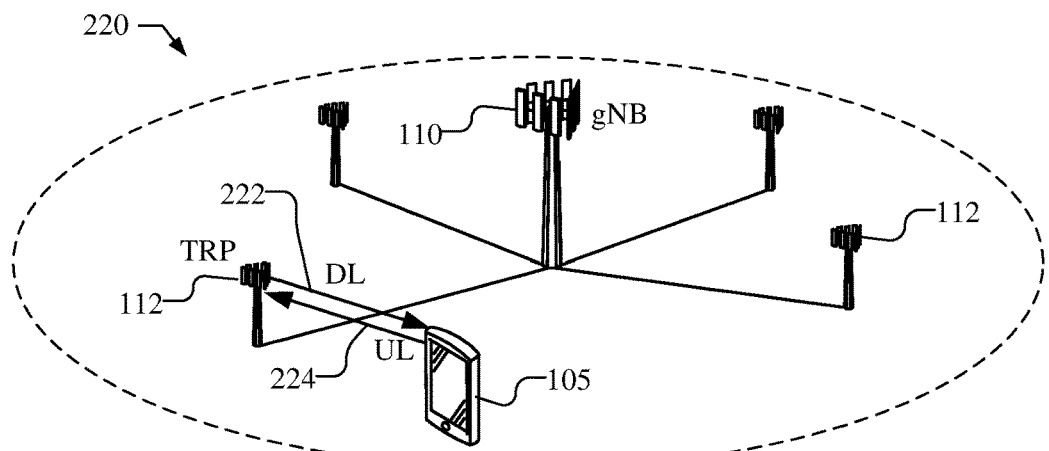
Figure 2C:
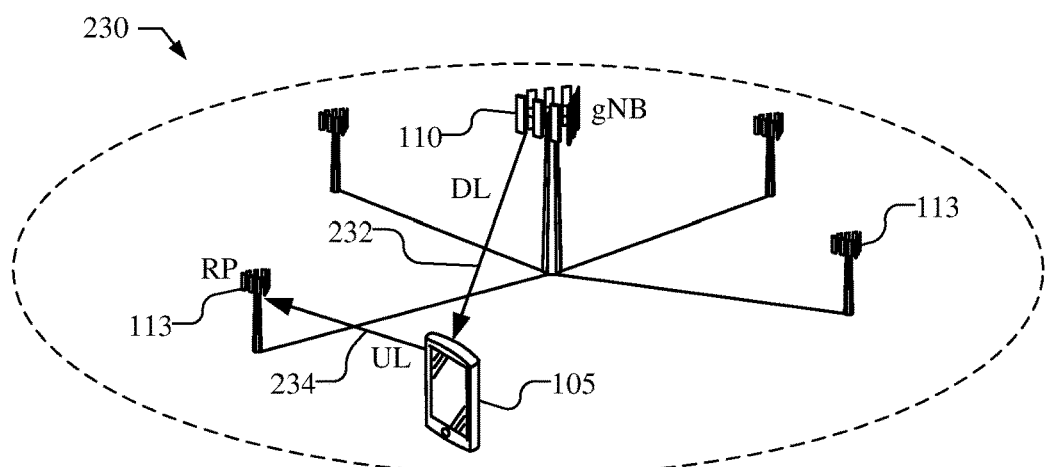

FIGS. 2A, 2B, and 2C illustrate various possible FR2 cell coverage environments 210, 220, and 230, respectively. FIG. 2A, for example, illustrates an environment 210 in which a single TRP 110 (e.g., gNB) and a UE 105 communicate via the same transmission link for the downlink (DL) and UL channels. As discussed above, communications using FR2 is limited due to FR2 cell coverage using FR2 is limited due to have high path losses and accordingly, have a relatively short range. Accordingly, the TRP 110 and UE 105 may employ beamforming to produce DL beams 212 and UL beams 214 to compensate for the extremely high path losses. Even with beamforming, however, the NR coverage in FR2 may be limited due to the high path losses. Accordingly, it may be desirable to increase the deployment density of base stations.

FIG. 2B, for example, illustrates an environment 220 in which deployment density is increased using a TRP 110 with multiple lower power TRPs 112. Thus, the UE 105 may communicate with a nearby TRP 112 via the same transmission link for the DL beams 222 and UL beams 224. The deployment of low-power TRPs 112, which may have a smaller number of antenna elements relative to the TRP 110, may be a cost effective way to improve the FR2 coverage area.

FIG. 2C illustrates an environment 230 in which deployment density is increased using a TRP 110 with reception only TRPs, referred to herein as reception points (RPs) 113. In the environment 230, the UE 105 may communicate via separate transmissions links for the DL channel and UL channel. For example, as illustrated, the UE 105 may receive DL beams 232 from the TRP 110 and may transmit UL beams 234 to the RP 113. The deployment of RPs 113 may improve FR2 coverage area with further reduced costs through the use of limited functionality TRPs, i.e., reception only TRPs.

The use of RPs 113, such as illustrated in FIG. 2C, results in separate transmissions links, which may impact positioning methods for the UE 105, e.g., due to the transmission point (TRP 110) and the reception point (RP 113) being located in separate physical geographic areas, separate beam reporting for DL and UL, power control, etc. For example, the use of RPs 113 may impact any positioning method that involves UL transmissions, e.g., SRS for positioning. Examples of positioning methods that may be impacted include UL AoA, RTT, and UL TDOA.

By way of example, UL AoA methods may be impacted from the derivation of beam direction, power, timing advance (TA), which is typically derived at least partially based on DL transmissions. The RTT methods may be impacted due to the implicit assumption in RTT that the time of flight in the DL and UL direction are the same. The UL TDOA methods may be impacted due to clock synchronization between RPs 113 and the TRP 110.

For beam transmissions of SRS for positioning by a UE 105, a path loss reference is used to derive the power at which the SRS should be transmitted to ensure that the SRS can be received with sufficient signal to noise ratio (SINR) to be measured by the receiving node. Transmitting SRS for positioning with sufficient power is a requirement for multiple UL positioning methods, including UL-AOA, UL-TDOA, and RTT.

Currently, the path loss reference for an SRS Resource set can only be a DL signal received by the UE 105 from a TRP 110. Table 1, for example, shows the Positioning SRS configuration as currently specified in Release 16 3GPP TS 38.331.

TABLE 1

| | |
|---|---|
| SRS-PosResourceSet-r16 ::= | SEQUENCE { |
| srs-PosResourceSetId-r16 | SRS-PosResourceSetId-r16, |
| srs-PosResourceIdList-r16 | SEQUENCE (SIZE(1..maxNrofSRS-ResourcesPerSet)) OF SRS-PosResourceId-r16 OPTIONAL, -- Cond Setup |
| resourceType-r16 | CHOICE { |
| aperiodic-r16 | SEQUENCE { |
| aperiodicSRS-ResourceTriggerList-r16 | SEQUENCE (SIZE(1..maxNrofSRS-TriggerStates-1)) OF INTEGER (1..maxNrofSRS-TriggerStates-1) OPTIONAL, -- Need M |
| ... | |
| }, | |
| semi-persistent-r16 | SEQUENCE { |
| ... | |
| }, | |
| periodic-r16 | SEQUENCE { |
| ... | |
| } | |
| }, | |
| alpha-r16 | Alpha         OPTIONAL, -- Need S |
| p0-r16 | INTEGER (−202..24)  OPTIONAL, -- Cond Setup |
| pathlossReferenceRS-Pos-r16 | CHOICE { |
| ssb-IndexServing-r16 | SSB-Index, |
| ssb-Ncell-r16 | SSB-InfoNcell-r16, |
| dl-PRS-r16 | DL-PRS-Info-r16 |
| } | OPTIONAL, -- Need M |
| ... | |
| } | |

A can be seen in Table 1, the current path loss reference for an SRS Resource set (pathlossReferenceRS) can be the SSB from the serving cell (ssb-IndexServing) or the neighboring cell (ssb-Ncell) or a downlink PRS (DL-PRS). In some implementations, CSI-RS may also be used as a path loss reference. Thus, the path loss reference for an SRS Resource set can only be a DL signal received by the UE 105 from a TRP 110.

For deployments in which reception points are used, e.g., RPs 113 shown in FIG. 2C, there is no specific DL beam which can be directly associated to the reception point, and accordingly, it may be undesirable to use a DL signal from the TRP 110 as a path loss reference for an SRS transmission to a RP 113.

Accordingly, where the UE 105 communicates via separate DL and UL channels, the path loss reference for transmission of the SRS for positioning may be determined, in one implementation, based on the path loss previously determined for other SRS signals, e.g., non-positioning SRS signals or SRS for positioning, which may be transmitted to a TRP or the same or different RP. In another implementation, e.g., in the absence of any other SRS which can be used as a path loss reference, the UE 105 may determine the path loss information in a feedback loop using SRS for positioning.

Figure 3:
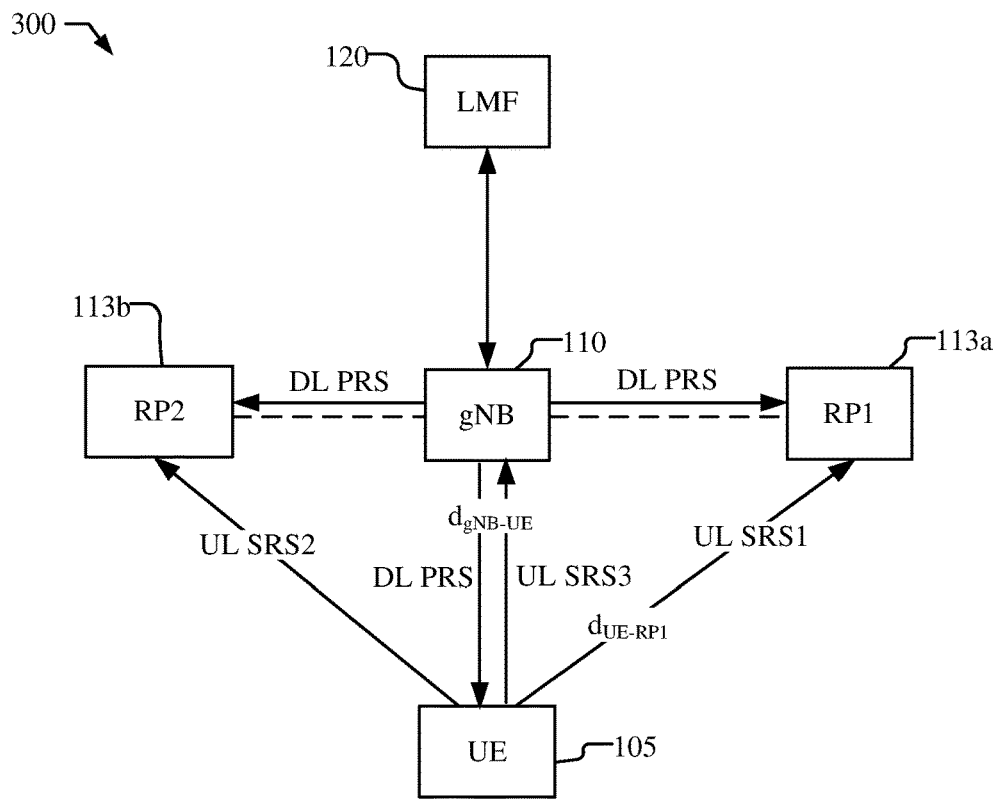
FIG. 3 illustrates a wireless communications system, in which a position of the UE may be determined using UL positioning methods using uplink (UL) sounding reference signals (SRS) transmitted by the UE to a number of reception points (RPs).

FIG. 3, for example, illustrates a wireless communications system 300, in which a position of the UE 105 may be determined using UL positioning methods, such as UL-AOA, UL-TDOA, using UL SRS for positioning sent to RPs, e.g., RP1 113*a* and RP2 113*b* (sometimes collectively referred to as RPs 113), on separate links than is used for receiving DL signals from TRP 110. As illustrated, the UE 105 may communicate with a location server (LMF 120) via the TRP 110 and RP1 113*a*. During a positioning session for the UE 105, the UE 105 may receive communications and DL PRS from TRP 110 and may transmit communications and UL SRS1 to RP1 113*a*, UL SRS2 to RP2 113*b*. In some implementations, the UE 105 may also transmit UL SRS3 to the TRP 110. Additionally, in some implementations, the DL PRS transmitted by TRP 110 may be received by the RPs 113. While FIG. 3 illustrates two RPs 113, additional (or fewer) RPs may be used in some implementations.

As discussed above, instead of using DL signals, e.g., SSB or DL PRS, from the TRP 110 to determine the path loss reference information for a SRS Resource set to be transmitted to RP1 113*a* or RP2 113*b* for positioning, the UE 105 may determine path loss reference information from other UL signals, such as non-positioning SRS signals or SRS for positioning. For example, if path loss reference information has been previously determined for other SRS signals (e.g., for non-positioning signaling or SRS for positioning that was previously transmitted, the path loss reference information may be used for a current SRS for positioning.

In another implementation, e.g., in the absence of any other SRS from which path loss reference information can be obtained, the UE 105 may determine the path loss information in a feedback loop using SRS for positioning. For example, the UE 105 may transmit an initial SRS for positioning (SRS-Pos) to RP1 113*a* with a predetermined path loss function. The predetermined path loss function, for example, may be based on the distance between TRP 110 and the UE 105 ($d_{gNB-UE}$), if the distance to the RP1 113*a* is unknown. If the distance between the UE 105 and RP1 113 ($d_{UE-RP1}$) is known or can be approximated, the predetermined path loss function may be based on that distance $d_{UE-RP1}$). The RP1 113*a* receives the transmitted initial SRS for positioning with the predetermined path loss function.

The RP1 113a may measure the signal strength of the initial SRS for positioning, e.g., as RSRP or RSSI, and may provide an indication of the signal strength to the TRP 110 and/or the LMF 120 from the RP1 113a. The TRP 110 or the LMF 120 may provide closed loop feedback to the UE 105 on the path loss reference values to be used for each subsequently transmitted SRS-Pos based on the signal strength measurements of the initial SRS for positioning. For example, the path loss reference values may be provided to the UE 105 in RRC, MAC-CE or DCI messages. In subsequent SRS for positioning transmissions to the RP1 113a, the UE 105 may use the new path loss reference values obtained from the TRP 110 or the LMF 120. A similar process may be used to obtain the path loss reference values to be used for SRS for positioning transmitted to other RPs, such as RP2 113b.

The TRP 110 or the LMF 120 may provide updated path loss reference values to the UE 105 as necessary (e.g., if the received signal strength of the SRS for positioning changes by more from than a threshold amount) or from time to time.

In some implementations, the path loss reference information may be specified per SRS resource set, e.g., so that all SRS resources within a resource set use the same path loss reference value. In some implementations, the path loss reference values may be configured for less than all of the resources in an SRS resource set, e.g., the same path loss reference value is used for a group (sub-set) of SRS resources in an SRS resource set or per individual SRS resource, which may improve the path loss of SRS resources.

The determination of path loss reference information for SRS for positioning using UL signals, such as previously transmitted SRS signals or SRS signals with a feedback loop from the TRP 110 or LMF 120, may be used with any positioning method that uses UL signals, including UL-AOA, UL-TDOA, and RTT.

Positioning methods using RTT may be impacted by the use of RPs 113 due to the implicit assumption in RTT that the time of flight in the DL and UL direction are the same. With the use of reception points that are not located in the same location as the transmission points, the UL SRS for positioning that is transmitted by the UE 105 may not be received at the same TRP as the one that transmitted the DL PRS.

In a conventional RTT method, the DL PRS signal is transmitted from the same entity that receives the UL SRS signal. The round trip time, as measured at the base station, may then be determined based on the difference in time between transmission of the DL PRS signal ($T_{PRS\_Tx}$) and reception of the UL SRS signal ($T_{SRS\_Rx}$), minus the turn-around time at the UE between the time of receiving the DL PRS signal ($T_{PRS\_Rx}$) and the transmitting the UL SRS signal ($T_{SRS\_Tx}$), e.g., as indicated in equation 1.

$$\text{RTT} = (T_{PRS\_Tx} - T_{SRS\_Rx}) - (T_{PRS\_Rx} - T_{SRS\_Tx}) \qquad \text{Eq. 1}$$

The distance ($d_{gNB-UE}$) between the base station and the UE may then be determined based on the RTT measurement as $d_{gNB-UE} = \text{RTT} \cdot c/2$, where c is the signal speed (e.g., speed of light). The distance $d_{gNB-UE}$ defines a circle around the base station, which has a known location, with the UE 105 located somewhere on the perimeter of the circle. With RTT measurements with respect to different base stations (multi-RTT), the position of the UE 105 may be determined based on the intersection of the circles, e.g., using multilateration.

As illustrated in FIG. 3, however, the TRP 110 may transmit a DL PRS signal to the UE 105 and the UE 105 may return an UL SRS-Pos signal to the RP1 113a, resulting in an asymmetric RTT measurement. The asymmetric RTT measurement accordingly uses the time of transmission of the DL PRS signal at the TRP 110 ($T_{gNB-PRS\_Tx}$) and the time of reception of the UL SRS signal at the RP 113 ($T_{RP-SRS\_Rx}$). Thus, the synchronization of the TRP 110 and the RP 113 is important for an accurate asymmetric RTT measurement.

There are three feasible options for synchronization between the TRP 110 and RP 113. The TRP 110 and RP 113, for example, may operate with independent clocks with an unknown offset between the clocks, or may operate with independent clocks with known offsets between each clock (e.g., the timing synchronization may be calibrated during deployment within RPs 113 connected to the TRP 110, but may be asymmetric across different gNBs), or may operate with a common clock that drives the TRP 110 and RPs 113. In practice, asymmetric RTT may not be feasible with the first synchronization option (independent clocks with an unknown offset), but may be feasible with the remaining synchronization options (i.e., independent clocks with known offsets or common clocks).

Figure 4:
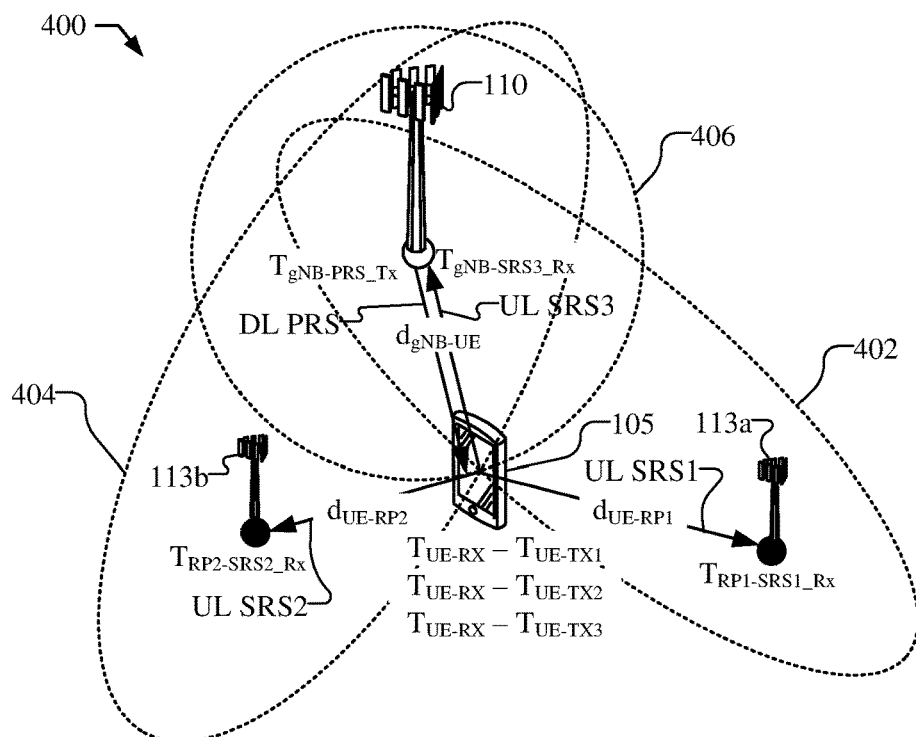
FIG. 4 illustrates a wireless communications system in which a position of the UE may be determined using an asymmetric round trip time (RTT) method using downlink positioning reference signals (PRS) from a TRP and received by the UE and UL SRS from the UE and received by an RP.

FIG. 4, for example, illustrates a wireless communications system 400, which may be similar to wireless communications system 300 shown in FIG. 3, and in which a position of the UE 105 may be determined using an asymmetric RTT method using DL PRS from a TRP 110 and UL SRS for positioning sent to RPs 113 and TRP 110.

In one implementation, the TRP 110 may transmit DL PRS to the UE 105 at a time $T_{gNB-PRS\_Tx}$, which is received by the UE 105. In response, the UE 105 transmits UL SRS, e.g., UL SRS1 towards RP1 113a. The UE 105 measures the Rx-Tx turn-around time between receiving the PRS resource and transmitting the SRS1 resource to RP1 113, e.g., $T_{UE-RX} - T_{UE-TX1}$, which the UE 105 may report to the location server 120 (shown in FIG. 3) via the RP 113a or TRP 110. The RP1 113a measures the receive time of the SRS1 resource ($T_{RP1-SRS\_Rx}$), which is provided to the TRP 110, e.g., via an F1 interface. The TRP 110 may correct any clock synchronization offset (if present) present in the receive time of the SRS1 resource ($T_{RP1-SRS\_Rx}$) at the RP1 113a and determine the Rx-Tx time difference between transmitting the DL PRS from the TRP 110 and receiving the UL SRS1 at the RP1 113a ($T_{gnB-Rx1} - T_{gNB-TX}$). The TRP 110 may provide the Rx-Tx time difference to the location server 120 (shown in FIG. 3) which may use the Rx-Tx time difference from the TRP 110 and RP1 113a and the Rx-Tx turn-around time from the UE 105 to determine the asymmetric RTT (A_RTT), e.g., as:

$$A\_\text{RTT} = T_{gNB-Rx} - T_{gNB-Tx} - T_{UE-Rx} - T_{UE-Tx} \qquad \text{Eq. 2}$$

As illustrated in FIG. 4, the distance between the TRP 110 and the UE 105 is $d_{gNB-UE}$, the distance between the UE 105 and the RP1 113a is $d_{UE-RP1}$. The Rx-Tx turn-around at the UE 105 between receiving the PRS resource and transmitting the SRS1 resource to RP1 113a, e.g., $T_{UE-RX} - T_{UE-TX1}$, is equivalent to a distance $d_{UE-Rx-Tx1}$, based on the speed of the signal transmission (i.e., d=t*c, where c is the speed of light). Similarly, the Rx-Tx time difference between transmissions of the DL PRS by the TRP 110 and reception of the UL SRS1 by the RP1 113a ($T_{gnB-Rx1} - T_{gNB-TX}$) is equivalent to a distance $d_{gNB-Rx1-Tx}$, based on the speed of the signal transmission (i.e., d=t*c, where c is the speed of light). The positioning equation for the asymmetric RTT for UE 105 with respect to TRP 110 and RP1 113a may be written as:

$$d_{gNB-UE} + d_{UE-Rx-Tx1} + d_{UE-RP1} = d_{gNB-Rx1-Tx} \qquad \text{Eq. 3}$$

The positioning equation of equation 3 is an ellipse with the positions of the TRP 110 and RP 113a serving as the foci. The locations of the TRP 110 and RP 113a are known to the LMF 120, which may accordingly determine an ellipse 402 for TRP 110 and RP 113a, where the UE 105 is located on the ellipse 402. The intersection of ellipse 402 with at least two other positioning measurements, such as asymmetric RTT, RTT, TDOA, etc., may be used to determine the position of the UE 105.

For example, as illustrated in FIG. 4, the LMF 120 may determine another ellipse 404 with TRP 110 and RP2 113b serving as the foci, using asymmetric RTT. Similar to ellipse 402, ellipse 404 for TRP 110 and RP2 113b may be determined based on the UE 105 measured Rx-Tx turn-around time between receiving the PRS resource and transmitting the SRS2 resource to the RP2 113b, e.g., $T_{UE-RX}-T_{UE-TX2}$, which the UE 105 may report to the location server 120, and the measured Rx-Tx time difference between transmitting the DL PRS from the TRP 110 and receiving the UL SRS2 at the RP2 113b ($T_{gNB-Rx2}-T_{gNB-Tx}$) after correcting any clock synchronization offset (if present) in the receive time of the SRS2 resource ($T_{RP2-SRS2\_Rx}$) at the RP2 113b, which the TRP 110 may report to the location server 120. If additional RPs 113 are present, the additional ellipses may be determined and used to determine the position of the UE 105. As illustrated in FIG. 4, RTT may be used to determine a circle 406 centered on the TRP 110 based on the UE 105 measured Rx-Tx turn-around time between receiving the PRS resource and transmitting the SRS3 resource to the TRP 110, e.g., $T_{UE-RX}-T_{UE-TX3}$, which the UE 105 may report to the location server 120, and the Rx-Tx time difference between transmitting the DL PRS from the TRP 110 and receiving the UL SRS3 at the TRP 110 ($T_{gNB-Rx3}-T_{gNB-Tx}$), which the TRP 110 may report to the location server 120.

Currently, in NR RTT, a UE 105 reports to a location server 120 only a single Rx-Tx turn-around time (nr-UE-RxTxTimeDiff) per TRP. Table 2, for example, illustrates the RTT measurements reported by a UE as currently specified in Release 16 3GPP TS 37.355.

The Rx-Tx turn-around time, i.e., the UE Rx-Tx time difference, may be defined as $T_{UE-Rx}-T_{UE-TX}$, $T_{UE-RX}$ is the UE received timing of downlink subframe #i from a Transmission Point (TP), e.g., TRP 110 in FIG. 4, defined by the first detected path in time, while $T_{UE-TX}$ is the UE transmit timing of uplink subframe #j that is closest in time to the subframe #i received from the TP. Multiple DL PRS resources may be used to determine the start of one subframe of the first arrival path of the TP. For frequency range 1, the reference point for $T_{UE-RX}$ measurement may be the Rx antenna connector of the UE and the reference point for $T_{UE-TX}$ measurement may be the Tx antenna connector of the UE. For frequency range 2, the reference point for $T_{UE-RX}$ measurement may be the Rx antenna of the UE and the reference point for $T_{UE-TX}$ measurement may be the Tx antenna of the UE.

The gNB Rx-Tx time difference may be defined generally as $T_{gNB-RX}-T_{gNB-TX}$, where $T_{gNB-Rx}$ is the Transmission and Reception Point (TRP), e.g., TRP 110 in FIG. 4, received timing of uplink subframe #i containing SRS associated with UE, defined by the first detected path in time, which for asymmetric RTT may be the determined at the reception point RP 113 and corrected for any clock synchronization error, e.g., offset, and $T_{gNB-TX}$ is the TRP transmit timing of downlink subframe #j that is closest in time to the subframe #i received from the UE. Multiple SRS resources for positioning may be used to determine the start of one subframe containing SRS. The reference point for $T_{gNB-RX}$ may be: for type 1-C base station TS 38.104: the Rx antenna connector, for type 1-O or 2-O base station TS 38.104: the Rx antenna (i.e. the center location of the radiating region of the Rx antenna), for type 1-H base station TS 38.104: the Rx Transceiver Array Boundary connector. The reference point for $T_{gNB-TX}$ may be: for type 1-C base station TS 38.104: the Tx antenna connector, for type 1-O or 2-O base station TS 38.104: the Tx antenna (i.e. the center location of the radiating region of the Tx antenna), for type 1-H base station TS 38.104: the Tx Transceiver Array Boundary connector.

Thus, as can be seen in Table 2, in conventional RTT, the UE reports only one RTT measurement per TRP. The PRS

TABLE 2

| | |
|---|---|
| NR-Multi-RTT-MeasList-r16 ::= | SEQUENCE (SIZE(1..nrMaxTRPs-r16)) OF NR-Multi-RTT-MeasElement-r16 |
| NR-Multi-RTT-MeasElement-r16 ::= | SEQUENCE { |
|   dl-PRS-ID-r16 | INTEGER (0..255), |
|   nr-PhysCellID-r16 | NR-PhysCellID-r16    OPTIONAL, |
|   nr-CellGlobalID-r16 | NCGI-r15    OPTIONAL, |
|   nr-ARFCN-r16 | ARFCN-ValueNR-r15    OPTIONAL, |
|   nr-DL-PRS-ResourceID-r16 | NR-DL-PRS-ResourceID-r16    OPTIONAL, |
|   nr-DL-PRS-ResourceSetID-r16 |   NR-DL-PRS-ResourceSetID-r16 OPTIONAL, |
|   nr-UE-RxTxTimeDiff-r16 | CHOICE { |
|     k0-r16 | INTEGER (0..1970049), |
|     k1-r16 | INTEGER (0..985025), |
|     k2-r16 | INTEGER (0..492513), |
|     k3-r16 | INTEGER (0..246257), |
|     k4-r16 | INTEGER (0..123129), |
|     k5-r16 | INTEGER (0..61565), |
|     ... | |
| }, | |
|   nr-AdditionalPathList-r16 | NR-AdditionalPathList-r16    OPTIONAL, |
|   nr-TimeStamp-r16 | NR-TimeStamp-r16, |
|   nr-TimingQuality-r16 | NR-TimingQuality-r16, |
|   nr-DL-PRS-RSRP-Result-r16 | INTEGER (0..126)    OPTIONAL, |
|   nr-Multi-RTT-AdditionalMeasurements-r16 | |
| | NR-Multi-RTT-AdditionalMeasurements-r16 OPTIONAL, |
|   ... | |
| } | | resource from the TRP that is selected for measurement is indicated in the measurement report. The measurement report is not dependent on when the SRS resource was transmitted, it is only the relative time (distance) between the received PRS and the transmitted SRS.

As illustrated in FIG. 4, however, with asymmetric RTT, the UE 105 may generate multiple Rx-Tx time difference measurements based on one DL PRS resource, where each measurement is associated with a different UL SRS resource transmission. Accordingly, in some implementations, for asymmetric RTT measurements, the UE 105 may report more than one RTT measurement per PRS resource. For example, in FIG. 4, multiple Rx-Tx time differences are measured by the UE 105 for UL SRS resource transmissions to different nodes (illustrated in FIG. 4 as RPs 113a, 113b, and TRP 110) resulting in multiple measurements $T_{UE-RX}-T_{UE-TX1}$, $T_{UE-RX}-T_{UE-TX2}$, and $T_{UE-RX}-T_{UE-TX3}$, each of which is relative to the same DL PRS resource received by the UE 105 at time $T_{UE-RX}$. Many of the SRS resources may be transmitted in directed beams for each RP 113. Each of these SRS resources may be transmitted from different panels and thus potentially with different TAs, etc. For example, the direction of transmission of the directed beam for an RP 113 may be different than the direction of the beam used to receive the DL PRS from the TRP (TRP 110). Accordingly, each transmitted SRS beam may have a different Rx-Tx time difference, and thus, the Rx-Tx time difference may be reported for teach SRS beam. For each of the multiple RTT measurements associated with the same DL PRS recourse, the UE may also report the SRS resource ID for which the report is being generated. Further, for each of the multiple RTT measurements associated with the same DL PRS resource, the UE may also report a time stamp for which the report is being generated.

Positioning methods based on UL TDOA may also be impacted by the use of RPs 113. For example, UL TDOA may not rely on the synchronization between the TRP 110 and RPs 113, but may rely on the existence of a LOS path between the TRP 110 and the RPs 113. The TRP 110 and RPs 113 generally have known fixed positions, and, accordingly, the presence of a LOS path may be determined and relied upon for extended times, e.g., until an intervening structure is erected between the TRP 110 and RPs 113.

During UL TDOA, the RPs 113 may observe the Rx-Rx time difference between the reception of the DL PRS from the TRP 110 and the reception of the UL SRS transmission from the UE 105. The DL PRS from the TRP 110 and the UL SRS from the UE 105 may be on different beams.

Figure 5:
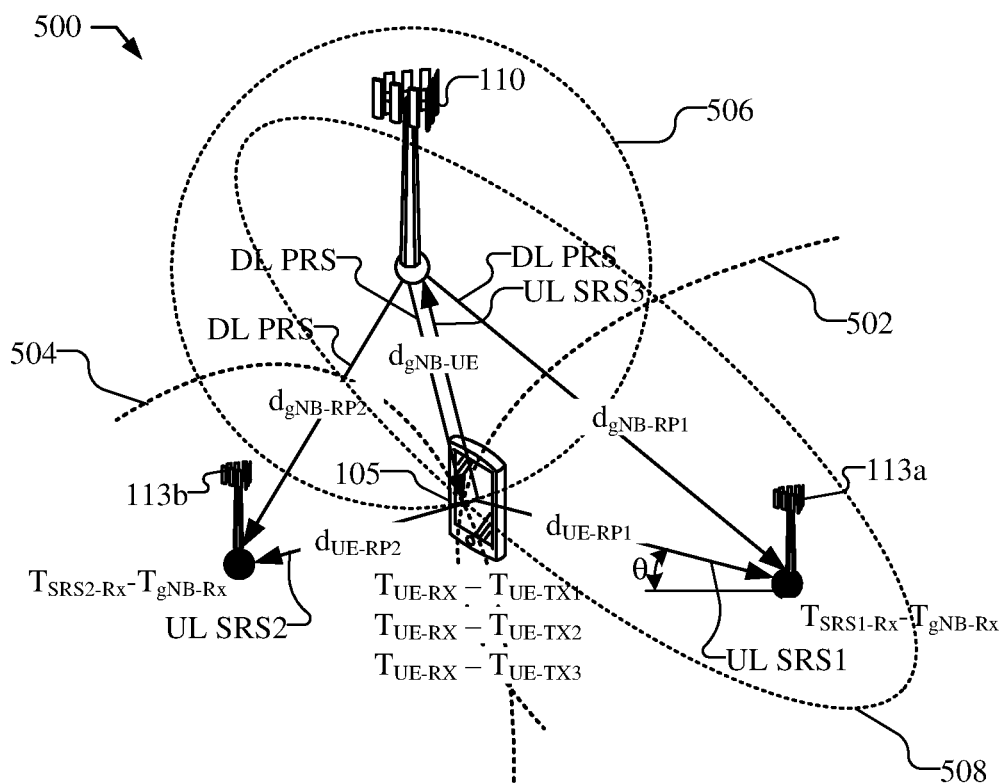
FIG. 5 illustrates a wireless communications system in which a position of the UE may be determined using UL time difference of arrival (TDOA) measurements from RPs.

FIG. 5, for example, illustrates a wireless communications system 500, which may be similar to wireless communications system 300 shown in FIG. 3 and wireless communications system 400 shown in FIG. 4, and in which a position of the UE 105 may be determined using UL TDOA Rx-Rx time difference measurements from RPs 113. As illustrated, RP1 113a may measure the Rx-Rx time difference ($T_{SRS1\_RX}-T_{PRS\_RX}$) between reception of UL SRS1 from UE 105 and DL PRS from TRP 110, and RP2 113b may measure the Rx-Rx time difference ($T_{SRS2\_RX}-T_{PRS\_RX}$) between reception of UL SRS2 from UE 105 and DL PRS from TRP 110.

As illustrated in FIG. 5, the distance between the TRP 110 and the UE 105 is $d_{gNB-UE}$, the distance between the UE 105 and the RP1 113a is $d_{UE-RP1}$, and the distance between the TRP 110 and the RP1 113a is $d_{gNB-RP1}$. The Rx-Tx turn-around at the UE 105 between receiving the PRS resource and transmitting the SRS1 resource to RP1 113a, e.g., $T_{UE-Rx}-T_{UE-TX1}$, is equivalent to a distance $d_{UE-Rx-Tx1}$, based on the speed of the signal transmission (i.e., d=t*c, where c is the speed of light). Similarly, the Rx-Rx time difference between reception of the UL SRS1 by the RP1 113a and reception of the DL PRS by the RP1 113a ($T_{SRS1\_Rx1}-T_{PRS\_Rx}$) is equivalent to a distance $d_{SRS1\_Rx-PRS\_Rx}$, based on the speed of the signal transmission (i.e., d=t*c, where c is the speed of light). The positioning constraints for UL TDOA for RP1 113a may then be expressed as:

$$d_{SRS1\_Rx-PRS\_Rx}+d_{gNB-RP1}=d_{gNB-UE}+d_{UE-Rx-Tx1}+d_{UE-RP1} \quad \text{Eq. 4}$$

The positioning equation of equation 4 is a hyperbola. The locations of the TRP 110 and RP 113a are known to the LMF 120, which may accordingly determine the hyperbola 502 for TRP 110 and RP 113a, where the UE 105 is located on the hyperbola 502. The intersection of hyperbola 502 with at least two other positioning measurements, such as another hyperbola 504 from TDOA using RP2 113b, or using asymmetric RTT, RTT, AOA, etc., may be used to determine the position of the UE 105.

For example, as illustrated in FIG. 5, the AOA θ for the UL SRS1 received by the RP 113 may be measured relative to a reference direction and reported to the LMF 120 to be used along with the hyperbola 502 to determine the position of the UE 105.

Additionally, as illustrated in FIG. 5, RTT with respect to the TRP 110 may be used to determine a circle 506 centered on the TRP 110 based on the UE 105 measured Rx-Tx turn-around time between receiving the PRS resource and transmitting the SRS3 resource to the TRP 110, e.g., $T_{UE-Rx}-T_{UE-TX3}$, which the UE 105 may report to the location server 120, and the Rx-Tx time difference between transmitting the DL PRS from the TRP 110 and receiving the UL SRS3 at the TRP 110 ($T_{gNB-Rx3}-T_{gNB-Tx}$), which the TRP 110 may report to the location server 120.

It may be noted that the UL TDOA method using RPs 113 does rely on the synchronization between the TRP 110 and RP 113, but does rely on the existence of an LOS path between the TRP 110 and the RP 113. Accordingly, the UL TDOA is an independent equation from the asymmetric RTT method. If both synchronization conditions and LOS conditions are valid, then UL TDOA may be used along with asymmetric RTT, which may produce an ellipse 508 as discussed above, to determine the position of the UE 105.

Thus, with the UL TDOA method to produce hyperbola 502, along with at least two other measurements, such as hyperbola 504 determined from TDOA using RP2 113b, angle θ determined from AOA by RP1 113a, circle 506 determined from RTT by TRP 110, or ellipse 508 determined by asymmetric RTT by TRP 110 and RP1 113a, the position of the UE 105 may be determined.

Accordingly, in some implementations, a hybrid positioning method may be used in which different types of measurements may be reported to the LMF 120. The LMF 120 may synthesize the different measurement varieties and produce the final solution to the UE position. The measurements may be reported conditionally in the hybrid method. For example, each measurement may be checked against an estimate of the conditions it is to satisfy. For example, measurements may be checked against other measurements and also on certain conditions. If it is assumed that the clocks across all RPs are synchronous, for example, after computing the UE location, the distances may be computed and whether the clock offset is within a tolerance value may be verified. Further, the TDOA technique may be used only if there is a LOS between the TRP 110 and the RPs 113. If the LOS condition holds, then the Rx-Rx time difference measurements at the RPs 113 may be reported. Further, as discussed above, asymmetric RTT is valid under the condition of clock synchronization (up to a known offset). If the condition holds, the measurement of the RPs 113 may be reported. Note that for asymmetric RTT, the difference between the PRS transmission time (denoted T1) by the TRP 110 and its reception time at the RP 113, denoted T2 should be known. The RP 113 may measure T2 and report the measurement to the positioning entity (either the TRP 110 or LMF 120) which will compute the time difference T1-T2 (if there is a clock offset, that will be included as well, e.g., T1-T2+offset).

Figure 6:
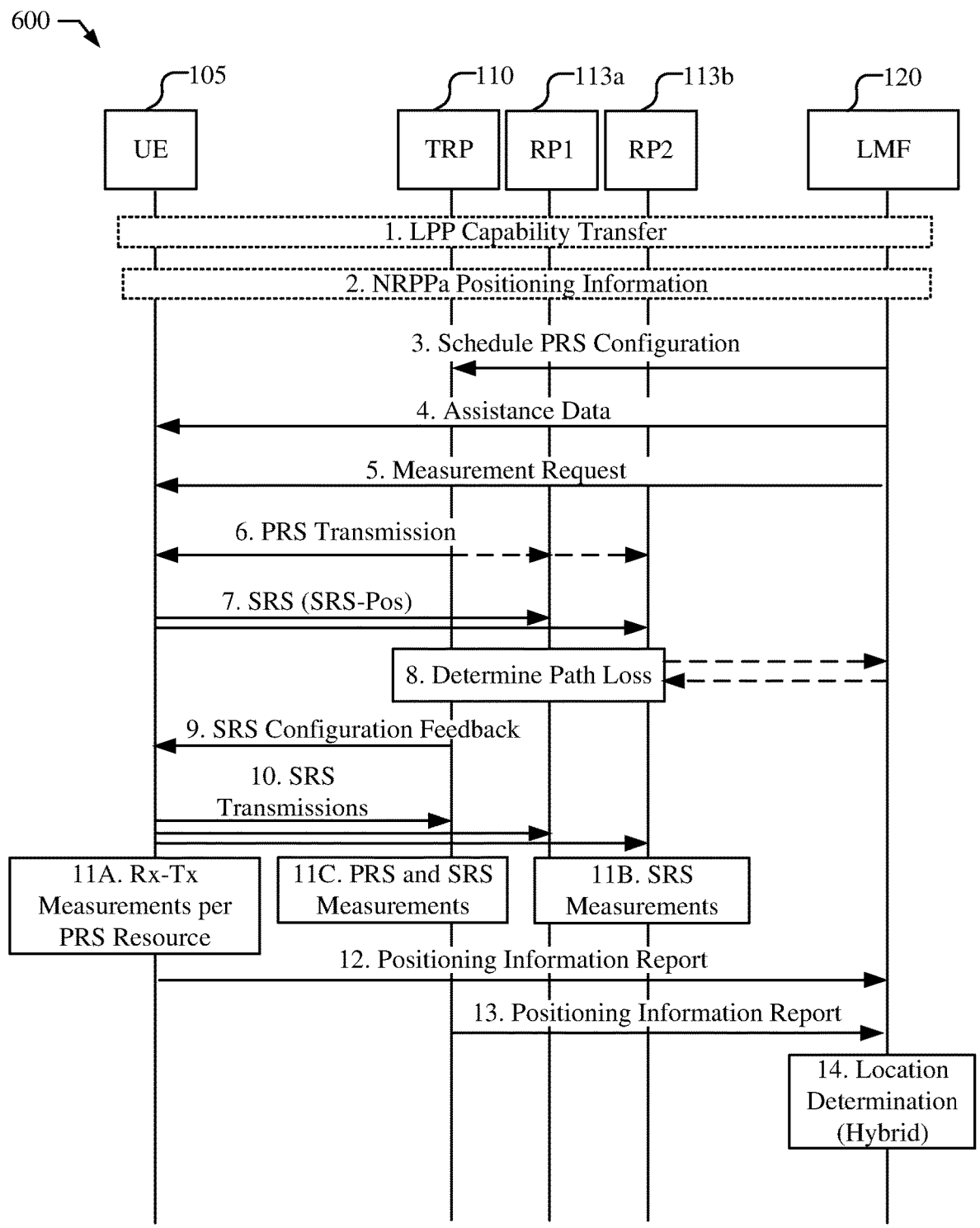
FIG. 6 is a message flow illustrating messaging between a location server, a TRP, RPs and the UE for positioning using reception points, as described herein.

FIG. 6 is a message flow 600 illustrating messaging between a location server, e.g., LMF 120, a TRP 110, which may be, e.g., a gNB, reception points, e.g., RP1 113*a* and RP2 113*b*, and the UE for positioning using reception points, as described herein. While FIG. 6 illustrates the use of TRP 110 serving as base station for the UE 105 and LMF 120 serving as a location server, it should be understood that the positioning is not so limited and that the position procedure may use different types of base stations, such as eNBs, or location servers, such as SLP, E-SMLC, or location servers completely or partially located within the base station may be used.

As discussed above, the procedure illustrated in FIG. 6 uses DL PRS from TRP 110 to the UE 105 and UL SRS from the UE 105 to one or more reception points, RP1 113*a* and 113*b*, and may support position methods such as UL-TDOA, UL-AOA, and asymmetric RTT. It should be understood that in some implementations, additional position methods including RTT, etc. may be used. It should be further understood that the signaling illustrated in FIG. 6 is for the sake of example, and that in some implementations additional messages, different messages, or fewer messages may be used for UE positioning.

At stage 1, the LMF 120 may optionally request the positioning capabilities of the UE 105 (e.g., if not already obtained) using a LPP Capability Transfer procedure, and the UE 105 may provide its capabilities to the LMF 120, e.g., in an LPP Provide Capabilities message, e.g., described in 3GPP TS 38.305.

At stage 2, the LMF 120 may perform a NRPPa Positioning Information and Activation procedure, e.g., in which a NRPPa Positioning Information Request message may be sent to the TRP 110, which may determine the resources available for UL SRS for itself and RPs 113. The TRP 110 may configure the UE 105 with the UL SRS configuration information for UL SRS transmission to RPs 113 and to TRP 110. The TRP 110 may provide the UL SRS configuration information to the LMF 120 in a NRPPa Positioning Information Response message.

At stage 3, the LMF 120 may send a message to the TRP 110 to schedule the PRS configuration.

At stage 4, the LMF 120 sends a LPP Provide Assistance Data message to the UE 105. The message includes any required assistance data for the UE 105 to receive DL PRS and perform the necessary DL PRS measurements (e.g. includes PRS configuration information sent or received by LMF 120 at stage 2).

At stage 5, the LMF 120 sends a LPP Request Location Information message to the UE 105 to request positioning measurements, such as UE Receive Time-Transmission Time difference (Rx-Tx), to support desired positioning methods that include the RPs 113, such as UL AOA, UL TDOA, asymmetric RTT, and any other desired measurements, such as RTT with TRP 110. The Request Location Information message may further indicate the type of positioning methods to be used, e.g., UL AoA, UL TDOA, asymmetric RTT, etc.

At stage 6, the TRP 110 transmits the DL PRS which is received by the UE 105, and optionally received by one or both of the RP1 113*a* and RP2 113*b*.

At stage 7, the UE 105 may transmit an initial UL SRS, e.g., to RP1 113*a* and RP2 113*b*, which may be used as a path loss reference as discussed in FIG. 3. For example, stage 7 may be used if the path loss to RPs 113 has not been previously determined, e.g., by an earlier transmitted UL SRS or UL SRS for positioning. The initial SRS, for example, may be transmitted with a predetermined path loss function, which may be based on a distance between the TRP 110 and the UE 105 or an estimation of the distance between the RPs 113 and the UE 105. The RPs 113 may measure an indication of the signal strength, e.g., RSSI, of the received UL SRS.

At stage 8, the TRP 110 may determine the path loss of the initial UL SRS from stage 7 based on the pre-determined path loss function and the measured signal strength from the RPs 113, which is provided to the TRP 110, e.g., in a F1 interface with the RPs 113. In some implementations, the measured signal strength and/or determination of path loss may be provided to the LMF 120, which may provide the path loss reference values or validation of path loss reference values to the TRP 110, as indicated with the dotted arrows.

At stage 9, the TRP 110 may provide an SRS configuration feedback message to the UE 105 with an indication of the path loss reference values to be used for each subsequently transmitted UL SRS based on the signal strength measurements of the initial SRS for positioning by the RPs 113 and the pre-determined path loss function of the initial SRS transmitted in stage 7. The path loss reference value provided in stage 9 may be configured for less than all SRS resources in an SRS resource set, e.g., a group (sub-set) of SRS resources in the SRS resource set or per individual SRS resource.

At stage 10, the UE 105 may transmit UL SRS, e.g., to RP1 113*a*, RP2 113*b*, and in some implementations to TRP 110.

At stage 11A, the UE 105 measures a separate Rx-Tx time difference between receiving the PRS resource, illustrated at stage 6, and transmitting the UL SRS resource to each receiving node, e.g., RP1 113*a*, RP2 113*b*, and in some implementations to TRP 110.

At stage 11B, each of the RPs 113 perform one or more SRS measurements, as discussed in FIGS. 4 and 5, such as the reception time of the UL SRS for asymmetric RTT and/or Rx-Rx time differences between reception of the UL SRS and DL PRS for UL TDOA and/or UL AOA.

At stage 11C, the TRP 110 may perform PRS and SRS measurements based on the measurements from RPs 113 performed in stage 11B (received by the TRP 110, e.g., via the F1 interface). For example, the TRP 110 may generate Rx-Tx time difference between transmission of the PRS and reception of the SRS by one or more of the RPs 113 if the clocks of the TRP 110 and RPs 113 are synchronized or have an unknown offset, as discussed in FIG. 4. The gNB may further generate an Rx-Tx time difference for RTT positioning measurements if UL SRS was transmitted to the TRP 110. The TRP 110 may further receive the Rx-Rx time difference measured by the RPs 113 in stage 11B or any other measurements, such as UL AOA.

At stage 12, the UE 105 sends a positioning information report in an LPP Location Information Report message to the LMF 120 that includes the positioning measurements performed by the UE 105 in stage 11A. The positioning information, for example, includes multiple positioning measurements per DL PRS resource.

At stage 13, the TRP 110 sends a positioning information report to the LMF 120 in an NRPPa Measurement Response messages that includes the positioning measurements generated by the TRP 110 or collected by the TRP 110 at stages 11B and 11C.

At stage 14, the LMF 120 determines the position of the UE 105 based on the positioning information received from the UE 105 and TRP 110 at stages 12 and 13. The LMF 120 may determine the position of the UE 105 using a hybrid positioning method that includes multiple different positioning measurements, at least one of which includes an RP 113, to determine a position for the UE 105. For example, the LMF 120 may use any combination of UL TDOA, UL AOA, asymmetric RTT, or RTT, as discussed in FIG. 5.

Figure 7:
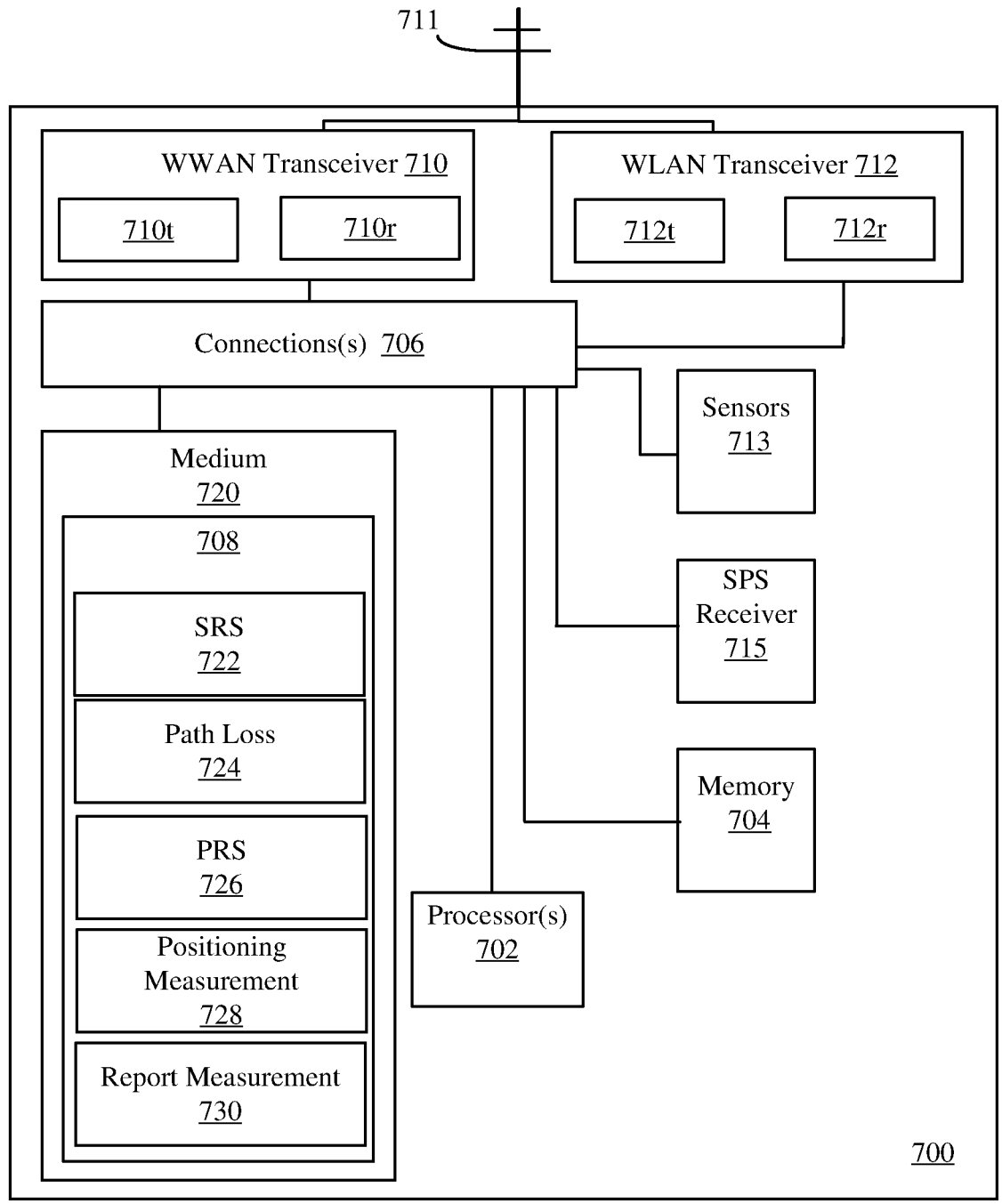
FIG. 7 shows a schematic block diagram illustrating certain exemplary features of a UE that is configured to support position determination of the UE using one or more reception points.

FIG. 7 shows a schematic block diagram illustrating certain exemplary features of a UE 700, e.g., which may be UE 105 shown in FIG. 1, that is configured to support position determination of the UE using one or more reception points, as discussed herein. The UE 700, for example, may perform the signal flows shown in FIG. 6 and the process flow shown in FIGS. 11 and 13 and algorithms disclosed herein. The UE 700 may, for example, include one or more processors 702, memory 704, an external interface such as at least one wireless transceiver (e.g., wireless network interface) illustrated as Wireless Wide Area Network (WWAN) transceiver 710 and Wireless Local Area Network (WLAN) transceiver 712, SPS receiver 715, and one or more sensors 713, which may be operatively coupled with one or more connections 706 (e.g., buses, lines, fibers, links, etc.) to non-transitory computer readable medium 720 and memory 704. The wireless transceiver (e.g. WWAN transceiver 710 and/or WLAN transceiver 712) may further include transceivers for Wireless Personal Area Network (WPAN), Wireless Metropolitan Area Network (WMAN), etc. The SPS receiver 715, for example, may receive and process SPS signals from SVs 190 shown in FIG. 1A. The one or more sensors 713, for example, may include a barometer and/or an inertial measurement unit (IMU) that may include one or more accelerometers, one or more gyroscopes, a magnetometer, etc. The UE 700 may further include additional items, which are not shown, such as a user interface that may include e.g., a display, a keypad or other input device, such as virtual keypad on the display, through which a user may interface with the UE. In certain example implementations, all or part of UE 700 may take the form of a chipset, and/or the like.

The at least one wireless transceiver may be a transceiver 710 for a WWAN communication system and a transceiver 712 for a WLAN communication system, or may be a combined transceiver for both WWAN and WLAN. The WWAN transceiver 710 may include a transmitter 710*t* and receiver 710*r* coupled to one or more antennas 711 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 712 may include a transmitter 712*t* and receiver 712*r* coupled to one or more antennas 711 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 710*t* and 712*t* may include multiple transmitters that may be discrete components or combined/integrated components, and/or the receivers 710*r* and 712*r* may include multiple receivers that may be discrete components or combined/integrated components. The WWAN transceiver 710 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio (NR) may use mm-wave frequencies and/or sub-6 GHz frequencies. The WLAN transceiver 712 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The wireless transceivers 710 and 712 may be communicatively coupled to a transceiver interface, e.g., by optical and/or electrical connection, which may be at least partially integrated with the wireless transceivers 710 and 712.

In some embodiments, UE 700 may include antenna 711, which may be internal or external. UE antenna 711 may be used to transmit and/or receive signals processed by wireless transceivers 710 and 712. In some embodiments, UE antenna 711 may be coupled to wireless transceivers 710 and 712. In some embodiments, measurements of signals received (transmitted) by UE 700 may be performed at the point of connection of the UE antenna 711 and wireless transceivers 710 and 712. For example, the measurement point of reference for received (transmitted) RF signal measurements may be an input (output) terminal of the receiver 710*t* (transmitter 710*t*) and an output (input) terminal of the UE antenna 711. In a UE 700 with multiple UE antennas 711 or antenna arrays, the antenna connector may be viewed as a virtual point representing the aggregate output (input) of multiple UE antennas. In some embodiments, UE 700 may measure received signals including signal strength and TOA measurements and the raw measurements may be processed by the one or more processors 702.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of UE 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in UE 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include an SRS module 722 that when implemented by the one or more processors 702 configures the one or more processors 702 to transmit, via the wireless transceiver 710, SRS for positioning to one or more RPs and in some implementations, a TRP, e.g., in response to receiving a DL PRS from the TRP. A different SRS resource may be transmitted via a directed beam to each receiving node, e.g., the one or more RPs and TRP.

The medium 720 and/or memory 704 may include a path loss module 724 that when implemented by the one or more processors 702 configures the one or more processors 702 to configure the SRS resources to each receiving node with path loss reference values. The SRS resources may be configured using a pre-determined path loss function, which may be based on the distance between the TRP and the UE. The one or more processors 702 may be configured to receive, via the wireless transceiver 710, path loss reference values from the TRP, which may be determined, e.g., based on an initial SRS transmitted to RPs using the pre-determined path loss function. The one or more processors 702 may be configured to configure subsequent SRS resources to each receiving node with the received path loss reference values. The one or more processors 702 may be configured to configure less than all SRS resources in an SRS resource set, e.g., a group of SRS resources or an individual SRS resource, based on the received path loss reference values.

The medium 720 and/or memory 704 may include a PRS module 726 that when implemented by the one or more processors 702 configures the one or more processors 702 to receive, via the wireless transceiver 710, a DL PRS resource from a TRP.

The medium 720 and/or memory 704 may include positioning measurement module 728 that when implemented by the one or more processors 702 configures the one or more processors 702 to generate positioning measurements for UL SRS for positioning to one or more RPs. The one or more processors 702, for example, may generate a plurality of Rx–Tx time difference measurements with respect to a single PRS resource, where the Rx–Tx time difference measurements include differences between a time of reception of the PRS resource and times of transmission of the SRS resources to each of receiving node, e.g., RPs and TRP. The one or more processors 702 may generate a Rx–Tx time difference measurement for multiple PRS resources, e.g., based on a difference between a time of reception of each PRS resource and the time of transmission of each associated SRS resource to a receiving node.

The medium 720 and/or memory 704 may include report measurement module 730 that when implemented by the one or more processors 702 configures the one or more processors 702 to send a location information report to a location server, via the wireless transceiver 710. The location information report, for example, may include a plurality of Rx–Tx time difference measurements with respect to a single PRS resource.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support positioning of the UE 105 using UL SRS for positioning to one or more RPs in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a wireless transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
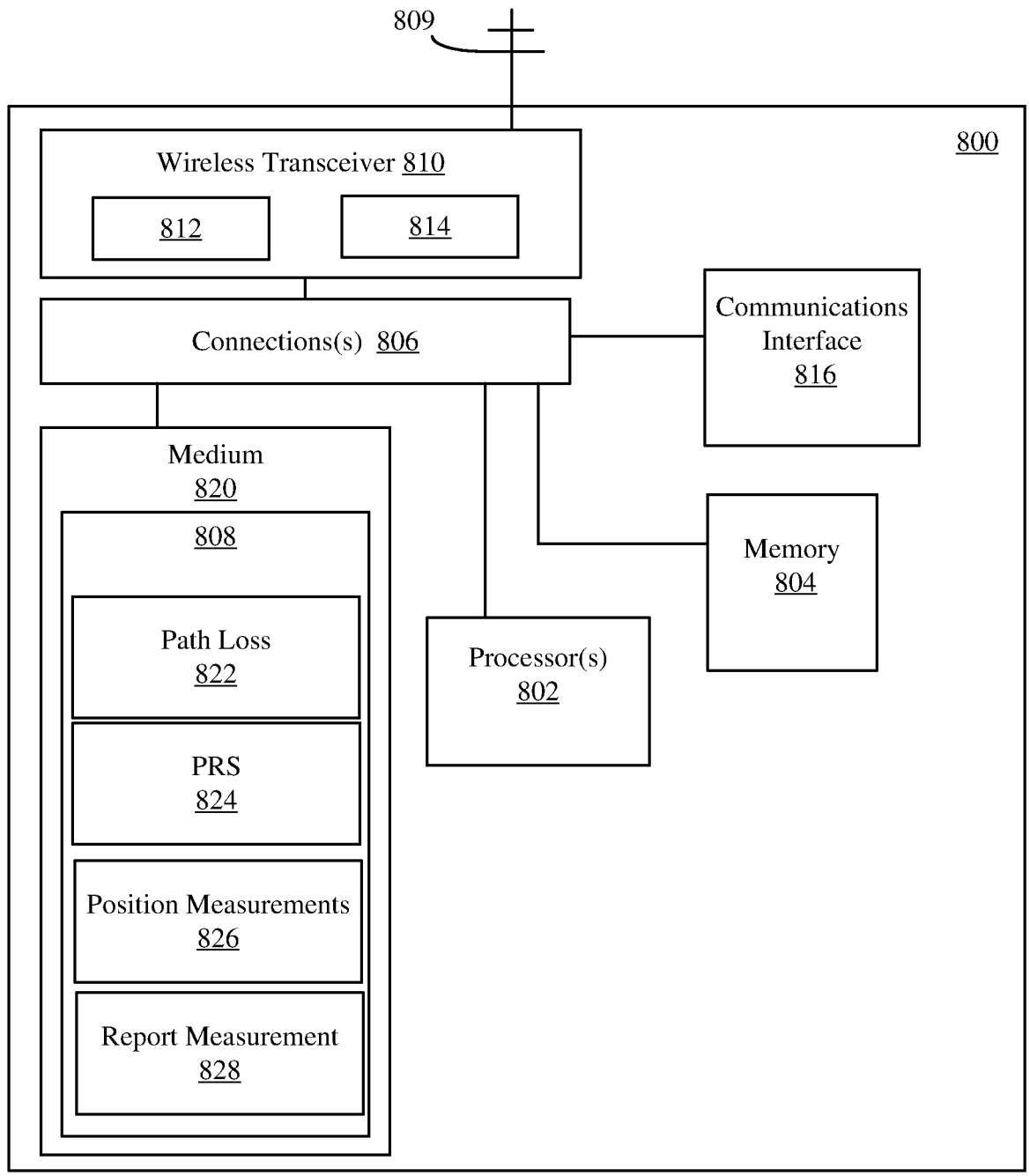
FIG. 8 shows a schematic block diagram illustrating certain exemplary features of a TRP that is configured to support position determination of the UE using one or more reception points.

FIG. 8 shows a schematic block diagram illustrating certain exemplary features of a TRP 800 that is configured to support UE positioning using UL SRS for positioning sent to one or more RPs, as discussed herein. The TRP 800, for example, may be a base station, such as gNB/TRP 110 shown in FIGS. 1A-6. The TRP 800, for example, may perform the signal flows shown in FIG. 6 and the process flow shown in FIG. 12 and algorithms disclosed herein.

The TRP 800, for example, may include one or more processors 802, memory 804, and an external interface, which may include a wireless transceiver 810 for wirelessly communicating with UEs and/or a communications interface 816 for communicating with other network entities. The one or more processors 802, memory 804, wireless transceiver 810, and communications interface 816 may be operatively coupled with one or more connections 806 (e.g., buses, lines, fibers, links, etc.) to non-transitory computer readable medium 820 and memory 804. The wireless transceiver 810 may be a transceiver for communicating with the UE 105. The wireless transceiver 810 may include a transmitter 812 and receiver 814 coupled to one or more antennas 809 for transmitting (e.g., on one or more downlink channels) and/or receiving (e.g., on one or more uplink channels) wireless signals and transducing signals from the wireless signals to wired (e.g., electrical and/or optical) signals and from wired (e.g., electrical and/or optical) signals to the wireless signals. The communications interface 816 may be wireline or wireless network interface between network entities, such as to the AMF 115 through which the network entity may communicate with the LMF 120. In certain example implementations, all or part of TRP 800 may take the form of a chipset, and/or the like.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of TRP 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in TRP 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in TRP 800 is merely exemplary, and as such the functionality of the modules and/or data structures may be combined, separated, and/or be structured in different ways depending upon the implementation of the TRP 800.

The medium 820 and/or memory 804 may include a path loss module 822 that when implemented by the one or more processors 802 configures the one or more processors 802 to receive signal strength measurements from RPs measured from SRS received from the UE using a pre-determined path loss function, e.g., based on a distance between the TRP and the UE. The one or more processors 802 may be configured to determine the path loss reference values for SRS transmitted by the UE to each RP based on the received signal strength measurements. The one or more processors 802 may be configured to send the received signal strength measurements to a location server, via the communications interface 816, and the location server determines the path loss reference values for SRS transmitted by the UE to each RP based on the received signal strength measurements, and the one or more processors 802 may be configured to receive the path loss reference values from the location server. The one or more processors 802 may be configured to send, via the wireless transceiver 810, path loss reference values to the UE for configuring subsequent SRS transmissions by the UE to RPS. The path loss reference values may be for configured for less than all SRS resources in an SRS resource set, e.g., a group of SRS resources or an individual SRS resource.

The medium 820 and/or memory 804 may include a PRS module 824 that when implemented by the one or more processors 802 configures the one or more processors 802 to transmit, via the wireless transceiver 810, a DL PRS resource, which may be received by a UE and one or more RPs. In some implementations, a DL PRS resource may be broadcast to the UE and RPs. In some implementations, a different DL PRS resource may be transmitted via a directed beam to each receiving node, e.g., the UE and RPs.

The medium 820 and/or memory 804 may include positioning measurement module 826 that when implemented by the one or more processors 802 configures the one or more processors 802 to receive positioning measurements from RPs via the communications interface 816 and to prepare and send positioning measurements to location server via the communications interface 816. The one or more processors 802 may be configured to measure the time of transmission of the PRS resource to the UE and to generate Rx–Tx time difference measurements for each RP based on a difference between the time of transmission of the PRS resource to the UE and the times of reception by each RP of an SRS resource transmitted by the UE to each respective RP in response to the PRS resource. The one or more processors 802 may be further configured to correct the times of reception of the SRS resource by each RP using a known clock offset (if present) between a clock in the TRP and a clock in each respective RP when generating the Rx–Tx time difference measurements. The one or more processors 802 may be further configured to measure the time of reception of an SRS resource transmitted by the UE to the TRP and to generate an Rx–Tx time difference measurements for the TRP based on a difference between the time of transmission of the PRS resource to the UE and the time of reception of the SRS resource transmitted by the UE. The Rx–Tx time difference measurements, for example, may be generated if the clocks of the TRP 800 and the RP are synchronized (clock offsets may be present). The one or more processors 802 may be further configured to generate positioning measurements as a Rx–Rx time difference measurement received from each RP. The Rx–Rx time difference measurements, for example, may be used if the clocks of the TRP 800 and the RP are not synchronized or have an unknown clock offset. The one or more processors 802 may be further configured to generate positioning measurements based on UL AOA measurements generated and provided to the TRP by one or more RPs.

The medium 820 and/or memory 804 may include report measurement module 828 that when implemented by the one or more processors 802 configures the one or more processors 802 to send to the location server, via the communications interface 816, the position measurements for the UE that are generated from the RP and the TRP measurements.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program code 808. For example, the non-transitory computer readable medium including program code 808 stored thereon may include program code 808 to support positioning of the UE 105 using UL SRS for positioning to one or more RPs in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a wireless transceiver 810 or communications interface 816 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable program code 808 stored thereon, which if executed by one or more processors 802 may be operatively enabled to perform all or portions of the example operations as described herein. Computer readable medium 820 may be a part of memory 804.

Figure 9:
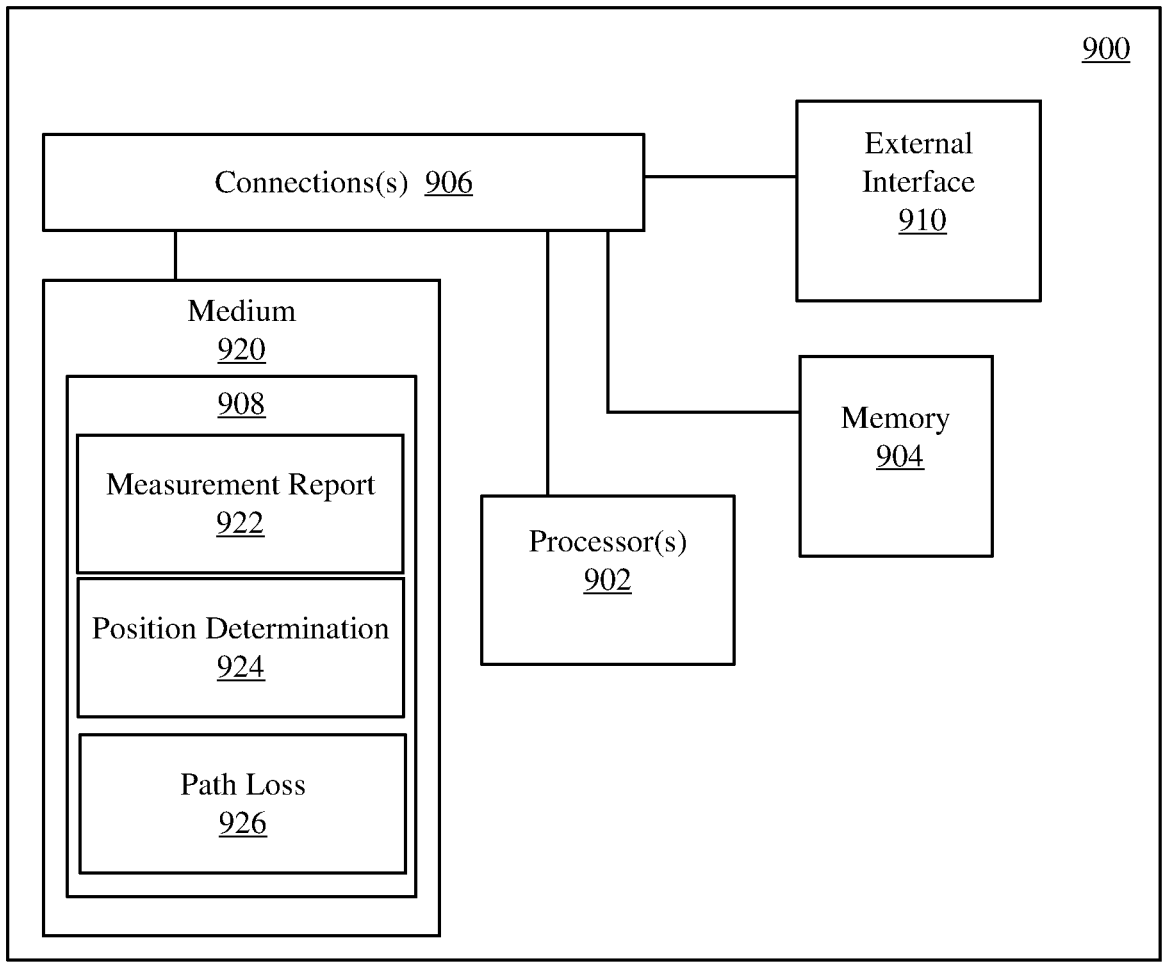
FIG. 9 shows a schematic block diagram illustrating certain exemplary features of a location server that is configured to support position determination of the UE using one or more reception points.

FIG. 9 shows a schematic block diagram illustrating certain exemplary features of a location server 900 that is configured to support UE positioning using UL SRS for positioning sent to one or more RPs, as discussed herein. The location server 900, for example, may be a LMF 120 shown in FIGS. 1A-6. The location server 900, for example, may perform the signal flows shown in FIG. 6 and the process flow shown in FIGS. 14 and 16 and algorithms disclosed herein.

The location server 900 may, for example, include one or more processors 902, memory 904, an external interface 910 (e.g., wireline or wireless network interface to base stations and/or entities in the core network), which may be operatively coupled with one or more connections 906 (e.g., buses, lines, fibers, links, etc.) to non-transitory computer readable medium 920 and memory 904. In certain example implementations, all or part of location server 900 may take the form of a chipset, and/or the like.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of location server 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in location server 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in location server 900 is merely exemplary, and as such the functionality of the modules and/or data structures may be combined, separated, and/or be structured in different ways depending upon the implementation of the location server 900.

The medium 920 and/or memory 904 may include a measurement report module 922 that when implemented by the one or more processors 902 configures the one or more processors 902 to receive measurement reports from the UE and the TRP via the external interface 910. The measurement report from the UE, for example, may be received via the TRP and may include a plurality of Rx-Tx time difference measurements for the times of transmission for different SRS resources sent to a plurality of RPs with respect to the time of reception of a single PRS resource received by the UE from the TRP. In some implementations, plurality of Rx-Tx time difference measurements may be with respect to different PRS resources. The measurement report from the TRP, for example, may include Rx-Tx time difference measurements for TRP and RP pairs, e.g., the time of transmission of a PRS resource by the TRP and time of reception of an SRS resource by the RP that was transmitted by the UE to each RP in response to the UE's reception of the PRS resource. The measurement report from the TRP, for example, may also include a Rx-Tx time difference measurement for the TRP, e.g., the time of transmission of a PRS resource by the TRP and time of reception of an SRS resource by the TRP that was transmitted by the UE to the TRP in response to the UE's reception of the PRS resource. The measurement report from the TRP, for example, may also include a Rx-Rx time difference measurements for RPs, e.g., the difference between the time of reception by an RP of a PRS resource transmitted by the TRP and the time of reception of an SRS resource by the RP that was transmitted by the UE. The measurement report from the TRP may include other positioning measurements, such as UL AOA, as measured by one or more RPs.

The medium 920 and/or memory 904 may include a position determination module 924 that when implemented by the one or more processors 902 configures the one or more processors 902 to determine a position of the UE based on the positioning measurements received from the UE and the TRP. Where the positioning measurements include a variety of types of positioning measurements, the one or more processors 902 may be configured to use the various positioning measurements to determine the position of the UE. For example, the one or more processors 902 may be configured to determine the position for the UE based on the Rx-Rx time difference measurement for a first RP and the Rx-Tx time difference measurement for the TRP and a second RP. The Rx-Rx time difference measurements, for example, may be used for TDOA positioning to generate one or more hyperbolas, and the Rx-Tx time difference measurements may be used for asymmetric RTT positioning to generate one or more ellipses for the TRP and RP pairs or used for RTT positioning to generate a circle for the TRP. Additional, positioning measurements, such as UL AOA positioning may further be used to derive the position of the UE.

The medium 920 and/or memory 904 may include a path loss module 926 that when implemented by the one or more processors 902 configures the one or more processors 902 to receive from the TRP, via the external interface 910, signal strength measurements generated by one or more RPs measured from SRS received by the RPs from the UE using a pre-determined path loss function, e.g., based on a distance between the TRP and the UE. The one or more processors 902 may be configured to determine the path loss reference values for SRS transmitted by the UE to each RP based on the received signal strength measurements. The one or more processors 902 may be configured to send the determined path loss reference values to the TRP, via the external interface 910. The path loss reference values may be for configured for less than all SRS resources in an SRS resource set, e.g., a group of SRS resources or an individual SRS resource.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program code 908. For example, the non-transitory computer readable medium including program code 908 stored thereon may include program code 908 to support positioning of the UE 105 using UL SRS for positioning to one or more RPs in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include an external interface 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable program code 908 stored thereon, which if executed by one or more processors 902 may be operatively enabled to perform all or portions of the example operations as described herein. Computer readable medium 920 may be a part of memory 904.

Figure 10:
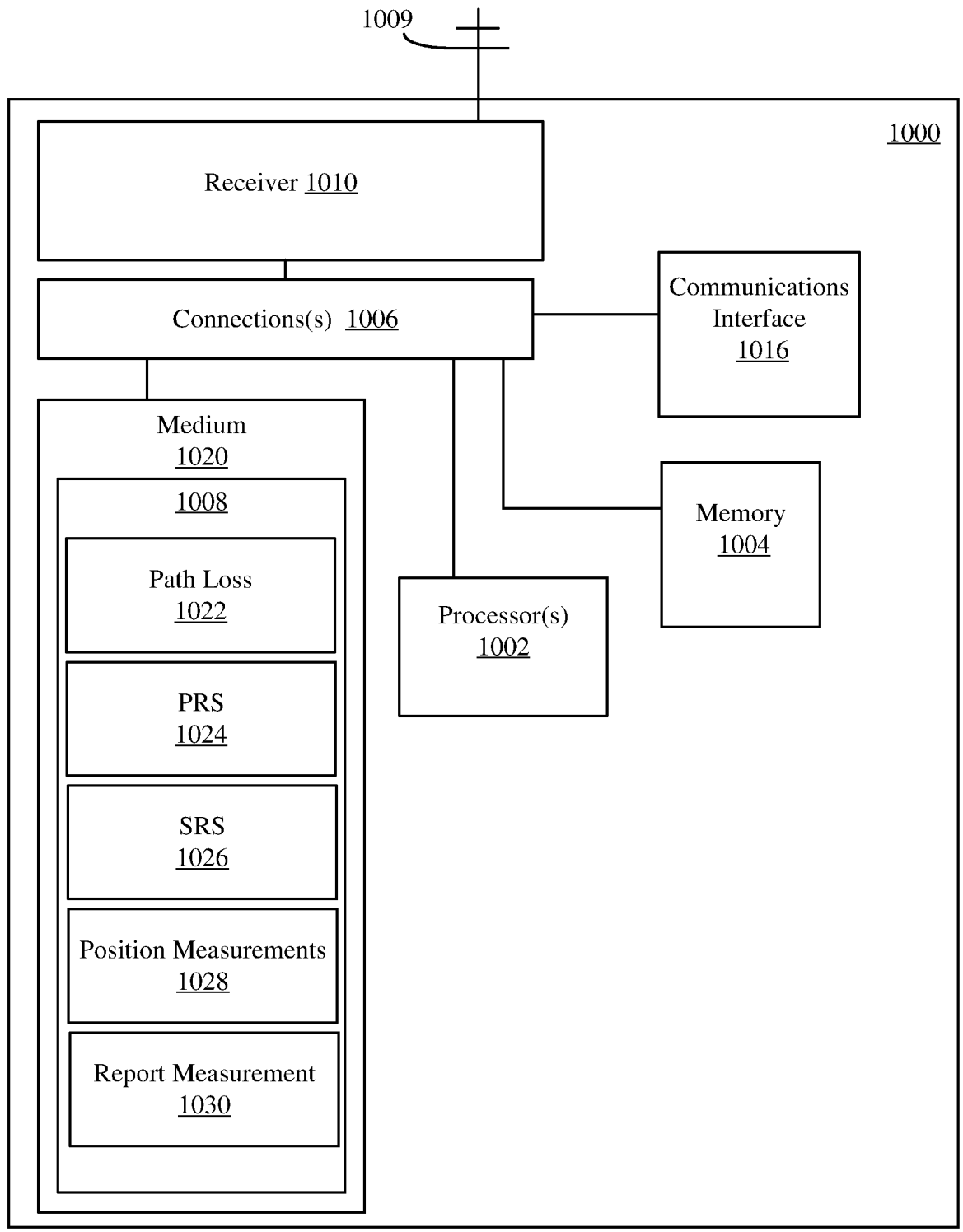
FIG. 10 shows a schematic block diagram illustrating certain exemplary features of an RP that is configured to support position determination of the UE using one or more reception points.

FIG. 10 shows a schematic block diagram illustrating certain exemplary features of an RP 1000 that is configured to support UE positioning using UL SRS for positioning sent to one or more RPs, as discussed herein. The RP 1000, for example, may be RP 113 shown in FIGS. 1B, 2C-6. The RP 1000, for example, may perform the signal flows shown in FIG. 6 and the process flow shown in FIG. 15 and algorithms disclosed herein.

The RP 1000, for example, may include one or more processors 1002, memory 1004, and a wireless receiver 1010 for wirelessly receiving signals from UEs and TRPs and a communications interface 1016 for communicating with a connected TRP, e.g., via an F1 interface. The one or more processors 1002, memory 1004, wireless receiver 1010, and communications interface 1016 may be operatively coupled with one or more connections 1006 (e.g., buses, lines, fibers, links, etc.) to non-transitory computer readable medium 1020 and memory 1004. The wireless receiver 1010 may be coupled to one or more antennas 1009 for receiving (e.g., on one or more uplink channels) wireless signals and transducing signals from the wireless signals to wired (e.g., electrical and/or optical) signals and from wired (e.g., electrical and/or optical) signals to the wireless signals. The antennas 1009 may be capable of beamforming for receiving wireless signals. The communications interface 1016 may be wireline or wireless network interface between the RP 1000 and a TRP. In certain example implementations, all or part of RP 1000 may take the form of a chipset, and/or the like.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of RP 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in RP 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in RP 1000 is merely exemplary, and as such the functionality of the modules and/or data structures may be combined, separated, and/or be structured in different ways depending upon the implementation of the RP 1000.

The medium 1020 and/or memory 1004 may include a path loss module 1022 that when implemented by the one or more processors 1002 configures the one or more processors 1002 to receive, via wireless receiver 1010, an UL SRS resource from a UE with a pre-determined path loss function, e.g., based on a distance between the TRP and the UE, and to measure the signal strength of the UL SRS resource, e.g., as an RSSI measurement. The one or more processors 1002 may be configured to send the signal strength measurements to the TRP via the communications interface 1016.

The medium 1020 and/or memory 1004 may include a PRS module 1024 that when implemented by the one or more processors 1002 configures the one or more processors 1002 to receive, via the wireless receiver 1010, a DL PRS resource transmitted by a TRP.

The medium 1020 and/or memory 1004 may include an SRS module 1026 that when implemented by the one or more processors 1002 configures the one or more processors 1002 to receive, via the wireless receiver 1010, an SRS resource transmitted by a UE. In some implementations, the SRS resource may be received using beamforming, enabling an UL AOA measurement of the SRS resource.

The medium 1020 and/or memory 1004 may include position measurement module 1028 that when implemented by the one or more processors 1002 configures the one or more processors 1002 to generate positioning measurements for SRS resources received from the UE via the wireless receiver 1010. For example, the one or more processors 1002 may be configured to measure the time of reception of received signals, e.g., a time of reception of an SRS resource received from the UE, and in some implementations, a time of reception of a PRS resource received from the TRP. The one or more processors 1002, for example, may be configured to generate the positioning measurement as a time or reception of the SRS resource received from the UE, e.g., if the RP and the TRP are synchronized and have a known clock offset (the TRP may generate an Rx-Tx time difference measurement based on a difference between the time of transmission of the PRS resource to the UE and the time of reception by the RP 1000 of the SRS resource transmitted by the UE in response to the PRS resource after correcting any clock offset. The one or more processors 1002, for example, may be configured to generate the positioning measurement as a Rx–Rx time difference measurement based on the difference between the time of reception of the PRS and the time of reception of the SRS. The Rx–Rx time difference measurements, for example, may be generated if the clocks of the RP 1000 and the RP are not synchronized or have an unknown clock offset. The one or more processors 1002 may be further configured to generate positioning measurements based on an UL AOA measurement for the SRS resource as received by the antenna 1009.

The medium 1020 and/or memory 1004 may include report measurement module 1030 that when implemented by the one or more processors 1002 configures the one or more processors 1002 to send to the TRP, via the communications interface 1016, the position measurements for the UE.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program code 1008. For example, the non-transitory computer readable medium including program code 1008 stored thereon may include program code 1008 to support positioning of the UE 105 using UL SRS for positioning to one or more RPs in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a wireless receiver 1010 or communications interface 1016 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable program code 1008 stored thereon, which if executed by one or more processors 1002 may be operatively enabled to perform all or portions of the example operations as described herein. Computer readable medium 1020 may be a part of memory 1004.

Figure 11:
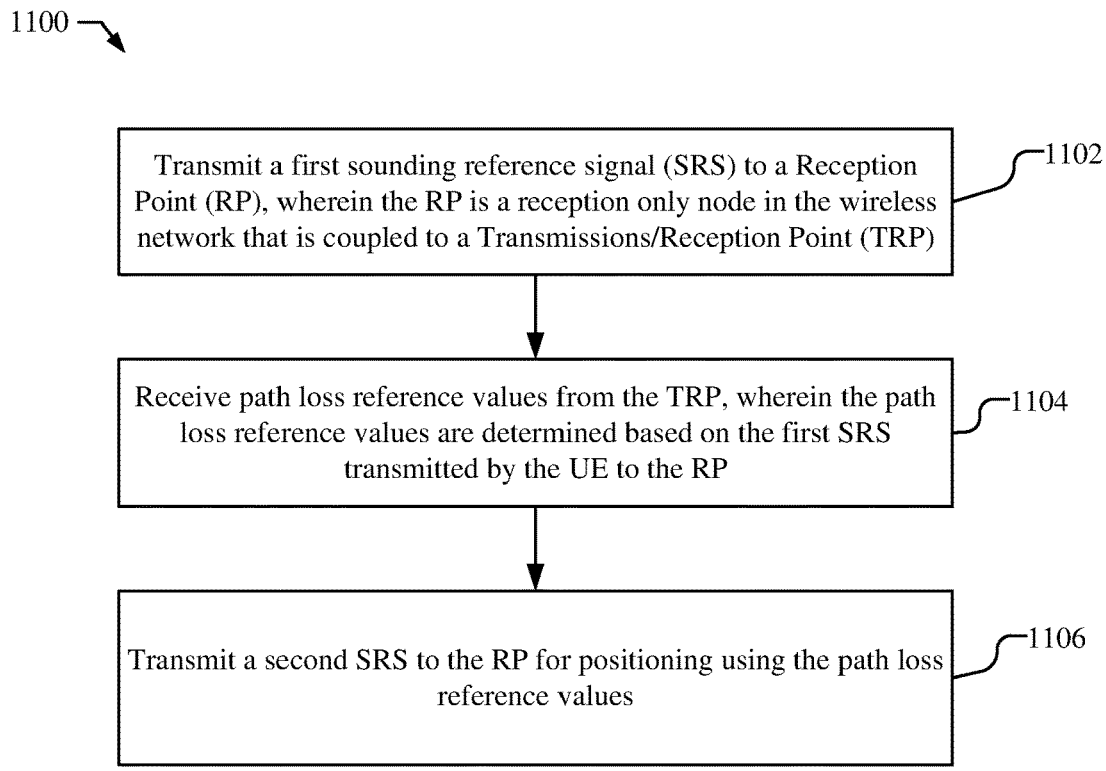
FIG. 11 shows a flowchart for an exemplary method performed by a UE for supporting positioning of a UE in a wireless network.

FIG. 11 shows a flowchart for an exemplary method 1100, e.g., performed by a UE, such as UE 105, for supporting positioning of a UE in a wireless network, in a manner consistent with disclosed implementation.

At block 1102, the UE transmits a first sounding reference signal (SRS) to a Reception Point (RP), wherein the RP is a reception only node in the wireless network that is coupled to a Transmissions/Reception Point (TRP), e.g., as discussed at stage 7 of FIG. 6. A means for transmitting a first sounding reference signal (SRS) to a Reception Point (RP), wherein the RP is a reception only node in the wireless network that is coupled to a Transmissions/Reception Point (TRP) may be, e.g., the wireless transceiver 710 and one or more processors 702 with dedicated hardware or implementing executable code or software instructions in memory 704 and/or medium 720 such as the SRS module 722 of UE 700.

At block 1104, the UE receives path loss reference values from the TRP, wherein the path loss reference values are determined based on the first SRS transmitted by the UE to the RP, e.g., as discussed at stage 9 of FIG. 6. A means for transmitting a second SRS to the RP for positioning using the path loss reference values may be, e.g., the wireless transceiver 710 and one or more processors 702 with dedicated hardware or implementing executable code or software instructions in memory 704 and/or medium 720 such as the path loss module 724 of UE 700.

At block 1106, the UE transmits a second SRS to the RP for positioning using the path loss reference values, e.g., as discussed at stage 10 of FIG. 6. The first SRS, for example, may be transmitted with a pre-determined path loss function, and the path loss reference values may be determined based on the pre-determined path loss function. The pre-determined path loss function, for example, may be based on a distance between the TRP and the UE. In one implementation, the path loss reference values may be determined by the TRP, e.g., as discussed in stage 8 of FIG. 6. In one implementation, the path loss reference values may be determined by a location server and are received by the UE from the location server via the TRP, e.g., as discussed in stage 8 of FIG. 6. A means for transmitting a second SRS to the RP for positioning using the path loss reference values may be, e.g., the wireless transceiver 710 and one or more processors 702 with dedicated hardware or implementing executable code or software instructions in memory 704 and/or medium 720 such as the SRS module 722 of UE 700.

In one implementation, the UE may transmit the second SRS to the RP for positioning using the path loss reference values by configuring less than all SRS resources in an SRS resource set based on the path loss reference values, e.g., as discussed in stage 9 of FIG. 6. For example, less than all SRS resources in the SRS resource set may be a group of SRS resources or an individual SRS resource. A means for configuring less than all SRS resources in an SRS resource set based on the path loss reference values may be, e.g., the one or more processors 702 with dedicated hardware or implementing executable code or software instructions in memory 704 and/or medium 720 such as the path loss module 724 of UE 700.

Figure 12:
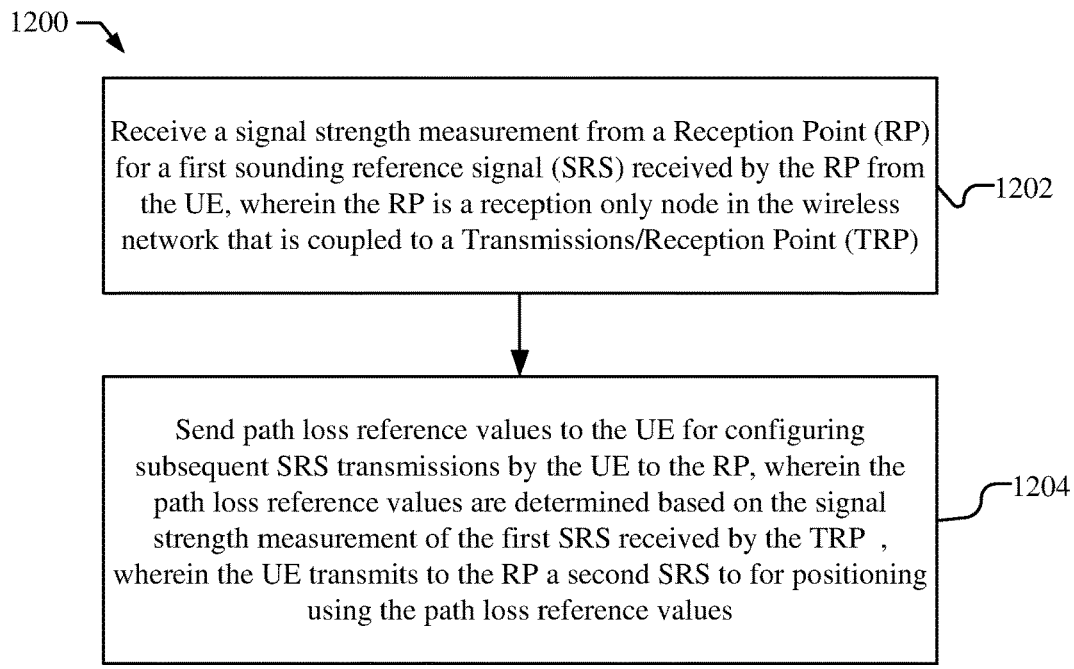
FIG. 12 shows a flowchart for an exemplary method performed by a TRP for supporting positioning of a UE in a wireless network.

FIG. 12 shows a flowchart for an exemplary method 1200, e.g., performed by a Transmission/Reception Point (TRP), such as TRP 110, for supporting positioning of a UE in a wireless network, in a manner consistent with disclosed implementation.

At block 1202, the TRP receives a signal strength measurement from a Reception Point (RP) for a first sounding reference signal (SRS) received by the RP from the UE, wherein the RP is a reception only node in the wireless network that is coupled to a Transmissions/Reception Point (TRP), e.g., as discussed at stages 7 and 8 of FIG. 6. A means for receiving a signal strength measurement from a Reception Point (RP) for a first sounding reference signal (SRS) received by the RP from the UE, wherein the RP is a reception only node in the wireless network that is coupled to a Transmissions/Reception Point (TRP) may be, e.g., the communications interface 816 and one or more processors 802 with dedicated hardware or implementing executable code or software instructions in memory 804 and/or medium 820 such as the path loss module 822 of TRP 800.

At block 1204, the TRP sends path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values, e.g., as discussed at stage 9 of FIG. 6. In some implementations, the SRS may be transmitted by the UE with a pre-determined path loss function, and the path loss reference values are determined based on the pre-determined path loss function, as discussed at stage 8 of FIG. 6. The pre-determined path loss function, for example, may be based on a distance between the TRP and the UE. In some implementations, the path loss reference values may be for configuring less than all SRS resources in an SRS resource set based on the path loss reference values. For example, less than all SRS resources in the SRS resource set may be a group of SRS resources or an individual SRS resource. A means for sending path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values may be, e.g., the wireless transceiver 810 and one or more processors 802 with dedicated hardware or implementing executable code or software instructions in memory 804 and/or medium 820 such as the path loss module 822 of TRP 800.

In some implementations, the TRP may determine the path loss reference values based on the signal strength measurement of the first SRS received by the TRP, e.g., as discussed at stage 8 of FIG. 6. A means for determining the path loss reference values based on the signal strength measurement of the first SRS received by the TRP may be, e.g., the one or more processors 802 with dedicated hardware or implementing executable code or software instructions in memory 804 and/or medium 820 such as the path loss module 822 of TRP 800.

In some implementations, the TRP may send the signal strength measurement of the first SRS to a location server, wherein the location server determines the path loss reference values based on the signal strength measurement of the first SRS, and the TRP may receive the path loss reference values from the location server before sending the path loss reference values to the UE, e.g., as discussed at stage 8 of FIG. 6. A means for sending the signal strength measurement of the first SRS to a location server, wherein the location server determines the path loss reference values based on the signal strength measurement of the first SRS may be, e.g., the communications interface 816 and one or more processors 802 with dedicated hardware or implementing executable code or software instructions in memory 804 and/or medium 820 such as the path loss module 822 of TRP 800. A means for receiving the path loss reference values from the location server before sending the path loss reference values to the UE may be, e.g., the communications interface 816 and one or more processors 802 with dedicated hardware or implementing executable code or software instructions in memory 804 and/or medium 820 such as the path loss module 822 of TRP 800.

Figure 13:
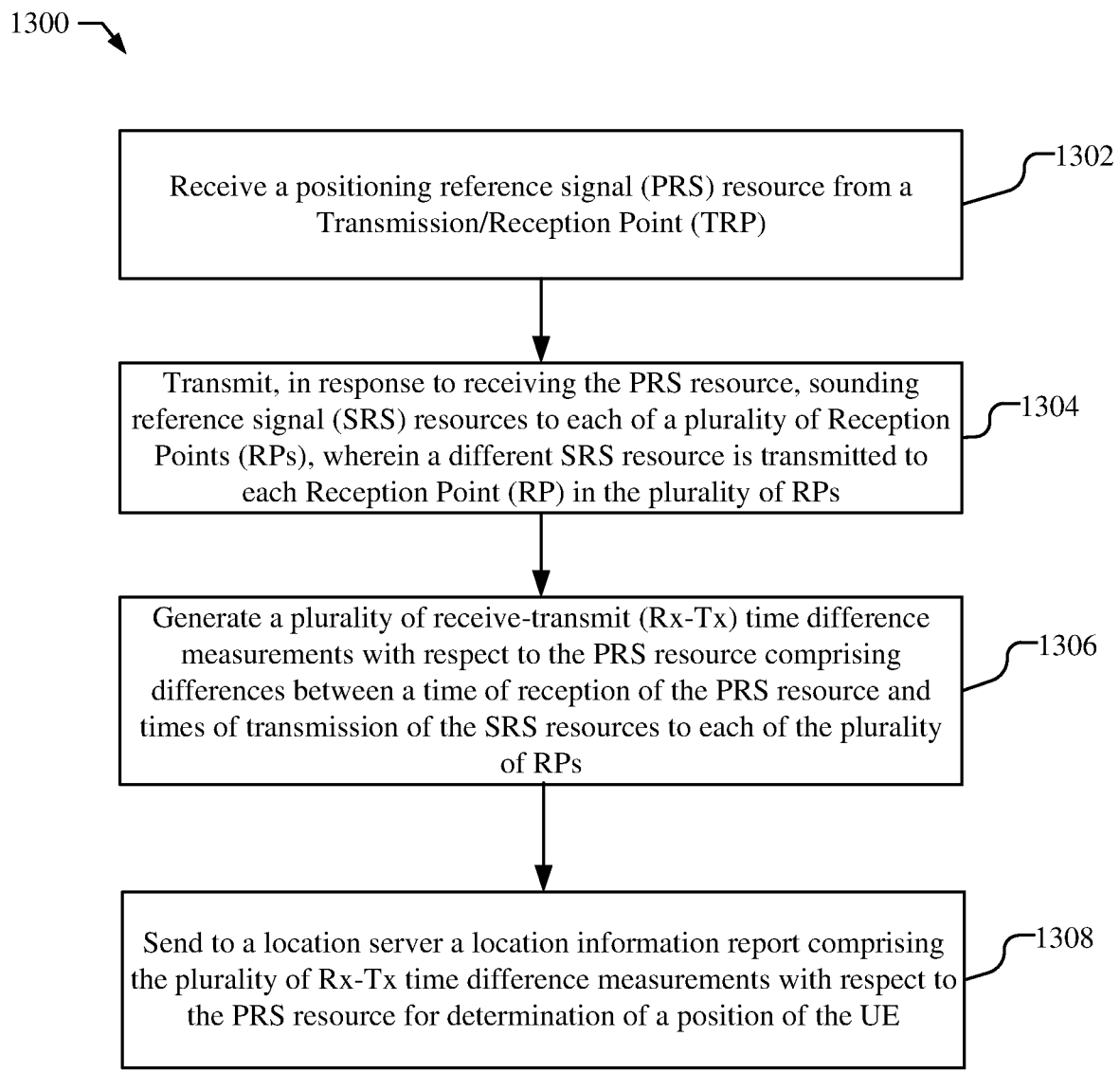
FIG. 13 shows a flowchart for an exemplary method performed by a UE for supporting positioning of a UE in a wireless network.

FIG. 13 shows a flowchart for an exemplary method 1300, e.g., performed by a UE, such as UE 105, for supporting positioning of a UE in a wireless network, in a manner consistent with disclosed implementation.

At block 1302, the UE receives a positioning reference signal (PRS) resource from a Transmission/Reception Point (TRP), as discussed at stage 6 of FIG. 6. A means for receiving a positioning reference signal (PRS) resource from a Transmission/Reception Point (TRP) may be, e.g., the wireless transceiver 710 and one or more processors 702 with dedicated hardware or implementing executable code or software instructions in memory 704 and/or medium 720 such as the PRS module 726 of UE 700.

At block 1304, the UE transmits, in response to receiving the PRS resource, sounding reference signal (SRS) resources to each of a plurality of Reception Points (RPs), wherein a different SRS resource is transmitted to each Reception Point (RP) in the plurality of RPs, e.g., as discussed at stage 10 of FIG. 6. A means for transmitting, in response to receiving the PRS resource, sounding reference signal (SRS) resources to each of a plurality of Reception Points (RPs), wherein a different SRS resource is transmitted to each Reception Point (RP) in the plurality of RPs may be, e.g., the wireless transceiver 710 and one or more processors 702 with dedicated hardware or implementing executable code or software instructions in memory 704 and/or medium 720 such as the SRS module 722 of UE 700.

At block 1306, the UE generates a plurality of receive-transmit (Rx–Tx) time difference measurements with respect to the PRS resource comprising differences between a time of reception of the PRS resource and times of transmission of the SRS resources to each of the plurality of RPs, e.g., as discussed at stage 11A of FIG. 6. A means for generating a plurality of receive-transmit (Rx–Tx) time difference measurements with respect to the PRS resource comprising differences between a time of reception of the PRS resource and times of transmission of the SRS resources to each of the plurality of RPs may be, e.g., the wireless transceiver 710 and one or more processors 702 with dedicated hardware or implementing executable code or software instructions in memory 704 and/or medium 720 such as the positioning measurement module 728 of UE 700.

At block 1308, the UE sends to a location server a location information report comprising the plurality of Rx–Tx time difference measurements with respect to the PRS resource for determination of a position of the UE, e.g., as discussed at stage 12 of FIG. 6. The location information report may further include an SRS resource ID associated with each Rx–Tx time difference measurement. The location information report may further include a time stamp associated with each Rx–Tx time difference measurement. A means for sending to a location server a location information report comprising the plurality of Rx–Tx time difference measurements with respect to the PRS resource for determination of a position of the UE may be, e.g., the wireless transceiver 710 and one or more processors 702 with dedicated hardware or implementing executable code or software instructions in memory 704 and/or medium 720 such as the report measurement module 730 of UE 700.

In some implementations, the location server may determine the position of the UE using an asymmetric Round Trip Time (RTT) for a time of flight for the PRS resource from the TRP to the UE and a time of flight for the SRS resources from the UE to each RP, e.g., as discussed at stage 14 of FIG. 6. The asymmetric RTT for an RP, for example, may be based on an Rx–Tx time difference measurement between a time of transmission of the PRS resource by the TRP to the UE and a time of reception by the RP of an SRS resource transmitted by the UE, e.g., as discussed at stage 11C of FIG. 6. The TRP and the RP, for example, may have a known time offset between their respective clocks, and the Rx–Tx time difference measurement between the time of transmission of the PRS resource by the TRP to the UE and the time of reception by the RP of the SRS resource transmitted by the UE may be corrected for the known time offset, e.g., as discussed at stage 11C of FIG. 6.

In one implementation, the UE may transmit, in response to receiving the PRS resource, an SRS resource to the TRP; wherein one of the plurality of Rx–Tx time difference measurements with respect to the PRS resource is a difference between the time of reception of the PRS resource and a time of transmission of the SRS resource to the TRP, e.g., as discussed at stage 10 of FIG. 6. A means for transmitting, in response to receiving the PRS resource, an SRS resource to the TRP; wherein one of the plurality of Rx–Tx time difference measurements with respect to the PRS resource is a difference between the time of reception of the PRS resource and a time of transmission of the SRS resource to the TRP may be, e.g., the wireless transceiver 710 and one or more processors 702 with dedicated hardware or implementing executable code or software instructions in memory 704 and/or medium 720 such as the SRS module 722 of UE 700.

In one implementation, the determination of the position of the UE is generated using uplink Time Difference of Arrival (TDOA), e.g., as discussed at stage 14 of FIG. 6.

FIG. 14 shows a flowchart for an exemplary method 1400, e.g., performed by a location server, such as LMF 120 for supporting positioning of a UE in a wireless network, in a manner consistent with disclosed implementation.

At block 1402, the location server receives from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource, e.g., as discussed at stage 12 of FIG. 6. In one implementation, the first location information report may further include an SRS resource ID associated with each Rx–Tx time difference measurement. In one implementation, the first location information report may further include a time stamp associated with each Rx–Tx time difference measurement. A means for receiving from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource may be, e.g., the external interface 910 and one or more processors 902 with dedicated hardware or implementing executable code or software instructions in memory 904 and/or medium 920 such as the measurement report module 922 of location server 900.

At block 1404, the location server receives from the TRP a second location information report comprising positioning measurements for the plurality of RPs, e.g., as discussed at stage 13 of FIG. 6. A means for receiving from the TRP a second location information report comprising positioning measurements for the plurality of RPs may be, e.g., the external interface 910 and one or more processors 902 with dedicated hardware or implementing executable code or software instructions in memory 904 and/or medium 920 such as the measurement report module 922 of location server 900.

At block 1406, the location server determines a position of the UE based on the first location information report and the second location information report, e.g., as discussed at stage 14 of FIG. 6. A means for determining a position of the UE based on the first location information report and the second location information report may be, e.g., the external interface 910 and one or more processors 902 with dedicated hardware or implementing executable code or software instructions in memory 904 and/or medium 920 such as the position determination module 924 of location server 900.

In one implementation, the positioning measurements for the plurality of RPs may include a plurality of Rx–Tx time difference measurements, wherein each Rx–Tx time difference measurement comprises a difference between a time of transmission of the PRS resource by the TRP to the UE and a time of reception by an RP of an SRS resource transmitted by the UE to the RP, and the location server may determine the position of the UE is at least partly based on an asymmetric Round Trip Time (RTT) for a time of flight for the PRS resource from the TRP to the UE and a time of flight for the SRS resources from the UE to each RP, e.g., as discussed at stage 14 of FIG. 16. For example, the TRP and each RP may have a known time offset between their respective clocks and an Rx–Tx time difference measurement for each RP is corrected for the known time offset, e.g., as discussed at stage 11C of FIG. 6.

In one implementation, the first location information report may further include an Rx–Tx time difference measurement with respect to the PRS resource that is a time difference between a time of reception of the PRS resource by the UE and a time of transmission by an SRS resource by the UE to the TRP, and the second location information report may further include a positioning measurement for the TRP, e.g., as discussed at stages 11A and 11C of FIG. 6. For example, the positioning measurements for the TRP may include a Rx–Tx time difference measurement between the time of transmission of the PRS resource by the TRP and a time of reception of the SRS resource by the TRP, and the location server may determine the position of the UE is at least partly based on an on a Round Trip Time (RTT) for a time of flight for the PRS resource from the TRP to the UE and a time of flight for the SRS resource from the UE to the TRP based on the first location information report and the second location information report, e.g., as discussed at stage 14 of FIG. 6.

In one implementation, the positioning measurements for the plurality of RPs may include a plurality of receive-receive (Rx–Rx) time difference measurements, wherein each Rx–Rx time difference measurement comprise a difference between a time of reception by an RP of the PRS resource transmitted by the TRP and a time of reception by the RP of an SRS resource transmitted by the UE to the RP, and the location server may determine the position of the UE is at least partly based on an uplink Time Difference of Arrival (TDOA) for the plurality of RPs, e.g., as discussed at stages 11B and 11C of FIG. 6.

Figure 15:
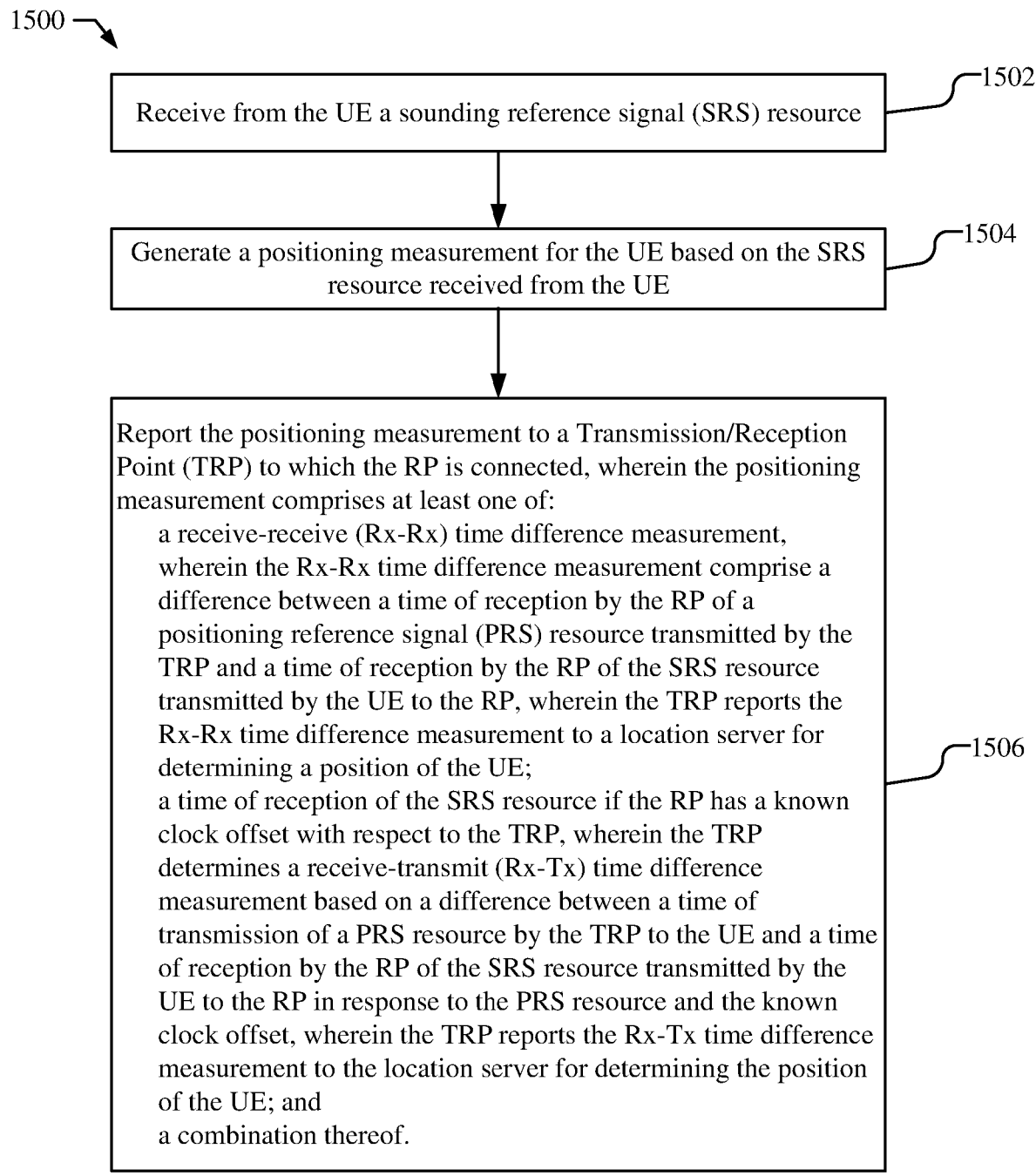
FIG. 15 shows a flowchart for an exemplary method performed by an RP for supporting positioning of a UE in a wireless network.

FIG. 15 shows a flowchart for an exemplary method 1500, e.g., performed by a Reception Point (RP), such as RP 113, for supporting positioning of a UE in a wireless network, in a manner consistent with disclosed implementation.

At block 1502, the RP receives from the UE a sounding reference signal (SRS) resource, e.g., as discussed at stage 10 of FIG. 6. A means for receiving from the UE a sounding reference signal (SRS) resource may be, e.g., the wireless receiver 1010 and one or more processors 1002 with dedicated hardware or implementing executable code or software instructions in memory 1004 and/or medium 1020 such as the SRS module 1026 of RP 1000.

At block 1504, the RP generates a positioning measurement for the UE based on the SRS resource received from the UE, e.g., as discussed at stage 11B of FIG. 6. A means for generating a positioning measurement for the UE based on the SRS resource received from the UE may be, e.g., the one or more processors 1002 with dedicated hardware or implementing executable code or software instructions in memory 1004 and/or medium 1020 such as the position measurement module 1028 of RP 1000.

At block 1506, the RP reports the positioning measurement to a Transmission/Reception Point (TRP) to which the RP is connected, e.g., as discussed at stage 11B of FIG. 6. The positioning measurement may be at least one of: a receive-receive (Rx–Rx) time difference measurement, wherein the Rx–Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx–Rx time difference measurement to a location server for determining a position of the UE; a time of reception of the SRS resource if the RP has a known clock offset with respect to the TRP, wherein the TRP determines a receive-transmit (Rx–Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx–Tx time difference measurement to the location server for determining the position of the UE; and a combination thereof, e.g., as discussed at stage 11B of FIG. 6. A means for reporting the positioning measurement to a Transmission/Reception Point (TRP) to which the RP is connected may be, e.g., the wireless receiver 1010 and one or more processors 1002 with dedicated hardware or implementing executable code or software instructions in memory 1004 and/or medium 1020 such as the report measurement module 1030 of RP 1000.

In one implementation, the positioning measurement may be the Rx–Rx time difference measurement if the RP does not have a known clock offset with respect to the TRP as discussed at stage 11B of FIG. 6. In one implementation, if the positioning measurement includes the Rx–Rx time difference measurement, the location server may determine the position of the UE based at least partly on an uplink Time Difference of Arrival (TDOA), e.g., as discussed at stage 14 of FIG. 6.

In one implementation, if the positioning measurement includes the time of reception of the SRS resource, the location server may determine the position of the UE based at least partly on an asymmetric Round Trip Time (RTT) for a time of flight for the PRS resource from the TRP to the UE and a time of flight for the SRS resource from the UE to the RP, e.g., as discussed at stage 14 of FIG. 6. The asymmetric RTT for example, may be determined based on an Rx–Tx time difference measurement from the TRP and a Rx–Tx time difference measurement from the UE that includes a difference between a time of reception of the PRS resource by the UE and a time of transmission of the SRS resource by the UE to the RP, e.g., as discussed at stage 11A of FIG. 6.

FIG. 16 shows a flowchart for an exemplary method 1600, e.g., performed by a location server, such as LMF 120, for supporting positioning of a UE in a wireless network, in a manner consistent with disclosed implementation.

At block 1602, the location server receives positioning measurements for the UE from a Transmission/Reception Point (TRP), e.g., as discussed at stage 13 of FIG. 6. The positioning measurements may include a receive-receive (Rx–Rx) time difference measurement from a first Reception Point (RP) coupled to the TRP, wherein the Rx–Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP and a receive-transmit (Rx–Tx) time difference measurement for the TRP and a second RP coupled to the TRP, the second RP has a known clock offset with respect to the TRP, the Rx–Tx time difference measurement is determined by the TRP based on a difference between a time of transmission of the PRS resource by the TRP and a time of reception by the second RP of a second SRS resource transmitted by the UE to the second RP in response to the PRS resource and the known clock offset, e.g., as discussed at stage 11C of FIG. 6. A means for receiving positioning measurements for the UE from a Transmission/Reception Point (TRP) may be, e.g., the external interface 910 and one or more processors 902 with dedicated hardware or implementing executable code or software instructions in memory 904 and/or medium 920 such as the measurement report module 922 of location server 900.

At block 1604, the location server determines a position for the UE based on the positioning measurements including the Rx–Rx time difference measurement for the first RP and the Rx–Tx time difference measurement for the TRP and the second RP, e.g., as discussed at stage 14 of FIG. 6. A means for determining a position for the UE based on the positioning measurements including the Rx–Rx time difference measurement for the first RP and the Rx–Tx time difference measurement for the TRP and the second RP may be, e.g., the external interface 910 and one or more processors 902 with dedicated hardware or implementing executable code or software instructions in memory 904 and/or medium 920 such as the position determination module 924 of location server 900.

In one implementation, the first RP may not have a known clock offset with respect to the TRP.

In one implementation, the positioning measurements may further include a second Rx–Tx time difference measurement for the TRP and the first RP, the first RP has a second known clock offset with respect to the TRP, wherein the second Rx–Tx time difference measurement is determined by the TRP based on a difference between the time of transmission of the PRS resource by the TRP and a time of reception by the first RP of the first SRS resource transmitted by the UE to the first RP and the second known clock offset, e.g., as discussed at stage 11C of FIG. 6.

In one implementation, the location server may further receiving positioning measurements from the UE including a first Rx–Tx time difference measurement from the UE comprising a difference between a time of reception of the PRS resource by the UE and a time of transmission of the first SRS resource by the UE to the first RP, and a second Rx–Tx time difference measurement from the UE comprising a difference between the time of reception of the PRS resource by the UE and a time of transmission of the second SRS resource by the UE to the second RP, wherein the location server determines the position for the UE further based on the positioning measurements from the UE, e.g., as discussed at stages 11A, 12, and 14 of FIG. 6. In one implementation, the location server determines the position for the UE based at least partly on an uplink Time Difference of Arrival (TDOA) using the Rx–Rx time difference measurement and the first Rx–Tx time difference measurement from the UE, e.g., as discussed at stage 14 of FIG. 6. In one implementation, the location server determines the position for the UE based at least partly on an asymmetric Round Trip Time (RTT) for a time of flight for the PRS resource from the TRP to the UE and a time of flight for the second SRS resource from the UE to the second RP using the Rx–Tx time difference measurement and the second Rx–Tx time difference measurement from the UE, e.g., as discussed at stage 14 of FIG. 6. A means for receiving positioning measurements from the UE comprising a first Rx–Tx time difference measurement from the UE comprising a difference between a time of reception of the PRS resource by the UE and a time of transmission of the first SRS resource by the UE to the first RP, and a second Rx–Tx time difference measurement from the UE comprising a difference between the time of reception of the PRS resource by the UE and a time of transmission of the second SRS resource by the UE to the second RP, wherein determining the position for the UE is further based on the positioning measurements from the UE may be, e.g., the external interface 910 and one or more processors 902 with dedicated hardware or implementing executable code or software instructions in memory 904 and/or medium 920 such as the position determination module 924 of location server 900.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method performed by a user equipment (UE) for supporting positioning of the UE, comprising: receiving a positioning reference signal (PRS) resource from a Transmission/Reception Point (TRP); transmitting, in response to receiving the PRS resource, sounding reference signal (SRS) resources to each of a plurality of Reception Points (RPs), wherein a different SRS resource is transmitted to each Reception Point (RP) in the plurality of RPs; generating a plurality of receive-transmit (Rx–Tx) time difference measurements with respect to the PRS resource comprising differences between a time of reception of the PRS resource and times of transmission of the SRS resources to each of the plurality of RPs; and sending to a location server a location information report comprising the plurality of Rx–Tx time difference measurements with respect to the PRS resource for determination of a position of the UE.

Clause 2. The method of clause 1, wherein the location server determines the position of the UE using an asymmetric Round Trip Time (RTT) for a time of flight for the PRS resource from the TRP to the UE and a time of flight for the SRS resources from the UE to each RP.

Clause 3. The method of clause 2, wherein the asymmetric RTT for an RP is based on an Rx–Tx time difference measurement between a time of transmission of the PRS resource by the TRP to the UE and a time of reception by the RP of an SRS resource transmitted by the UE.

Clause 4. The method of any of clauses 2-3, wherein the TRP and the RP has a known time offset between their respective clocks, and wherein the Rx–Tx time difference measurement between the time of transmission of the PRS resource by the TRP to the UE and the time of reception by the RP of the SRS resource transmitted by the UE is corrected for the known time offset.

Clause 5. The method of any of clauses 1-4, further comprising transmitting, in response to receiving the PRS resource, an SRS resource to the TRP; wherein one of the plurality of Rx–Tx time difference measurements with respect to the PRS resource is a difference between the time of reception of the PRS resource and a time of transmission of the SRS resource to the TRP.

Clause 6. The method of any of clauses 1-5, wherein the location information report further comprises an SRS resource ID associated with each Rx–Tx time difference measurement.

Clause 7. The method of any of clauses 1-6, wherein the location information report further comprises a time stamp associated with each Rx–Tx time difference measurement.

Clause 8. The method of any of clauses 1-7, wherein the determination of the position of the UE is generated using uplink Time Difference of Arrival (TDOA).

Clause 9. A user equipment (UE) configured for supporting positioning of the UE, comprising: a wireless transceiver configured to communicate with entities in a wireless network; at least one memory; and at least one processor coupled to the wireless transceiver and the at least one memory, wherein the at least one processor is configured to: receive, via the wireless transceiver, a positioning reference signal (PRS) resource from a Transmission/Reception Point (TRP); transmit, via the wireless transceiver, in response to receiving the PRS resource, sounding reference signal (SRS) resources to each of a plurality of Reception Points (RPs), wherein a different SRS resource is transmitted to each Reception Point (RP) in the plurality of RPs; generate a plurality of receive-transmit (Rx–Tx) time difference measurements with respect to the PRS resource comprising differences between a time of reception of the PRS resource and times of transmission of the SRS resources to each of the plurality of RPs; and send, via the wireless transceiver, to a location server a location information report comprising the plurality of Rx–Tx time difference measurements with respect to the PRS resource for determination of a position of the UE.

Clause 10. The UE of clause 9, wherein the location server determines the position of the UE using an asymmetric Round Trip Time (RTT) for a time of flight for the PRS resource from the TRP to the UE and a time of flight for the SRS resources from the UE to each RP.

Clause 11. The UE of clause 10, wherein the asymmetric RTT for an RP is based on an Rx–Tx time difference measurement between a time of transmission of the PRS resource by the TRP to the UE and a time of reception by the RP of an SRS resource transmitted by the UE.

Clause 12. The UE of any of clauses 10-11, wherein the TRP and the RP has a known time offset between their respective clocks, and wherein the Rx–Tx time difference measurement between the time of transmission of the PRS resource by the TRP to the UE and the time of reception by the RP of the SRS resource transmitted by the UE is corrected for the known time offset.

Clause 13. The UE of any of clauses 9-12, wherein the at least one processor is further configured to transmit, via the wireless transmitter, in response to receiving the PRS resource, an SRS resource to the TRP; wherein one of the plurality of Rx–Tx time difference measurements with respect to the PRS resource is a difference between the time of reception of the PRS resource and a time of transmission of the SRS resource to the TRP.

Clause 14. The UE of any of clauses 9-13, wherein the location information report further comprises an SRS resource ID associated with each Rx–Tx time difference measurement.

Clause 15. The UE of any of clauses 9-14, wherein the location information report further comprises a time stamp associated with each Rx–Tx time difference measurement.

Clause 16. The UE of any of clauses 9-15, wherein the determination of the position of the UE is generated using uplink Time Difference of Arrival (TDOA).

Clause 17. A user equipment (UE) configured for supporting positioning of the UE, comprising: means for receiving a positioning reference signal (PRS) resource from a Transmission/Reception Point (TRP); means for transmitting, in response to receiving the PRS resource, sounding reference signal (SRS) resources to each of a plurality of Reception Points (RPs), wherein a different SRS resource is transmitted to each Reception Point (RP) in the plurality of RPs; means for generating a plurality of receive-transmit (Rx–Tx) time difference measurements with respect to the PRS resource comprising differences between a time of reception of the PRS resource and times of transmission of the SRS resources to each of the plurality of RPs; and means for sending to a location server a location information report comprising the plurality of Rx–Tx time difference measurements with respect to the PRS resource for determination of a position of the UE.

Clause 18. The UE of clause 17, wherein the location server determines the position of the UE using an asymmetric Round Trip Time (RTT) for a time of flight for the PRS resource from the TRP to the UE and a time of flight for the SRS resources from the UE to each RP.

Clause 19. The UE of clause 18, wherein the asymmetric RTT for an RP is based on an Rx–Tx time difference measurement between a time of transmission of the PRS resource by the TRP to the UE and a time of reception by the RP of an SRS resource transmitted by the UE.

Clause 20. The UE of any of clauses 18-19, wherein the TRP and the RP has a known time offset between their respective clocks, and wherein the Rx–Tx time difference measurement between the time of transmission of the PRS resource by the TRP to the UE and the time of reception by the RP of the SRS resource transmitted by the UE is corrected for the known time offset.

Clause 21. The UE of any of clauses 17-20, further comprising means for transmitting, in response to receiving the PRS resource, an SRS resource to the TRP; wherein one of the plurality of Rx–Tx time difference measurements with respect to the PRS resource is a difference between the time of reception of the PRS resource and a time of transmission of the SRS resource to the TRP.

Clause 22. The UE of any of clauses 17-21, wherein the location information report further comprises an SRS resource ID associated with each Rx–Tx time difference measurement.

Clause 23. The UE of any of clauses 17-22, wherein the location information report further comprises a time stamp associated with each Rx–Tx time difference measurement.

Clause 24. The UE of any of clauses 17-23, wherein the determination of the position of the UE is generated using uplink Time Difference of Arrival (TDOA).

Clause 25. A non-transitory storage medium including program code stored thereon, the program code is operable to configure at least one processor in user equipment (UE) for supporting positioning of the UE, the program code comprising instructions to: receive a positioning reference signal (PRS) resource from a Transmission/Reception Point (TRP); transmit, in response to receiving the PRS resource, sounding reference signal (SRS) resources to each of a plurality of Reception Points (RPs), wherein a different SRS resource is transmitted to each Reception Point (RP) in the plurality of RPs; generate a plurality of receive-transmit (Rx–Tx) time difference measurements with respect to the PRS resource comprising differences between a time of reception of the PRS resource and times of transmission of the SRS resources to each of the plurality of RPs; and send to a location server a location information report comprising the plurality of Rx-Tx time difference measurements with respect to the PRS resource for determination of a position of the UE.

Clause 26. The non-transitory storage medium of clause 25, wherein the location server determines the position of the UE using an asymmetric Round Trip Time (RTT) for a time of flight for the PRS resource from the TRP to the UE and a time of flight for the SRS resources from the UE to each RP.

Clause 27. The non-transitory storage medium of clause 26, wherein the asymmetric RTT for an RP is based on an Rx-Tx time difference measurement between a time of transmission of the PRS resource by the TRP to the UE and a time of reception by the RP of an SRS resource transmitted by the UE.

Clause 28. The non-transitory storage medium of any of clauses 26-27, wherein the TRP and the RP has a known time offset between their respective clocks, and wherein the Rx-Tx time difference measurement between the time of transmission of the PRS resource by the TRP to the UE and the time of reception by the RP of the SRS resource transmitted by the UE is corrected for the known time offset.

Clause 29. The non-transitory storage medium of any of clauses 25-28, wherein the program code further comprises instructions to transmit, in response to receiving the PRS resource, an SRS resource to the TRP; wherein one of the plurality of Rx-Tx time difference measurements with respect to the PRS resource is a difference between the time of reception of the PRS resource and a time of transmission of the SRS resource to the TRP.

Clause 30. The non-transitory storage medium of any of clauses 25-29, wherein the location information report further comprises an SRS resource ID associated with each Rx-Tx time difference measurement.

Clause 31. The non-transitory storage medium of any of clauses 25-30, wherein the location information report further comprises a time stamp associated with each Rx-Tx time difference measurement.

Clause 32. The non-transitory storage medium of any of clauses 25-31, wherein the determination of the position of the UE is generated using uplink Time Difference of Arrival (TDOA).

Clause 33. A method performed by a location server for supporting positioning of the UE, comprising: receiving from the UE a first location information report comprising a plurality of receive-transmit (Rx-Tx) time difference measurements with respect to a positioning reference signal (PRS) resource received by the UE from a Transmission/Reception Point (TRP), wherein the plurality of Rx-Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; receiving from the TRP a second location information report comprising positioning measurements for the plurality of RPs; and determining a position of the UE based on the first location information report and the second location information report.

Clause 34. The method of clause 33, wherein the positioning measurements for the plurality of RPs comprises a plurality of Rx-Tx time difference measurements, wherein each Rx-Tx time difference measurement comprises a difference between a time of transmission of the PRS resource by the TRP to the UE and a time of reception by an RP of an SRS resource transmitted by the UE to the RP, and wherein determining the position of the UE is at least partly based on an asymmetric Round Trip Time (RTT) for a time of flight for the PRS resource from the TRP to the UE and a time of flight for the SRS resources from the UE to each RP.

Clause 35. The method of clause 34, wherein the TRP and each RP has a known time offset between their respective clocks and an Rx-Tx time difference measurement for each RP is corrected for the known time offset.

Clause 36. The method of any of clauses 33-34, wherein the first location information report further comprises an Rx-Tx time difference measurement with respect to the PRS resource that is a time difference between a time of reception of the PRS resource by the UE and a time of transmission by an SRS resource by the UE to the TRP, and wherein the second location information report further comprises a positioning measurement for the TRP.

Clause 37. The method of clause 36, wherein the positioning measurements for the TRP comprises a Rx-Tx time difference measurement between the time of transmission of the PRS resource by the TRP and a time of reception of the SRS resource by the TRP, wherein determining the position of the UE is at least partly based on an on a Round Trip Time (RTT) for a time of flight for the PRS resource from the TRP to the UE and a time of flight for the SRS resource from the UE to the TRP based on the first location information report and the second location information report.

Clause 38. The method of any of clauses 33-37, wherein the first location information report further comprises an SRS resource ID associated with each Rx-Tx time difference measurement.

Clause 39. The method of any of clauses 33-38, wherein the first location information report further comprises a time stamp associated with each Rx-Tx time difference measurement.

Clause 40. The method of any of clauses 33-39, wherein the positioning measurements for the plurality of RPs comprises a plurality of receive-receive (Rx-Rx) time difference measurements, wherein each Rx-Rx time difference measurement comprise a difference between a time of reception by an RP of the PRS resource transmitted by the TRP and a time of reception by the RP of an SRS resource transmitted by the UE to the RP, wherein determining the position of the UE is at least partly based on an uplink Time Difference of Arrival (TDOA) for the plurality of RPs.

Clause 41. A location server configured for supporting positioning of the UE, comprising: a communications interface configured to communicate with entities in a wireless network; at least one memory; and at least one processor coupled to the communications interface and the at least one memory, wherein the at least one processor is configured to: receive, via the communications interface, from the UE a first location information report comprising a plurality of receive-transmit (Rx-Tx) time difference measurements with respect to a positioning reference signal (PRS) resource received by the UE from a Transmission/Reception Point (TRP), wherein the plurality of Rx-Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; receive, via the communications interface, from the TRP a second location information report comprising positioning measurements for the plurality of RPs; and determine a position of the UE based on the first location information report and the second location information report.

Clause 42. The location server of clause 41, wherein the positioning measurements for the plurality of RPs comprises a plurality of Rx–Tx time difference measurements, wherein each Rx–Tx time difference measurement comprises a difference between a time of transmission of the PRS resource by the TRP to the UE and a time of reception by an RP of an SRS resource transmitted by the UE to the RP, and wherein the at least one processor is configured to determine the position of the UE at least partly based on an asymmetric Round Trip Time (RTT) for a time of flight for the PRS resource from the TRP to the UE and a time of flight for the SRS resources from the UE to each RP.

Clause 43. The location server of clause 42, wherein the TRP and each RP has a known time offset between their respective clocks and an Rx–Tx time difference measurement for each RP is corrected for the known time offset.

Clause 44. The location server of any of clauses 41-43, wherein the first location information report further comprises an Rx–Tx time difference measurement with respect to the PRS resource that is a time difference between a time of reception of the PRS resource by the UE and a time of transmission by an SRS resource by the UE to the TRP, and wherein the second location information report further comprises a positioning measurement for the TRP.

Clause 45. The location server of clause 44, wherein the positioning measurements for the TRP comprises a Rx–Tx time difference measurement between the time of transmission of the PRS resource by the TRP and a time of reception of the SRS resource by the TRP, wherein the at least one processor is configured to determine the position of the UE at least partly based on an on a Round Trip Time (RTT) for a time of flight for the PRS resource from the TRP to the UE and a time of flight for the SRS resource from the UE to the TRP based on the first location information report and the second location information report.

Clause 46. The location server of any of clauses 41-45, wherein the first location information report further comprises an SRS resource ID associated with each Rx–Tx time difference measurement.

Clause 47. The location server of any of clauses 41-46, wherein the first location information report further comprises a time stamp associated with each Rx–Tx time difference measurement.

Clause 48. The location server of any of clauses 41-47, wherein the positioning measurements for the plurality of RPs comprises a plurality of receive-receive (Rx–Rx) time difference measurements, wherein each Rx–Rx time difference measurement comprise a difference between a time of reception by an RP of the PRS resource transmitted by the TRP and a time of reception by the RP of an SRS resource transmitted by the UE to the RP, wherein the at least one processor is configured to determine the position of the UE is at least partly based on an uplink Time Difference of Arrival (TDOA) for the plurality of RPs.

Clause 49. A location server configured for supporting positioning of the UE, comprising: means for receiving from the UE a first location information report comprising a plurality of receive-transmit (Rx–Tx) time difference measurements with respect to a positioning reference signal (PRS) resource received by the UE from a Transmission/Reception Point (TRP), wherein the plurality of Rx–Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; means for receiving from the TRP a second location information report comprising positioning measurements for the plurality of RPs; and means for determining a position of the UE based on the first location information report and the second location information report.

Clause 50. The location server of clause 49, wherein the positioning measurements for the plurality of RPs comprises a plurality of Rx–Tx time difference measurements, wherein each Rx–Tx time difference measurement comprises a difference between a time of transmission of the PRS resource by the TRP to the UE and a time of reception by an RP of an SRS resource transmitted by the UE to the RP, and wherein the means for determining the position of the UE determines the position at least partly based on an asymmetric Round Trip Time (RTT) for a time of flight for the PRS resource from the TRP to the UE and a time of flight for the SRS resources from the UE to each RP.

Clause 51. The location server of clause 50, wherein the TRP and each RP has a known time offset between their respective clocks and an Rx–Tx time difference measurement for each RP is corrected for the known time offset.

Clause 52. The location server of any of clauses 49-51, wherein the first location information report further comprises an Rx–Tx time difference measurement with respect to the PRS resource that is a time difference between a time of reception of the PRS resource by the UE and a time of transmission by an SRS resource by the UE to the TRP, and wherein the second location information report further comprises a positioning measurement for the TRP.

Clause 53. The location server of clause 52, wherein the positioning measurements for the TRP comprises a Rx–Tx time difference measurement between the time of transmission of the PRS resource by the TRP and a time of reception of the SRS resource by the TRP, wherein the means for determining the position of the UE determines the position at least partly based on an on a Round Trip Time (RTT) for a time of flight for the PRS resource from the TRP to the UE and a time of flight for the SRS resource from the UE to the TRP based on the first location information report and the second location information report.

Clause 54. The location server of any of clauses 49-53, wherein the first location information report further comprises an SRS resource ID associated with each Rx–Tx time difference measurement.

Clause 55. The location server of any of clauses 49-54, wherein the first location information report further comprises a time stamp associated with each Rx–Tx time difference measurement.

Clause 56. The location server of any of clauses 49-55, wherein the positioning measurements for the plurality of RPs comprises a plurality of receive-receive (Rx–Rx) time difference measurements, wherein each Rx–Rx time difference measurement comprise a difference between a time of reception by an RP of the PRS resource transmitted by the TRP and a time of reception by the RP of an SRS resource transmitted by the UE to the RP, wherein the means for determining the position of the UE determines the position at least partly based on an uplink Time Difference of Arrival (TDOA) for the plurality of RPs.

Clause 57. A non-transitory storage medium including program code stored thereon, the program code is operable to configure at least one processor in location server for supporting positioning of the UE, the program code comprising instructions to: receive from the UE a first location information report comprising a plurality of receive-transmit (Rx-Tx) time difference measurements with respect to a positioning reference signal (PRS) resource received by the UE from a Transmission/Reception Point (TRP), wherein the plurality of Rx-Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource; receive from the TRP a second location information report comprising positioning measurements for the plurality of RPs; and determine a position of the UE based on the first location information report and the second location information report.

Clause 58. The non-transitory storage medium of clause 57, wherein the positioning measurements for the plurality of RPs comprises a plurality of Rx-Tx time difference measurements, wherein each Rx-Tx time difference measurement comprises a difference between a time of transmission of the PRS resource by the TRP to the UE and a time of reception by an RP of an SRS resource transmitted by the UE to the RP, and wherein the instruction to determine the position of the UE comprises instructions to determine the position at least partly based on an asymmetric Round Trip Time (RTT) for a time of flight for the PRS resource from the TRP to the UE and a time of flight for the SRS resources from the UE to each RP.

Clause 59. The non-transitory storage medium of clause 58, wherein the TRP and each RP has a known time offset between their respective clocks and an Rx-Tx time difference measurement for each RP is corrected for the known time offset.

Clause 60. The non-transitory storage medium of any of clauses 57-59, wherein the first location information report further comprises an Rx-Tx time difference measurement with respect to the PRS resource that is a time difference between a time of reception of the PRS resource by the UE and a time of transmission by an SRS resource by the UE to the TRP, and wherein the second location information report further comprises a positioning measurement for the TRP.

Clause 61. The non-transitory storage medium of clause 60, wherein the positioning measurements for the TRP comprises a Rx-Tx time difference measurement between the time of transmission of the PRS resource by the TRP and a time of reception of the SRS resource by the TRP, wherein the instruction to determine the position of the UE comprises instructions to determine the position at least partly based on an on a Round Trip Time (RTT) for a time of flight for the PRS resource from the TRP to the UE and a time of flight for the SRS resource from the UE to the TRP based on the first location information report and the second location information report.

Clause 62. The non-transitory storage medium of any of clauses 57-61, wherein the first location information report further comprises an SRS resource ID associated with each Rx-Tx time difference measurement.

Clause 63. The non-transitory storage medium of any of clauses 57-62, wherein the first location information report further comprises a time stamp associated with each Rx-Tx time difference measurement.

Clause 64. The non-transitory storage medium of any of clauses 57-63, wherein the positioning measurements for the plurality of RPs comprises a plurality of receive-receive (Rx-Rx) time difference measurements, wherein each Rx-Rx time difference measurement comprise a difference between a time of reception by an RP of the PRS resource transmitted by the TRP and a time of reception by the RP of an SRS resource transmitted by the UE to the RP, wherein the instruction to determine the position of the UE comprises instructions to determine the position at least partly based on an uplink Time Difference of Arrival (TDOA) for the plurality of RPs.

Clause 65. A method performed by a Reception Point (RP) for supporting positioning of the UE in a wireless network, comprising: receiving from the UE a sounding reference signal (SRS) resource; generating a positioning measurement for the UE based on the SRS resource received from the UE; reporting the positioning measurement to a Transmission/Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

Clause 66. The method of clause 65, wherein the positioning measurement comprises the Rx-Rx time difference measurement if the RP does not have the known clock offset with respect to the TRP.

Clause 67. The method of any of clauses 65-66, wherein if the positioning measurement comprises the Rx-Rx time difference measurement, the location server determines the position of the UE based at least partly on an uplink Time Difference of Arrival (TDOA).

Clause 68. The method of any of clauses 65-66, wherein if the positioning measurement comprises the time of reception of the SRS resource, the location server determines the position of the UE based at least partly on an asymmetric Round Trip Time (RTT) for a time of flight for the PRS resource from the TRP to the UE and a time of flight for the SRS resource from the UE to the RP.

Clause 69. The method of clause 68, wherein the asymmetric RTT is determined based on an Rx-Tx time difference measurement from the TRP and a Rx-Tx time difference measurement from the UE comprising a difference between a time of reception of the PRS resource by the UE and a time of transmission of the SRS resource by the UE to the RP.

Clause 70. A Reception Point (RP) configured for supporting positioning of the UE in a wireless network, comprising: an external interface configured to communicate with entities in a wireless network; at least one memory; and at least one processor coupled to the external interface and the at least one memory, wherein the at least one processor is configured to: receive, via the external interface, from the UE a sounding reference signal (SRS) resource; generate a positioning measurement for the UE based on the SRS resource received from the UE; report, via the external interface, the positioning measurement to a Transmission/ Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

Clause 71. The RP of clause 70, wherein the positioning measurement comprises the Rx-Rx time difference measurement if the RP does not have the known clock offset with respect to the TRP.

Clause 72. The RP of any of clauses 70-71, wherein if the positioning measurement comprises the Rx-Rx time difference measurement, the location server determines the position of the UE based at least partly on an uplink Time Difference of Arrival (TDOA).

Clause 73. The RP of any of clauses 70-72, wherein if the positioning measurement comprises the time of reception of the SRS resource, the location server determines the position of the UE based at least partly on an asymmetric Round Trip Time (RTT) for a time of flight for the PRS resource from the TRP to the UE and a time of flight for the SRS resource from the UE to the RP.

Clause 74. The RP of clause 73, wherein the asymmetric RTT is determined based on an Rx-Tx time difference measurement from the TRP and a Rx-Tx time difference measurement from the UE comprising a difference between a time of reception of the PRS resource by the UE and a time of transmission of the SRS resource by the UE to the RP.

Clause 75. A Reception Point (RP) configured for supporting positioning of the UE in a wireless network, comprising: means for receiving from the UE a sounding reference signal (SRS) resource; means for generating a positioning measurement for the UE based on the SRS resource received from the UE; means for reporting the positioning measurement to a Transmission/Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

Clause 76. The RP of clause 75, wherein the positioning measurement comprises the Rx-Rx time difference measurement if the RP does not have the known clock offset with respect to the TRP.

Clause 77. The RP of any of clauses 75-76, wherein if the positioning measurement comprises the Rx-Rx time difference measurement, the location server determines the position of the UE based at least partly on an uplink Time Difference of Arrival (TDOA).

Clause 78. The RP of any of clauses 75-77, wherein if the positioning measurement comprises the time of reception of the SRS resource, the location server determines the position of the UE based at least partly on an asymmetric Round Trip Time (RTT) for a time of flight for the PRS resource from the TRP to the UE and a time of flight for the SRS resource from the UE to the RP.

Clause 79. The RP of clause 78, wherein the asymmetric RTT is determined based on an Rx-Tx time difference measurement from the TRP and a Rx-Tx time difference measurement from the UE comprising a difference between a time of reception of the PRS resource by the UE and a time of transmission of the SRS resource by the UE to the RP.

Clause 80. A non-transitory storage medium including program code stored thereon, the program code is operable to configure at least one processor in a Reception Point (RP) for supporting positioning of the UE in a wireless network, the program code comprising instruction to: receive from the UE a sounding reference signal (SRS) resource; generate a positioning measurement for the UE based on the SRS resource received from the UE; report the positioning measurement to a Transmission/Reception Point (TRP) to which the RP is connected, wherein the positioning measurement comprises at least one of: a receive-receive (Rx-Rx) time difference measurement, wherein the Rx-Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx-Rx time difference measurement to a location server for determining a position of the UE; a time of reception of the SRS resource if the RP has a known clock offset with respect to the TRP, wherein the TRP determines a receive-transmit (Rx-Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx-Tx time difference measurement to the location server for determining the position of the UE; and a combination thereof.

Clause 81. The non-transitory storage medium of clause 80, wherein the positioning measurement comprises the Rx-Rx time difference measurement if the RP does not have the known clock offset with respect to the TRP.

Clause 82. The non-transitory storage medium of any of clauses 80-81, wherein if the positioning measurement comprises the Rx-Rx time difference measurement, the location server determines the position of the UE based at least partly on an uplink Time Difference of Arrival (TDOA).

Clause 83. The non-transitory storage medium of any of clauses 80-82, wherein if the positioning measurement comprises the time of reception of the SRS resource, the location server determines the position of the UE based at least partly on an asymmetric Round Trip Time (RTT) for a time of flight for the PRS resource from the TRP to the UE and a time of flight for the SRS resource from the UE to the RP.

Clause 84. The non-transitory storage medium of clause 83, wherein the asymmetric RTT is determined based on an Rx-Tx time difference measurement from the TRP and a Rx-Tx time difference measurement from the UE comprising a difference between a time of reception of the PRS resource by the UE and a time of transmission of the SRS resource by the UE to the RP.

Clause 85. A method performed by a location server for supporting positioning of the UE in a wireless network, comprising: receiving positioning measurements for the UE from a Transmission/Reception Point (TRP), wherein the positioning measurements comprise: a receive-receive (Rx-Rx) time difference measurement from a first Reception Point (RP) coupled to the TRP, wherein the Rx-Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx-Tx) time difference measurement for the TRP and a second RP coupled to the TRP, the second RP has a known clock offset with respect to the TRP, the Rx-Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and determining a position for the UE based on the positioning measurements including the Rx-Rx time difference measurement for the first RP and the Rx-Tx time difference measurement for the TRP and the second RP.

Clause 86. The method of clause 85, wherein the first RP does not have the known clock offset with respect to the TRP.

Clause 87. The method of any of clauses 85-86, wherein the positioning measurements further comprises a second Rx-Tx time difference measurement for the TRP and the first RP, the first RP has a second known clock offset with respect to the TRP, wherein the second Rx-Tx time difference measurement is determined by the TRP based on a difference between the time of transmission of the PRS resource by the TRP and a time of reception by the first RP of the first SRS resource transmitted by the UE to the first RP and the second known clock offset.

Clause 88. The method of any of clauses 85-87, further comprising receiving positioning measurements from the UE comprising a first Rx-Tx time difference measurement from the UE comprising a difference between a time of reception of the PRS resource by the UE and a time of transmission of the first SRS resource by the UE to the first RP, and a second Rx-Tx time difference measurement from the UE comprising a difference between the time of reception of the PRS resource by the UE and a time of transmission of the second SRS resource by the UE to the second RP, wherein determining the position for the UE is further based on the positioning measurements from the UE.

Clause 89. The method of clause 88, wherein determining the position for the UE is based at least partly on an uplink Time Difference of Arrival (TDOA) using the Rx-Rx time difference measurement and the first Rx-Tx time difference measurement from the UE.

Clause 90. The method of clause 88, wherein determining the position for the UE is based at least partly on an asymmetric Round Trip Time (RTT) for a time of flight for the PRS resource from the TRP to the UE and a time of flight for the second SRS resource from the UE to the second RP using the Rx-Tx time difference measurement and the second Rx-Tx time difference measurement from the UE.

Clause 91. A location server for supporting positioning of the UE in a wireless network, comprising: a communications interface configured to communicate with entities in a wireless network; at least one memory; and at least one processor coupled to the communications interface and the at least one memory, wherein the at least one processor is configured to: receive, via the communications interface, positioning measurements for the UE from a Transmission/Reception Point (TRP), wherein the positioning measurements comprise: a receive-receive (Rx-Rx) time difference measurement from a first Reception Point (RP) coupled to the TRP, wherein the Rx-Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx-Tx) time difference measurement for the TRP and a second RP coupled to the TRP, the second RP has a known clock offset with respect to the TRP, the Rx-Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and determine a position for the UE based on the positioning measurements including the Rx-Rx time difference measurement for the first RP and the Rx-Tx time difference measurement for the TRP and the second RP.

Clause 92. The location server of clause 91, wherein the first RP does not have the known clock offset with respect to the TRP.

Clause 93. The location server of any of clauses 91-92, wherein the positioning measurements further comprises a second Rx-Tx time difference measurement for the TRP and the first RP, the first RP has a second known clock offset with respect to the TRP, wherein the second Rx-Tx time difference measurement is determined by the TRP based on a difference between the time of transmission of the PRS resource by the TRP and a time of reception by the first RP of the first SRS resource transmitted by the UE to the first RP and the second known clock offset.

Clause 94. The location server of any of clauses 91-93, the at least one processor is further configured to receive, via the communications interface, positioning measurements from the UE comprising a first Rx-Tx time difference measurement from the UE comprising a difference between a time of reception of the PRS resource by the UE and a time of transmission of the first SRS resource by the UE to the first RP, and a second Rx-Tx time difference measurement from the UE comprising a difference between the time of reception of the PRS resource by the UE and a time of transmission of the second SRS resource by the UE to the second RP, wherein the at least one processor is configured to determine the position for the UE further based on the positioning measurements from the UE.

Clause 95. The location server of clause 94, wherein the at least one processor is configured to determine the position for the UE based at least partly on an uplink Time Difference of Arrival (TDOA) using the Rx-Rx time difference measurement and the first Rx-Tx time difference measurement from the UE.

Clause 96. The location server of clause 94, wherein the at least one processor is configured to determine the position for the UE based at least partly on an asymmetric Round Trip Time (RTT) for a time of flight for the PRS resource from the TRP to the UE and a time of flight for the second SRS resource from the UE to the second RP using the Rx–Tx time difference measurement and the second Rx–Tx time difference measurement from the UE.

Clause 97. A location server for supporting positioning of the UE in a wireless network, comprising: means for receiving positioning measurements for the UE from a Transmission/Reception Point (TRP), wherein the positioning measurements comprise: a receive-receive (Rx–Rx) time difference measurement from a first Reception Point (RP) coupled to the TRP, wherein the Rx–Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx–Tx) time difference measurement for the TRP and a second RP coupled to the TRP, the second RP has a known clock offset with respect to the TRP, the Rx–Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and means for determining a position for the UE based on the positioning measurements including the Rx–Rx time difference measurement for the first RP and the Rx–Tx time difference measurement for the TRP and the second RP.

Clause 98. The location server of clause 97, wherein the first RP does not have the known clock offset with respect to the TRP.

Clause 99. The location server of any of clauses 97-98, wherein the positioning measurements further comprises a second Rx–Tx time difference measurement for the TRP and the first RP, the first RP has a second known clock offset with respect to the TRP, wherein the second Rx–Tx time difference measurement is determined by the TRP based on a difference between the time of transmission of the PRS resource by the TRP and a time of reception by the first RP of the first SRS resource transmitted by the UE to the first RP and the second known clock offset.

Clause 100. The location server of any of clauses 97-98, further comprising means for receiving positioning measurements from the UE comprising a first Rx–Tx time difference measurement from the UE comprising a difference between a time of reception of the PRS resource by the UE and a time of transmission of the first SRS resource by the UE to the first RP, and a second Rx–Tx time difference measurement from the UE comprising a difference between the time of reception of the PRS resource by the UE and a time of transmission of the second SRS resource by the UE to the second RP, wherein the means for determining the position for the UE determines the position further based on the positioning measurements from the UE.

Clause 101. The location server of clause 100, wherein the means for determining the position for the UE determines the position based at least partly on an uplink Time Difference of Arrival (TDOA) using the Rx–Rx time difference measurement and the first Rx–Tx time difference measurement from the UE.

Clause 102. The location server of clause 100, wherein the means for determine the position for the UE determines the position based at least partly on an asymmetric Round Trip Time (RTT) for a time of flight for the PRS resource from the TRP to the UE and a time of flight for the second SRS resource from the UE to the second RP using the Rx–Tx time difference measurement and the second Rx–Tx time difference measurement from the UE.

Clause 103. A non-transitory storage medium including program code stored thereon, the program code is operable to configure at least one processor in a location server for supporting positioning of the UE in a wireless network, the program code comprising instructions to: receive positioning measurements for the UE from a Transmission/Reception Point (TRP), wherein the positioning measurements comprise: a receive-receive (Rx–Rx) time difference measurement from a first Reception Point (RP) coupled to the TRP, wherein the Rx–Rx time difference measurement comprises a difference between a time of reception by the first RP of a positioning reference signal (PRS) resource transmitted by the TRP and a time of reception by the first RP of a first sounding reference signal (SRS) resource transmitted by the UE to the first RP; a receive-transmit (Rx–Tx) time difference measurement for the TRP and a second RP coupled to the TRP, the second RP has a known clock offset with respect to the TRP, the Rx–Tx time difference measurement is determined by the TRP based on a difference between a time of transmission of the PRS resource by the TRP and a time of reception by the second RP of a second SRS resource transmitted by the UE to the second RP in response to the PRS resource and the known clock offset; and determine a position for the UE based on the positioning measurements including the Rx–Rx time difference measurement for the first RP and the Rx–Tx time difference measurement for the TRP and the second RP.

Clause 104. The non-transitory storage medium of clause 103, wherein the first RP does not have the known clock offset with respect to the TRP.

Clause 105. The non-transitory storage medium of any of clauses 103-104, wherein the positioning measurements further comprises a second Rx–Tx time difference measurement for the TRP and the first RP, the first RP has a second known clock offset with respect to the TRP, wherein the second Rx–Tx time difference measurement is determined by the TRP based on a difference between the time of transmission of the PRS resource by the TRP and a time of reception by the first RP of the first SRS resource transmitted by the UE to the first RP and the second known clock offset.

Clause 106. The non-transitory storage medium of any of clauses 103-15, the program code further comprises instructions to receive positioning measurements from the UE comprising a first Rx–Tx time difference measurement from the UE comprising a difference between a time of reception of the PRS resource by the UE and a time of transmission of the first SRS resource by the UE to the first RP, and a second Rx–Tx time difference measurement from the UE comprising a difference between the time of reception of the PRS resource by the UE and a time of transmission of the second SRS resource by the UE to the second RP, wherein the instructions to determine the position for the UE comprise instructions to determine the position further based on the positioning measurements from the UE.

Clause 107. The non-transitory storage medium of clause 106, wherein the instructions to determine the position for the UE comprise instructions to determine the position based at least partly on an uplink Time Difference of Arrival (TDOA) using the Rx–Rx time difference measurement and the first Rx–Tx time difference measurement from the UE.

Clause 108. The non-transitory storage medium of clause 106, wherein the instructions to determine the position for the UE comprise instructions to determine the position based at least partly on an asymmetric Round Trip Time (RTT) for a time of flight for the PRS resource from the TRP to the UE and a time of flight for the second SRS resource from the UE to the second RP using the Rx–Tx time difference measurement and the second Rx–Tx time difference measurement from the UE.

Clause 109. A method performed by a user equipment (UE) for supporting positioning of a UE in a wireless network, comprising: transmitting a first sounding reference signal (SRS) to a Reception Point (RP), wherein the RP is a reception only node in the wireless network that is coupled to a Transmissions/Reception Point (TRP); receiving path loss reference values from the TRP, wherein the path loss reference values are determined based on the first SRS transmitted by the UE to the RP; and transmitting a second SRS to the RP for positioning using the path loss reference values.

Clause 110. The method of clause 109, wherein the first SRS is transmitted with a pre-determined path loss function, and wherein the path loss reference values are determined based on the pre-determined path loss function.

Clause 111. The method of clause 110, wherein the pre-determined path loss function is based on a distance between the TRP and the UE.

Clause 112. The method of any of clauses 109-111, wherein the path loss reference values are determined by the TRP.

Clause 113. The method of any of clauses 109-112, wherein the path loss reference values are determined by a location server and are received by the UE from the location server via the TRP.

Clause 114. The method of any of clauses 109-113, wherein transmitting the second SRS to the RP for positioning using the path loss reference values comprises configuring less than all SRS resources in an SRS resource set based on the path loss reference values.

Clause 115. The method of clause 114, wherein less than all SRS resources in the SRS resource set comprises a group of SRS resources or an individual SRS resource.

Clause 116. A user equipment (UE) configured for supporting positioning of a UE in a wireless network, comprising: a wireless transceiver configured to communicate with entities in a wireless network; at least one memory; and at least one processor coupled to the wireless transceiver and the at least one memory, wherein the at least one processor is configured to: transmit, via the wireless transceiver, a first sounding reference signal (SRS) to a Reception Point (RP), wherein the RP is a reception only node in the wireless network that is coupled to a Transmissions/Reception Point (TRP); receive, via the wireless transceiver, path loss reference values from the TRP, wherein the path loss reference values are determined based on the first SRS transmitted by the UE to the RP; and transmit, via the wireless transceiver, a second SRS to the RP for positioning using the path loss reference values.

Clause 117. The UE of clause 116, wherein the first SRS is transmitted with a pre-determined path loss function, and wherein the path loss reference values are determined based on the pre-determined path loss function.

Clause 118. The UE of clause 117, wherein the pre-determined path loss function is based on a distance between the TRP and the UE.

Clause 119. The UE of any of clauses 116-118, wherein the path loss reference values are determined by the TRP.

Clause 120. The UE of any of clauses 116-119, wherein the path loss reference values are determined by a location server and are received by the UE from the location server via the TRP.

Clause 121. The UE of any of clauses 116-120, wherein the at least one processor is configured to transmit the second SRS to the RP for positioning using the path loss reference values by being configured to configure less than all SRS resources in an SRS resource set based on the path loss reference values.

Clause 122. The UE of clause 121, wherein less than all SRS resources in the SRS resource set comprises a group of SRS resources or an individual SRS resource.

Clause 123. A user equipment (UE) configured for supporting positioning of a UE in a wireless network, comprising: means for transmitting a first sounding reference signal (SRS) to a Reception Point (RP), wherein the RP is a reception only node in the wireless network that is coupled to a Transmissions/Reception Point (TRP); means for receiving path loss reference values from the TRP, wherein the path loss reference values are determined based on the first SRS transmitted by the UE to the RP; and means for transmitting a second SRS to the RP for positioning using the path loss reference values.

Clause 124. The UE of clause 123, wherein the first SRS is transmitted with a pre-determined path loss function, and wherein the path loss reference values are determined based on the pre-determined path loss function.

Clause 125. The UE of clause 124, wherein the pre-determined path loss function is based on a distance between the TRP and the UE.

Clause 126. The UE of any of clauses 123-125, wherein the path loss reference values are determined by the TRP.

Clause 127. The UE of any of clauses 123-126, wherein the path loss reference values are determined by a location server and are received by the UE from the location server via the TRP.

Clause 128. The UE of any of clauses 123-127, wherein the means for transmitting the second SRS to the RP for positioning using the path loss reference values comprises means for configuring less than all SRS resources in an SRS resource set based on the path loss reference values.

Clause 129. The UE of clause 128, wherein less than all SRS resources in the SRS resource set comprises a group of SRS resources or an individual SRS resource.

Clause 130. A non-transitory storage medium including program code stored thereon, the program code is operable to configure at least one processor in a user equipment (UE) configured for supporting positioning of a UE in a wireless network, the program code comprising instructions to: transmit a first sounding reference signal (SRS) to a Reception Point (RP), wherein the RP is a reception only node in the wireless network that is coupled to a Transmissions/Reception Point (TRP); receive path loss reference values from the TRP, wherein the path loss reference values are determined based on the first SRS transmitted by the UE to the RP; and transmit a second SRS to the RP for positioning using the path loss reference values.

Clause 131. The non-transitory storage medium of clause 130, wherein the first SRS is transmitted with a pre-determined path loss function, and wherein the path loss reference values are determined based on the pre-determined path loss function.

Clause 132. The non-transitory storage medium of clause 131, wherein the pre-determined path loss function is based on a distance between the TRP and the UE.

Clause 133. The non-transitory storage medium of any of clauses 130-132, wherein the path loss reference values are determined by the TRP.

Clause 134. The non-transitory storage medium of any of clauses 130-133, wherein the path loss reference values are determined by a location server and are received by the UE from the location server via the TRP.

Clause 135. The non-transitory storage medium of any of clauses 130-134, wherein the instructions to transmit the second SRS to the RP for positioning using the path loss reference values comprise instructions to configure less than all SRS resources in an SRS resource set based on the path loss reference values.

Clause 136. The non-transitory storage medium of clause 135, wherein less than all SRS resources in the SRS resource set comprises a group of SRS resources or an individual SRS resource.

Clause 137. A method performed by a Transmission/Reception Point (TRP) for supporting positioning of a UE in a wireless network, comprising: receiving a signal strength measurement from a Reception Point (RP) for a first sounding reference signal (SRS) received by the RP from the UE, wherein the RP is a reception only node in the wireless network that is coupled to a Transmissions/Reception Point (TRP); and sending path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

Clause 138. The method of clause 137, wherein the first SRS is transmitted by the UE with a pre-determined path loss function, and wherein the path loss reference values are determined based on the pre-determined path loss function.

Clause 139. The method of clause 138, wherein the pre-determined path loss function is based on a distance between the TRP and the UE.

Clause 140. The method of any of clauses 137-139, further comprising determining the path loss reference values based on the signal strength measurement of the first SRS received by the TRP.

Clause 141. The method of any of clauses 137-140, further comprising: sending the signal strength measurement of the first SRS to a location server, wherein the location server determines the path loss reference values based on the signal strength measurement of the first SRS, and receiving the path loss reference values from the location server before sending the path loss reference values to the UE.

Clause 142. The method of any of clauses 137-141, wherein the path loss reference values are for configuring less than all SRS resources in an SRS resource set based on the path loss reference values.

Clause 143. The method of clause 142, wherein less than all SRS resources in the SRS resource set comprises a group of SRS resources or an individual SRS resource.

Clause 144. A Transmission/Reception Point (TRP) configured for supporting positioning of a UE in a wireless network, comprising: an external interface configured to communicate with entities in a wireless network; at least one memory; and at least one processor coupled to the external interface and the at least one memory, wherein the at least one processor is configured to: receive, via the external interface, a signal strength measurement from a Reception Point (RP) for a first sounding reference signal (SRS) received by the RP from the UE, wherein the RP is a reception only node in the wireless network that is coupled to a Transmissions/Reception Point (TRP); and send, via the external interface, path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

Clause 145. The TRP of clause 144, wherein the first SRS is transmitted by the UE with a pre-determined path loss function, and wherein the path loss reference values are determined based on the pre-determined path loss function.

Clause 146. The TRP of clause 145, wherein the pre-determined path loss function is based on a distance between the TRP and the UE.

Clause 147. The TRP of any of clauses 144-146, the at least one processor is further configured to determine the path loss reference values based on the signal strength measurement of the first SRS received by the TRP.

Clause 148. The TRP of any of clauses 144-147, the at least one processor is further configured to: send, via the external interface, the signal strength measurement of the first SRS to a location server, wherein the location server determines the path loss reference values based on the signal strength measurement of the first SRS, and receive, via the external interface, the path loss reference values from the location server before sending the path loss reference values to the UE.

Clause 149. The TRP of any of clauses 144-148, wherein the path loss reference values are for configuring less than all SRS resources in an SRS resource set based on the path loss reference values.

Clause 150. The TRP of clause 149, wherein less than all SRS resources in the SRS resource set comprises a group of SRS resources or an individual SRS resource.

Clause 151. A Transmission/Reception Point (TRP) configured for supporting positioning of a UE in a wireless network, comprising: means for receiving a signal strength measurement from a Reception Point (RP) for a first sounding reference signal (SRS) received by the RP from the UE, wherein the RP is a reception only node in the wireless network that is coupled to a Transmissions/Reception Point (TRP); and means for sending path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

Clause 152. The TRP of clause 151, wherein the first SRS is transmitted by the UE with a pre-determined path loss function, and wherein the path loss reference values are determined based on the pre-determined path loss function.

Clause 153. The TRP of clause 152, wherein the pre-determined path loss function is based on a distance between the TRP and the UE.

Clause 154. The TRP of any of clauses 151-153, further comprising means for determining the path loss reference values based on the signal strength measurement of the first SRS received by the TRP.

Clause 155. The TRP of any of clauses 151-154, further comprising: means for sending the signal strength measurement of the first SRS to a location server, wherein the location server determines the path loss reference values based on the signal strength measurement of the first SRS, and means for receiving the path loss reference values from the location server before sending the path loss reference values to the UE.

Clause 156. The TRP of any of clauses 151-155, wherein the path loss reference values are for configuring less than all SRS resources in an SRS resource set based on the path loss reference values.

Clause 157. The TRP of clause 156, wherein less than all SRS resources in the SRS resource set comprises a group of SRS resources or an individual SRS resource.

Clause 158. A non-transitory storage medium including program code stored thereon, the program code is operable to configure at least one processor in a Transmission/Reception Point (TRP) for supporting positioning of a UE in a wireless network, the program code comprising instructions to: receive a signal strength measurement from a Reception Point (RP) for a first sounding reference signal (SRS) received by the RP from the UE, wherein the RP is a reception only node in the wireless network that is coupled to a Transmissions/Reception Point (TRP); and send path loss reference values to the UE for configuring subsequent SRS transmissions by the UE to the RP, wherein the path loss reference values are determined based on the signal strength measurement of the first SRS received by the TRP, wherein the UE transmits to the RP a second SRS to for positioning using the path loss reference values.

Clause 159. The non-transitory storage medium of clause 158, wherein the first SRS is transmitted by the UE with a pre-determined path loss function, and wherein the path loss reference values are determined based on the pre-determined path loss function.

Clause 160. The non-transitory storage medium of clause 159, wherein the pre-determined path loss function is based on a distance between the TRP and the UE.

Clause 161. The non-transitory storage medium of any of clauses 158-160, the program code further comprising instructions determine the path loss reference values based on the signal strength measurement of the first SRS received by the TRP.

Clause 162. The non-transitory storage medium of any of clauses 158-161, the program code further comprising instructions: send the signal strength measurement of the first SRS to a location server, wherein the location server determines the path loss reference values based on the signal strength measurement of the first SRS, and receive the path loss reference values from the location server before sending the path loss reference values to the UE.

Clause 163. The non-transitory storage medium of any of clauses 158-162, wherein the path loss reference values are for configuring less than all SRS resources in an SRS resource set based on the path loss reference values.

Clause 164. The non-transitory storage medium of clause 163, wherein less than all SRS resources in the SRS resource set comprises a group of SRS resources or an individual SRS resource.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method performed by a user equipment (UE) for supporting positioning of the UE, comprising:
   receiving a positioning reference signal (PRS) resource from a Transmission/Reception Point (TRP);
   transmitting, in response to receiving the PRS resource, sounding reference signal (SRS) resources to each of a plurality of Reception Points (RPs), wherein a different SRS resource is transmitted to each Reception Point (RP) in the plurality of RPs;
   generating a plurality of receive-transmit (Rx-Tx) time difference measurements with respect to the PRS resource comprising differences between a time of reception of the PRS resource and times of transmission of the SRS resources to each of the plurality of RPs; and
   sending to a location server a location information report comprising the plurality of Rx-Tx time difference measurements with respect to the PRS resource for determination of a position of the UE.

2. The method of claim 1, wherein the location server determines the position of the UE using an asymmetric Round Trip Time (RTT) for a time of flight for the PRS resource from the TRP to the UE and a time of flight for the SRS resources from the UE to each RP.

3. The method of claim 2, wherein the asymmetric RTT for an RP is based on an Rx-Tx time difference measurement between a time of transmission of the PRS resource by the TRP to the UE and a time of reception by the RP of an SRS resource transmitted by the UE.

4. The method of claim 2, wherein the TRP and the RP has a known time offset between their respective clocks, and wherein the Rx-Tx time difference measurement between the time of transmission of the PRS resource by the TRP to the UE and the time of reception by the RP of the SRS resource transmitted by the UE is corrected for the known time offset.

5. The method of claim 1, further comprising transmitting, in response to receiving the PRS resource, an SRS resource to the TRP; wherein one of the plurality of Rx-Tx time difference measurements with respect to the PRS resource is a difference between the time of reception of the PRS resource and a time of transmission of the SRS resource to the TRP.

6. The method of claim 1, wherein the location information report further comprises an SRS resource ID associated with each Rx-Tx time difference measurement.

7. The method of claim 1, wherein the location information report further comprises a time stamp associated with each Rx-Tx time difference measurement.

8. The method of claim 1, wherein the determination of the position of the UE is generated using uplink Time Difference of Arrival (TDOA).

9. A method performed by a location server for supporting positioning of the UE, comprising:
   receiving from the UE a first location information report comprising a plurality of receive-transmit (Rx-Tx) time difference measurements with respect to a positioning reference signal (PRS) resource received by the UE from a Transmission/Reception Point (TRP), wherein the plurality of Rx-Tx time difference measurements comprises differences between a time of reception of the PRS resource by the UE and times of transmission of the SRS resources by the UE to each of a plurality of Reception Points (RPs), wherein a different SRS resource is transmitted by the UE to each RP in response to receiving the PRS resource;
receiving from the TRP a second location information report comprising positioning measurements for the plurality of RPs; and
determining a position of the UE based on the first location information report and the second location information report.

10. The method of claim 9, wherein the positioning measurements for the plurality of RPs comprises a plurality of Rx–Tx time difference measurements, wherein each Rx–Tx time difference measurement comprises a difference between a time of transmission of the PRS resource by the TRP to the UE and a time of reception by an RP of an SRS resource transmitted by the UE to the RP, and wherein determining the position of the UE is at least partly based on an asymmetric Round Trip Time (RTT) for a time of flight for the PRS resource from the TRP to the UE and a time of flight for the SRS resources from the UE to each RP.

11. The method of claim 10, wherein the TRP and each RP has a known time offset between their respective clocks and an Rx–Tx time difference measurement for each RP is corrected for the known time offset.

12. The method of claim 9, wherein the first location information report further comprises an Rx–Tx time difference measurement with respect to the PRS resource that is a time difference between a time of reception of the PRS resource by the UE and a time of transmission by an SRS resource by the UE to the TRP, and wherein the second location information report further comprises a positioning measurement for the TRP.

13. The method of claim 12, wherein the positioning measurements for the TRP comprises a Rx–Tx time difference measurement between the time of transmission of the PRS resource by the TRP and a time of reception of the SRS resource by the TRP, wherein determining the position of the UE is at least partly based on an on a Round Trip Time (RTT) for a time of flight for the PRS resource from the TRP to the UE and a time of flight for the SRS resource from the UE to the TRP based on the first location information report and the second location information report.

14. The method of claim 9, wherein the first location information report further comprises an SRS resource ID associated with each Rx–Tx time difference measurement.

15. The method of claim 9, wherein the first location information report further comprises a time stamp associated with each Rx–Tx time difference measurement.

16. The method of claim 9, wherein the positioning measurements for the plurality of RPs comprises a plurality of receive-receive (Rx–Rx) time difference measurements, wherein each Rx–Rx time difference measurement comprise a difference between a time of reception by an RP of the PRS resource transmitted by the TRP and a time of reception by the RP of an SRS resource transmitted by the UE to the RP, wherein determining the position of the UE is at least partly based on an uplink Time Difference of Arrival (TDOA) for the plurality of RPs.

17. A method performed by a Reception Point (RP) for supporting positioning of the UE in a wireless network, comprising:
receiving from the UE a sounding reference signal (SRS) resource;
generating a positioning measurement for the UE based on the SRS resource received from the UE;
reporting the positioning measurement to a Transmission/Reception Point (TRP) to which the RP is connected, wherein the positioning measurement comprises at least one of:
a receive-receive (Rx–Rx) time difference measurement, wherein the Rx–Rx time difference measurement comprise a difference between a time of reception by the RP of a positioning reference signal (PRS) resource transmitted by the TRP and a time of reception by the RP of the SRS resource transmitted by the UE to the RP, wherein the TRP reports the Rx–Rx time difference measurement to a location server for determining a position of the UE;
a time of reception of the SRS resource if the RP has a known clock offset with respect to the TRP, wherein the TRP determines a receive-transmit (Rx–Tx) time difference measurement based on a difference between a time of transmission of a PRS resource by the TRP to the UE and a time of reception by the RP of the SRS resource transmitted by the UE to the RP in response to the PRS resource and the known clock offset, wherein the TRP reports the Rx–Tx time difference measurement to the location server for determining the position of the UE; and
a combination thereof.

18. The method of claim 17, wherein the positioning measurement comprises the Rx–Rx time difference measurement if the RP does not have the known clock offset with respect to the TRP.

19. The method of claim 17, wherein if the positioning measurement comprises the Rx–Rx time difference measurement, the location server determines the position of the UE based at least partly on an uplink Time Difference of Arrival (TDOA).

20. The method of claim 17, wherein if the positioning measurement comprises the time of reception of the SRS resource, the location server determines the position of the UE based at least partly on an asymmetric Round Trip Time (RTT) for a time of flight for the PRS resource from the TRP to the UE and a time of flight for the SRS resource from the UE to the RP.

21. The method of claim 20, wherein the asymmetric RTT is determined based on an Rx–Tx time difference measurement from the TRP and a Rx–Tx time difference measurement from the UE comprising a difference between a time of reception of the PRS resource by the UE and a time of transmission of the SRS resource by the UE to the RP.

22. A method performed by a user equipment (UE) for supporting positioning of a UE in a wireless network, comprising:
transmitting a first sounding reference signal (SRS) to a Reception Point (RP), wherein the RP is a reception only node in the wireless network that is coupled to a Transmissions/Reception Point (TRP);
receiving path loss reference values from the TRP, wherein the path loss reference values are determined based on the first SRS transmitted by the UE to the RP; and
transmitting a second SRS to the RP for positioning using the path loss reference values.

23. The method of claim 22, wherein the first SRS is transmitted with a pre-determined path loss function, and wherein the path loss reference values are determined based on the pre-determined path loss function.

24. The method of claim 23, wherein the pre-determined path loss function is based on a distance between the TRP and the UE.

25. The method of claim 22, wherein the path loss reference values are determined by the TRP.

26. The method of claim 22, wherein the path loss reference values are determined by a location server and are received by the UE from the location server via the TRP.

27. The method of claim 22, wherein transmitting the second SRS to the RP for positioning using the path loss reference values comprises configuring less than all SRS resources in an SRS resource set based on the path loss reference values.

28. The method of claim 27, wherein less than all SRS resources in the SRS resource set comprises a group of SRS resources or an individual SRS resource.

* * * * *